United States Patent [19]
Matsuo

[11] Patent Number: 6,112,289
[45] Date of Patent: *Aug. 29, 2000

[54] DATA PROCESSOR

[75] Inventor: Masahito Matsuo, Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/143,530

[22] Filed: Aug. 28, 1998

Related U.S. Application Data

[63] Continuation of application No. 08/555,425, Nov. 9, 1995.

[30] Foreign Application Priority Data

Nov. 9, 1994 [JP] Japan ................................. 6-275281

[51] Int. Cl.$^7$ .................................................. G06F 9/38
[52] U.S. Cl. ..................................... 712/23; 710/5
[58] Field of Search ................................ 712/9, 23, 215, 712/216; 710/5, 21

[56] References Cited

U.S. PATENT DOCUMENTS

| Re. 35,311 | 8/1996 | Vassiliadis et al. ................... 708/521 |
| 5,029,069 | 7/1991 | Sakamura ................................. 712/234 |
| 5,269,007 | 12/1993 | Hanawa et al. ......................... 712/218 |
| 5,313,644 | 5/1994 | Matsuo et al. .......................... 712/228 |
| 5,461,715 | 10/1995 | Matsuo et al. .......................... 712/212 |
| 5,467,476 | 11/1995 | Kawasaki ................................. 712/23 |
| 5,560,032 | 9/1996 | Nguyen et al. ............................ 712/23 |

FOREIGN PATENT DOCUMENTS

| 64-91225 | 4/1989 | Japan . |
| 3-91029 | 4/1991 | Japan . |

OTHER PUBLICATIONS

Toyohiko Yoshida et al., "The Approach to Multiple Instruction Execution in the GMICRO/400 Processor", Proceedings, The Eighth TRON Project Symposium (International), 1991, pp. 184–195.

Greg Blanck et al., "The SuperSPARC™ Microprocessor", digest of papers, CON, 1993 pp. 136–141.

Avtar Saini, "An Overview of the Intel Pentium™ Processor", digest of papers, CON, 1993, pp. 60–63, 1993.

Primary Examiner—Eric Coleman
Attorney, Agent, or Firm—McDermott, Will & Emery

[57] ABSTRACT

A data processor comprises an instruction decoding unit having two decoders decoding respective instructions of an instruction group consisting of a plurality of instructions including a first instruction and a second instruction succeeding the first instruction, and a judging unit judging whether or not a combination of the first instruction and the second instruction can be executed in parallel and a bus for transferring two data in parallel between an operand access unit and an integer operation unit. The data processor uses a superscalar technique. Two instructions having an operand interference can be executed in parallel at high speed and two instructions accessing a memory can be executed in parallel without considerable hardware.

8 Claims, 78 Drawing Sheets

FIG. 21

898 { (Sh) | 00 | 1111 | --- CHAINED ADDRESSING MODE --- CHAINED ADDRESSING MODE
(Ea) | 0000 | 1111 | --- CHAINED ADDRESSING MODE --- CHAINED ADDRESSING MODE

FIG. 28
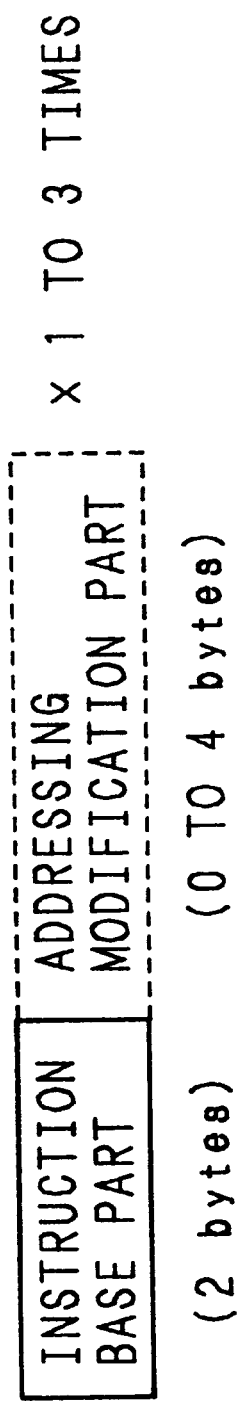
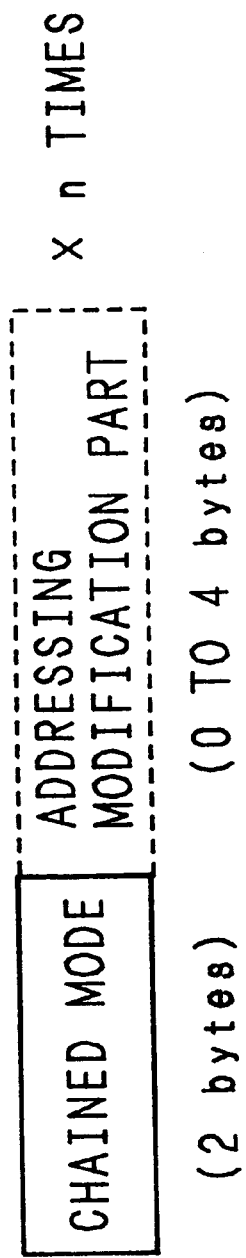

D,A,F,E:PIPELINE STAGE

FIG. 47A

D STAGE

INSTRUCTION 1 AND INSTRUCTION 2 ARE DECODED IN PARALLEL.
WHETHER PARALLEL DECODING IS POSSIBLE OR NOT IS JUDGED.
DECODE RESULT OF TWO INSTRUCTIONS ARE ISSUED IN PARALLEL, BECAUSE COMBINATION OF INSTRUCTIONS CAN BE EXECUTED IN PARALLEL AND THERE IS NO OPERAND INTERFERENCE.

A STAGE

SUCCEEDING STAGE DECODING OF INSTRUCTION 1 IS PERFORMED.
DECODE RESULT OF INSTRUCTION 2 IS TRANSFERRED.
WRITE RESERVATION OF REGISTERS R1 AND R2 ARE PERFORMED.

F STAGE

MICROINSTRUCTION RELATED TO INSTRUCTION 1 IS READ AND DECODED.
EXECUTION CONTROL INFORMATION RELATED TO INSTRUCTION 2 IS GENERATED BY HARDWIRED.
LITERAL "4" OF INSTRUCTION 1 AND LITERAL "8" OF INSTRUCTION 2 ARE OUTPUTTED TO CONSTANT GENERATING UNIT 206.

E STAGE

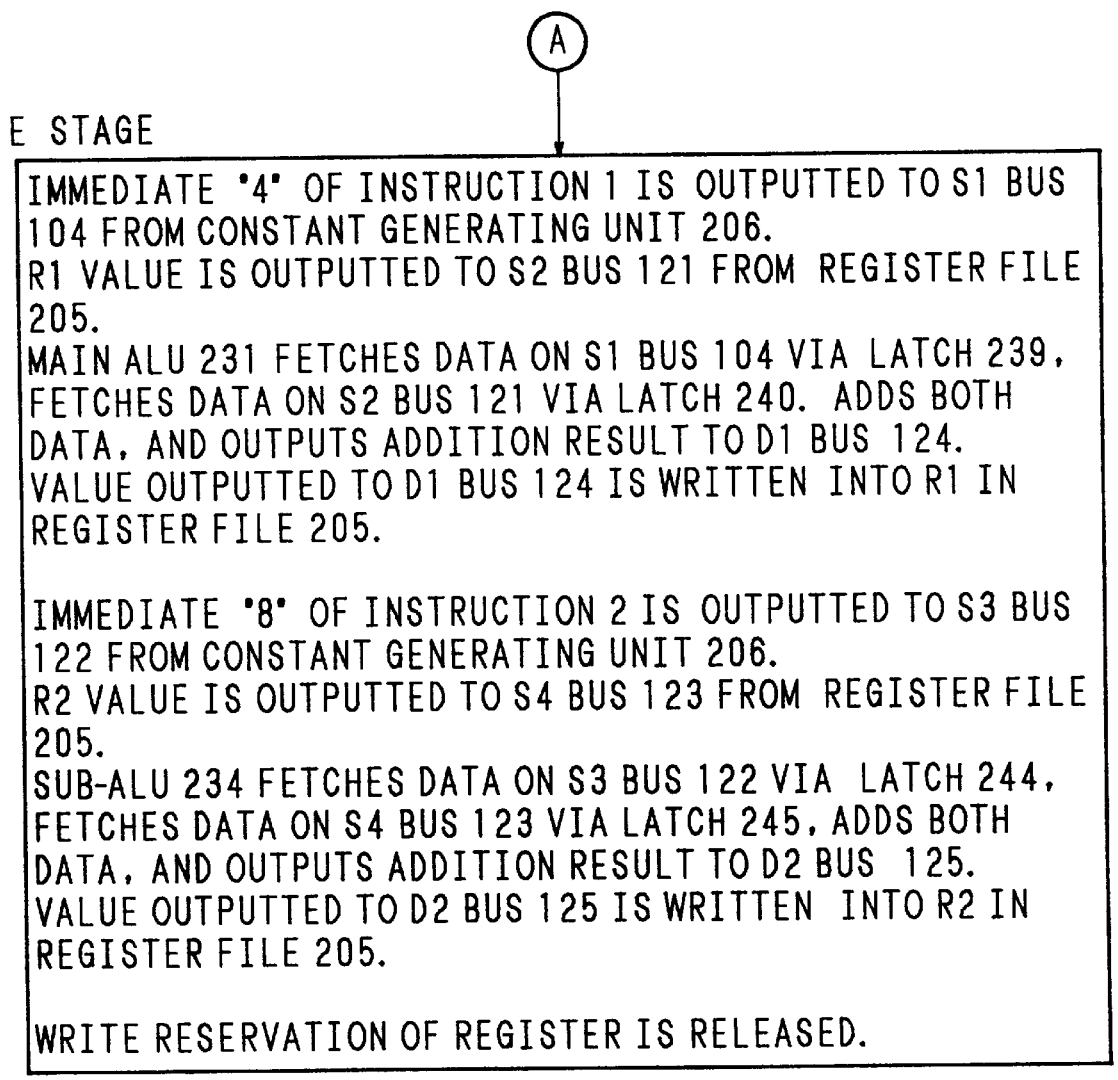

(A)

IMMEDIATE "4" OF INSTRUCTION 1 IS OUTPUTTED TO S1 BUS 104 FROM CONSTANT GENERATING UNIT 206.
R1 VALUE IS OUTPUTTED TO S2 BUS 121 FROM REGISTER FILE 205.
MAIN ALU 231 FETCHES DATA ON S1 BUS 104 VIA LATCH 239, FETCHES DATA ON S2 BUS 121 VIA LATCH 240. ADDS BOTH DATA, AND OUTPUTS ADDITION RESULT TO D1 BUS 124.
VALUE OUTPUTTED TO D1 BUS 124 IS WRITTEN INTO R1 IN REGISTER FILE 205.

IMMEDIATE "8" OF INSTRUCTION 2 IS OUTPUTTED TO S3 BUS 122 FROM CONSTANT GENERATING UNIT 206.
R2 VALUE IS OUTPUTTED TO S4 BUS 123 FROM REGISTER FILE 205.
SUB-ALU 234 FETCHES DATA ON S3 BUS 122 VIA LATCH 244, FETCHES DATA ON S4 BUS 123 VIA LATCH 245, ADDS BOTH DATA, AND OUTPUTS ADDITION RESULT TO D2 BUS 125.
VALUE OUTPUTTED TO D2 BUS 125 IS WRITTEN INTO R2 IN REGISTER FILE 205.

WRITE RESERVATION OF REGISTER IS RELEASED.

FIG. 49A

D STAGE

INSTRUCTION 1 AND INSTRUCTION 2 ARE DECODED IN PARALLEL.
WHETHER PARALLEL DECODING IS POSSIBLE OR NOT IS JUDGED.
DECODE RESULT OF TWO INSTRUCTIONS ARE ISSUED IN PARALLEL, BECAUSE COMBINATION OF INSTRUCTIONS CAN BE EXECUTED IN PARALLEL.

A STAGE

SUCCEEDING STAGE DECODING OF INSTRUCTION 1 IS PERFORMED.
DECODE RESULT OF INSTRUCTION 2 IS TRANSFERRED.
WRITE RESERVATION OF REGISTER R1 IS PERFORMED.

OPERAND ADD. IS CALCULATED IN ADD. CALCULATION UNIT 53. OPERAND ADD. IS TRANSFERRED TO OPERAND ACCESS UNIT 17 VIA AA BUS 106. (R13 VALUE IS FETCHED FROM REGISTER FILE 205 VIA IX BUS 103 INTO INDEX LATCH 56, AND DISPLACEMENT "16" IS FETCHED VIA DISP BUS 102 INTO DISP LATCH 55. BASE LATCH 57 IS ZERO CLEARED. ADDITION IS PERFORMED BY THREE-INPUT ADDER, AND ADDITION RESULT IS OUTPUTTED TO AA BUS 106 VIA AO LATCH 59.)

F STAGE

MICROINSTRUCTION RELATED TO INSTRUCTION 1 IS READ AND DECODED.
EXECUTION CONTROL INFORMATION RELATED TO INSTRUCTION 2 IS GENERATED BY HARDWIRED.
LITERAL "8" OF INSTRUCTION 2 IS OUTPUTTED TO CONSTANT GENERATING UNIT 206.

OPERAND IS PREFETCHED FROM DATA CACHE 74 OR EXTERNAL MEMORY, AND FETCHED DATA IS TRANSFERRED TO SD REGISTER 210.

D STAGE

INSTRUCTION 1 AND INSTRUCTION 2 ARE DECODED IN PARALLEL.
WHETHER PARALLEL DECODING IS POSSIBLE OR NOT IS JUDGED.
DECODE RESULT OF TWO INSTRUCTIONS ARE ISSUED IN PARALLEL, BECAUSE COMBINATION OF INSTRUCTIONS CAN BE EXECUTED IN PARALLEL AND THERE IS NO OPERAND INTERFERENCE.

A STAGE

SUCCEEDING STAGE DECODING OF INSTRUCTION 1 IS PERFORMED.
DECODE RESULT OF INSTRUCTION 2 IS TRANSFERRED.
WRITE RESERVATION OF REGISTERS R1 AND R2 ARE PERFORMED.

F STAGE

MICROINSTRUCTION RELATED TO INSTRUCTION 1 IS READ AND DECODED.
EXECUTION CONTROL INFORMATION RELATED TO INSTRUCTION 2 IS GENERATED BY HARDWIRED.

(C)

E STAGE

FIG. 52A

D STAGE

INSTRUCTION 1 AND INSTRUCTION 2 ARE DECODED IN PARALLEL.
WHETHER PARALLEL DECODING IS POSSIBLE OR NOT IS JUDGED.
DECODE RESULT OF TWO INSTRUCTIONS ARE ISSUED IN PARALLEL, BECAUSE COMBINATION OF INSTRUCTIONS CAN BE EXECUTED IN PARALLEL AND THERE IS NO OPERAND INTERFERENCE.

A STAGE

SUCCEEDING STAGE DECODING OF INSTRUCTION 1 IS PERFORMED.
DECODE RESULT OF INSTRUCTION 2 IS TRANSFERRED.
WRITE RESERVATION OF REGISTERS R1 AND R2 ARE PERFORMED.

F STAGE

MICROINSTRUCTION RELATED TO INSTRUCTION 1 IS READ AND DECODED.
EXECUTION CONTROL INFORMATION RELATED TO INSTRUCTION 2 IS GENERATED BY HARDWIRED.
LITERAL "3" OF INSTRUCTION 1 IS OUTPUTTED TO CONSTANT GENERATING UNIT 206.

FIG. 52B

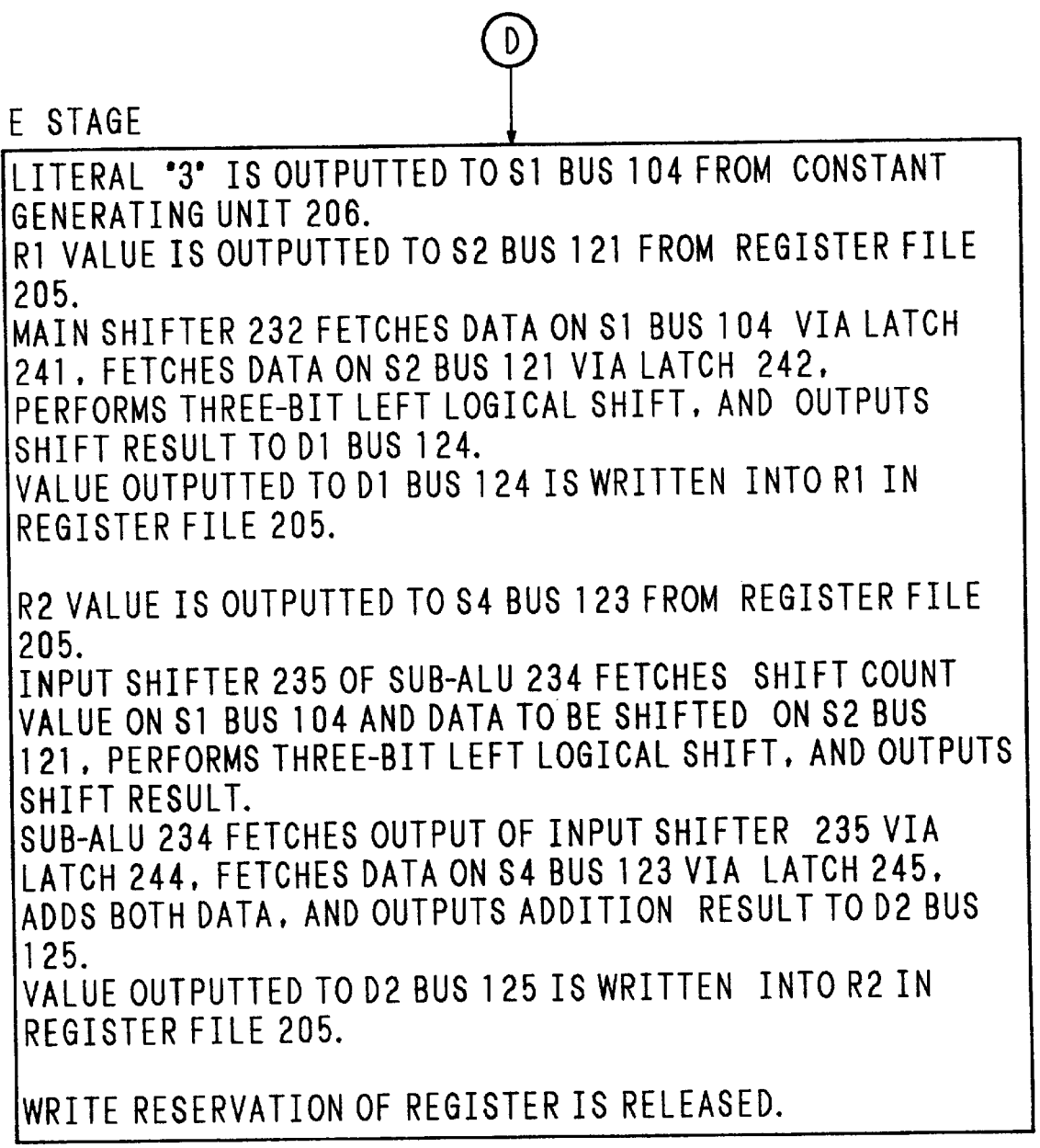

E STAGE

LITERAL "3" IS OUTPUTTED TO S1 BUS 104 FROM CONSTANT GENERATING UNIT 206.
R1 VALUE IS OUTPUTTED TO S2 BUS 121 FROM REGISTER FILE 205.
MAIN SHIFTER 232 FETCHES DATA ON S1 BUS 104 VIA LATCH 241, FETCHES DATA ON S2 BUS 121 VIA LATCH 242, PERFORMS THREE-BIT LEFT LOGICAL SHIFT, AND OUTPUTS SHIFT RESULT TO D1 BUS 124.
VALUE OUTPUTTED TO D1 BUS 124 IS WRITTEN INTO R1 IN REGISTER FILE 205.

R2 VALUE IS OUTPUTTED TO S4 BUS 123 FROM REGISTER FILE 205.
INPUT SHIFTER 235 OF SUB-ALU 234 FETCHES SHIFT COUNT VALUE ON S1 BUS 104 AND DATA TO BE SHIFTED ON S2 BUS 121, PERFORMS THREE-BIT LEFT LOGICAL SHIFT, AND OUTPUTS SHIFT RESULT.
SUB-ALU 234 FETCHES OUTPUT OF INPUT SHIFTER 235 VIA LATCH 244, FETCHES DATA ON S4 BUS 123 VIA LATCH 245, ADDS BOTH DATA, AND OUTPUTS ADDITION RESULT TO D2 BUS 125.
VALUE OUTPUTTED TO D2 BUS 125 IS WRITTEN INTO R2 IN REGISTER FILE 205.

WRITE RESERVATION OF REGISTER IS RELEASED.

FIG. 53A

D STAGE

INSTRUCTION 1 AND INSTRUCTION 2 ARE DECODED IN PARALLEL.
WHETHER PARALLEL DECODING IS POSSIBLE OR NOT IS JUDGED.
DECODE RESULT OF TWO INSTRUCTIONS ARE ISSUED IN PARALLEL, BECAUSE COMBINATION OF INSTRUCTIONS CAN BE EXECUTED IN PARALLEL AND THERE IS NO OPERAND INTERFERENCE.

A STAGE

SUCCEEDING STAGE DECODING OF INSTRUCTION 1 IS PERFORMED.
DECODE RESULT OF INSTRUCTION 2 IS TRANSFERRED.
WRITE RESERVATION OF REGISTERS R1 IS PERFORMED.

F STAGE

MICROINSTRUCTION RELATED TO INSTRUCTION 1 IS READ AND DECODED.
EXECUTION CONTROL INFORMATION RELATED TO INSTRUCTION 2 IS GENERATED BY HARDWIRED.
LITERAL "3" OF INSTRUCTION 2 IS OUTPUTTED TO CONSTANT GENERATING UNIT 206.

E STAGE (E)

R0 VALUE IS OUTPUTTED TO S1 BUS 104 FROM REGISTER FILE 205.
R1 VALUE IS OUTPUTTED TO S2 BUS 121 FROM REGISTER FILE 205.
MAIN ALU 231 FETCHES DATA ON S1 BUS 104 VIA LATCH 239, FETCHES DATA ON S2 BUS 121 VIA LATCH 240, ADDS BOTH DATA, AND OUTPUTS ADDITION RESULT TO D1 BUS 124.

LITERAL "3" IS OUTPUTTED TO S3 BUS 122 FROM CONSTANT GENERATING UNIT 206.
SUB-ALU 234 FETCHES DATA ON S1 BUS 104 VIA LATCH 244, FETCHES DATA ON S2 BUS 121 VIA LATCH 245, ADDS BOTH DATA, AND OUTPUTS ADDITION RESULT TO OUTPUT SHIFTER 236.
LATCH 244 FETCHES SHIFT COUNT VALUE ON S3 BUS 122.
OUTPUT SHIFTER 236 PERFORMS THREE-BIT LEFT LOGICAL SHIFT OF DATA OUTPUTTED FROM SUB-ALU 234 ACCORDING TO SHIFT COUNT VALUE IN LATCH 244, AND OUTPUTS SHIFT RESULT TO D2 BUS 125.
VALUE OUTPUTTED TO D2 BUS 125 IS WRITTEN INTO R1 IN REGISTER FILE 205.

WRITE RESERVATION OF REGISTER IS RELEASED.

FIG. 54A

D STAGE

INSTRUCTION 1 AND INSTRUCTION 2 ARE DECODED IN PARALLEL.
WHETHER PARALLEL DECODING IS POSSIBLE OR NOT IS JUDGED.
DECODE RESULT OF TWO INSTRUCTIONS ARE ISSUED IN PARALLEL, BECAUSE COMBINATION OF INSTRUCTIONS CAN BE EXECUTED IN PARALLEL AND THERE IS NO OPERAND INTERFERENCE.

A STAGE

SUCCEEDING STAGE DECODING OF INSTRUCTION 1 IS PERFORMED.
DECODE RESULT OF INSTRUCTION 2 IS TRANSFERRED.
WRITE RESERVATION OF REGISTERS R2 IS PERFORMED.

F STAGE

MICROINSTRUCTION RELATED TO INSTRUCTION 1 IS READ AND DECODED.
EXECUTION CONTROL INFORMATION RELATED TO INSTRUCTION 2 IS GENERATED BY HARDWIRED.

D STAGE

INSTRUCTION 1 AND INSTRUCTION 2 ARE DECODED IN PARALLEL.
WHETHER PARALLEL DECODING IS POSSIBLE OR NOT IS JUDGED.
DECODE RESULT OF TWO INSTRUCTIONS ARE ISSUED IN PARALLEL, BECAUSE COMBINATION OF INSTRUCTIONS CAN BE EXECUTED IN PARALLEL.

A STAGE

SUCCEEDING STAGE DECODING OF INSTRUCTION 1 IS PERFORMED.
DECODE RESULT OF INSTRUCTION 2 IS TRANSFERRED.
WRITE RESERVATION OF REGISTER R1 IS PERFORMED.

OPERAND ADD. IS CALCULATED IN ADD. CALCULATION UNIT 53,
OPERAND ADD. IS TRANSFERRED TO FA REGISTER 61. (R13 VALUE IS FETCHED FROM REGISTER FILE 205 VIA IX BUS 103 INTO INDEX LATCH 56, AND DISPLACEMENT "16" IS FETCHED VIA DISP BUS 102 INTO DISP LATCH 55. BASE LATCH 57 IS ZERO CLEARED. ADDITION IS PERFORMED BY THREE-INPUT ADDER, AND ADDITION RESULT IS OUTPUTTED TO FA REGISTER 61. )

F STAGE

MICROINSTRUCTION RELATED TO INSTRUCTION 1 IS READ AND DECODED.
EXECUTION CONTROL INFORMATION RELATED TO INSTRUCTION 2 IS GENERATED BY HARDWIRED.
LITERAL "8" OF INSTRUCTION 2 IS OUTPUTTED TO CONSTANT GENERATING UNIT 206.
ADD. HELD IN FA REGISTER 61 IS TRANSFERRED TO SA REGISTER 62.

FIG. 56A

D STAGE

INSTRUCTION 1 AND INSTRUCTION 2 ARE DECODED IN PARALLEL.
WHETHER PARALLEL DECODING IS POSSIBLE OR NOT IS JUDGED.
DECODE RESULT OF TWO INSTRUCTIONS ARE ISSUED IN PARALLEL, BECAUSE COMBINATION OF INSTRUCTIONS CAN BE EXECUTED IN PARALLEL.

A STAGE

SUCCEEDING STAGE DECODING OF INSTRUCTION 1 IS PERFORMED.
DECODE RESULT OF INSTRUCTION 2 IS TRANSFERRED.
WRITE RESERVATION OF REGISTER R0 AND R1 ARE PERFORMED.

OPERAND ADD. IS CALCULATED IN ADD. CALCULATION UNIT 53.
OPERAND ADD. IS TRANSFERRED TO OPERAND ACCESS UNIT 17 VIA AA BUS 106. (VALUE OF ASP 221 IS FETCHED VIA IX BUS 103 INTO INDEX LATCH 56. DISP LATCH 55 AND BASE LATCH 57 ARE ZERO CLEARED. ADDITION IS PERFORMED BY THREE-INPUT ADDER, AND ADDITION RESULT IS OUTPUTTED TO AA BUS 106 VIA AO LATCH 59. )
VALUE OF ASP 221 IS CORRECTED BY +8. (VALUE OF ASP 221 IS FETCHED INTO LATCH 223, AND CORRECTION VALUE "8" IS FETCHED INTO LATCH 222. TWO VALUES ARE ADDED BY ASP ADDER 224, AND ADDITION RESULT IS REWRITTEN INTO ASP 221. )
UPDATED VALUE OF ASP 221 TRANSFERRED TO FSP 225.

F STAGE

MICROINSTRUCTION RELATED TO INSTRUCTION 1 IS READ AND DECODED.
EXECUTION CONTROL INFORMATION RELATED TO INSTRUCTION 2 IS GENERATED BY HARDWIRED.

8-BYTE DATA IS PREFETCHED FROM DATA CACHE 74 OR EXTERNAL MEMORY, AND FETCHED DATA IS TRANSFERRED TO SD REGISTER 210.
VALUE OF FSP 225 IS TRANSFERRED TO ESP 226.

E STAGE

HIGHER 4 BYTES OF 8-BYTE DATA FETCHED FROM SD REGISTER 210 IS OUTPUTTED TO S1 BUS 104.
MAIN ALU 231 FETCHES DATA ON S1 BUS 104 VIA LATCH 239, AND BY OBTAINING LOGICAL SUM OF IT AND ZERO, OUTPUTS VALUE OF LOAD OPERAND TO D1 BUS 124.
VALUE OUTPUTTED TO D1 BUS 124 IS WRITTEN INTO R0 IN REGISTER FILE 205.

LOWER 4 BYTES OF 8-BYTE DATA FETCHED FROM SD REGISTER 210 IS OUTPUTTED TO S3 BUS 122.
SUB-ALU 234 FETCHES DATA ON S3 BUS 122 VIA LATCH 244, AND BY OBTAINING LOGICAL SUM OF IT AND ZERO, OUTPUTS VALUE OF LOAD OPERAND TO D2 BUS 125.
VALUE OUTPUTTED TO D2 BUS 125 IS WRITTEN INTO R1 IN REGISTER FILE 205.

WRITE RESERVATION OF REGISTER IS RELEASED.
VALUE OF ESP 226 IS WRITTEN INTO MASTER SP 228.

FIG. 57A
D STAGE

> INSTRUCTION 1 AND INSTRUCTION 2 ARE DECODED IN PARALLEL.
> WHETHER PARALLEL DECODING IS POSSIBLE OR NOT IS JUDGED.
> DECODE RESULT OF TWO INSTRUCTIONS ARE ISSUED IN PARALLEL, BECAUSE COMBINATION OF INSTRUCTIONS CAN BE EXECUTED IN PARALLEL.

A STAGE

> SUCCEEDING STAGE DECODING OF INSTRUCTION 1 IS PERFORMED.
> DECODE RESULT OF INSTRUCTION 2 IS TRANSFERRED.
>
> OPERAND ADD. IS CALCULATED IN ADD. CALCULATION UNIT 53.
> OPERAND ADD. IS TRANSFERRED TO FA REGISTER 61. (VALUE OF ASP 221 IS FETCHED VIA IX BUS 103 INTO INDEX LATCH 56, CORRECTION VALUE -8 IS FETCHED INTO DISP LATCH 55, BASE LATCH 57 IS ZERO CLEARED. ADDITION IS PERFORMED BY THREE-INPUT ADDER, AND ADDITION RESULT IS OUTPUTTED TO FA REGISTER 61. )
> VALUE OF ASP 221 IS CORRECTED BY -8. (VALUE OF ASP 221 IS FETCHED INTO LATCH 223, AND CORRECTION VALUE "-8" IS FETCHED INTO LATCH 222. TWO VALUES ARE ADDED BY ASP ADDER 224, AND ADDITION RESULT IS REWRITTEN INTO ASP 221. )
> UPDATED VALUE OF ASP 221 IS TRANSFERRED TO FSP 225.

F STAGE

> MICROINSTRUCTION RELATED TO INSTRUCTION 1 IS READ AND DECODED.
> EXECUTION CONTROL INFORMATION RELATED TO INSTRUCTION 2 IS GENERATED BY HARDWIRED.
>
> ADD. HELD IN FA REGISTER 61 IS TRANSFERRED TO SA REGISTER 62.
> VALUE OF FSP 225 IS TRANSFERRED TO FSP 226.

(I)

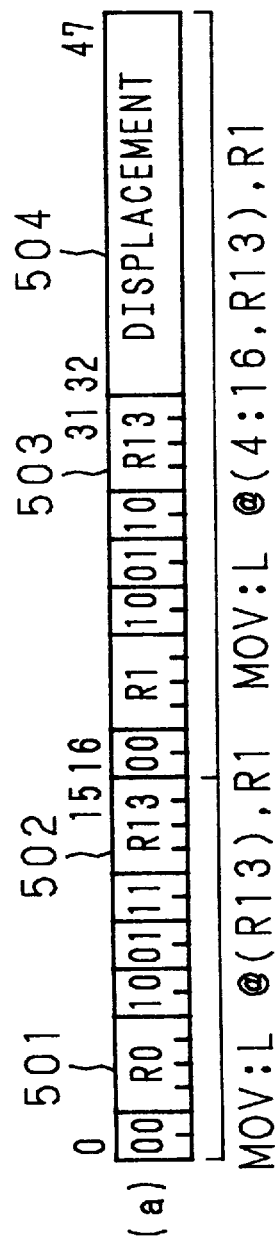
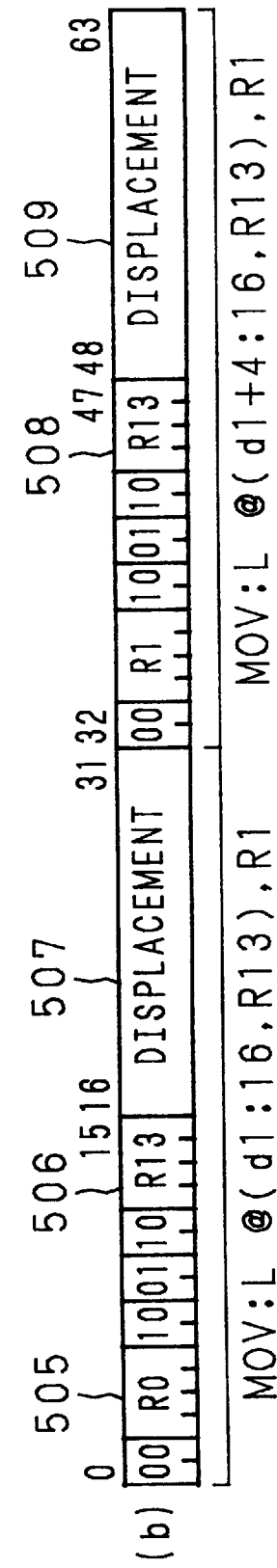
FIG. 58

FIG. 59A

D STAGE

INSTRUCTION 1 AND INSTRUCTION 2 ARE DECODED IN PARALLEL.
WHETHER PARALLEL DECODING IS POSSIBLE OR NOT IS JUDGED.
DECODE RESULT OF TWO INSTRUCTIONS ARE ISSUED IN PARALLEL, BECAUSE COMBINATION OF INSTRUCTIONS CAN BE EXECUTED IN PARALLEL.

A STAGE

SUCCEEDING STAGE DECODING OF INSTRUCTION 1 IS PERFORMED.
DECODE RESULT OF INSTRUCTION 2 IS TRANSFERRED.
WRITE RESERVATION OF REGISTER R0, R1 ARE PERFORMED.

OPERAND ADD. IS CALCULATED IN ADD. CALCULATION UNIT 53.
OPERAND ADD. IS TRANSFERRED TO OPERAND ACCESS UNIT 17 VIA AA BUS 106. (R13 VALUE IS FETCHED FROM REGISTER FILE 205 VIA IX BUS 103 INTO INDEX LATCH 56, AND DISPLACEMENT "16" IS FETCHED VIA DISP BUS 102 INTO DISP LATCH 55. BASE LATCH 57 IS ZERO CLEARED, ADDITION IS PERFORMED BY THREE-INPUT ADDER, AND ADDITION RESULT IS OUTPUTTED TO AA BUS 106 VIA AO LATCH 59. )

F STAGE

MICROINSTRUCTION RELATED TO INSTRUCTION 1 IS READ AND DECODED.
EXECUTION CONTROL INFORMATION RELATED TO INSTRUCTION 2 IS GENERATED BY HARDWIRED.

OPERAND IS PREFETCHED FROM DATA CACHE 74 OR EXTERNAL MEMORY, AND FETCHED DATA IS TRANSFERRED TO SD REGISTER 210.

E STAGE

○ J ↓

HIGHER 4 BYTES OF 8-BYTE DATA FETCHED FROM SD REGISTER 210 IS OUTPUTTED TO S1 BUS 104.
MAIN ALU 231 FETCHES DATA ON S1 BUS 104 VIA LATCH 239, AND BY OBTAINING LOGICAL SUM OF IT AND ZERO, OUTPUTS VALUE OF LOAD OPERAND TO D1 BUS 124.
VALUE OUTPUTTED TO D1 BUS 124 IS WRITTEN INTO R0 IN REGISTER FILE 205.

LOWER 4 BYTES OF 8-BYTE DATA FETCHED FROM SD REGISTER 210 IS OUTPUTTED TO S3 BUS 122.
SUB-ALU 234 FETCHES DATA ON S3 BUS 122 VIA LATCH 244, AND BY OBTAINING LOGICAL SUM OF IT AND ZERO, OUTPUTS VALUE OF LOAD OPERAND TO D2 BUS 125.
VALUE OUTPUTTED TO D2 BUS 125 IS WRITTEN INTO R1 IN REGISTER FILE 205.

WRITE RESERVATION OF REGISTER IS RELEASED.

FIG. 60A

D STAGE

INSTRUCTION 1 AND INSTRUCTION 2 ARE DECODED IN PARALLEL.
WHETHER PARALLEL DECODING IS POSSIBLE OR NOT IS JUDGED.
DECODE RESULT OF TWO INSTRUCTIONS ARE ISSUED IN PARALLEL, BECAUSE COMBINATION OF INSTRUCTIONS CAN BE EXECUTED IN PARALLEL.

A STAGE

SUCCEEDING STAGE DECODING OF INSTRUCTION 1 IS PERFORMED.
DECODE RESULT OF INSTRUCTION 2 IS TRANSFERRED.

OPERAND ADD. IS CALCULATED IN ADD. CALCULATION UNIT 53, OPERAND ADD. IS TRANSFERRED TO FA REGISTER 61. (VALUE OF R13 IS FETCHED FROM REGISTER FILE 205 VIA IX BUS 103 INTO INDEX LATCH 56, DISP LATCH 55 AND BASE LATCH 57 ARE ZERO CLEARED, ADDITION IS PERFORMED BY THREE-INPUT ADDER, AND ADDITION RESULT IS OUTPUTTED TO FA REGISTER 61. )

F STAGE

MICROINSTRUCTION RELATED TO INSTRUCTION 1 IS READ AND DECODED.
EXECUTION CONTROL INFORMATION RELATED TO INSTRUCTION 2 IS GENERATED BY HARDWIRED.

ADD. HELD IN FA REGISTER 61 IS TRANSFERRED TO SA REGISTER 62.

E STAGE

R0 VALUE IS OUTPUTTED TO S1 BUS 104 FROM REGISTER FILE 205.
MAIN ALU 231 FETCHES DATA ON S1 BUS 104 VIA LATCH 239, BY OBTAINING LOGICAL SUM OF IT AND ZERO, VALUE OF STORE OPERAND IS OUTPUTTED TO D1 BUS 124.
VALUE OUTPUTTED TO D1 BUS 124 IS WRITTEN INTO DDW REGISTER 212.

R1 VALUE IS OUTPUTTED TO S3 BUS 122 FROM REGISTER FILE 205.
SUB-ALU 234 FETCHES DATA ON S3 BUS 122 VIA LATCH 244, BY OBTAINING LOGICAL SUM OF IT AND ZERO, VALUE OF STORE OPERAND IS OUTPUTTED TO D2 BUS 125.
VALUE OUTPUTTED TO D2 BUS 125 IS WRITTEN INTO DDW REGISTER 212.

CONTENT OF SA REGISTER 62 IS TRANSFERRED TO OPERAND ACCESS UNIT 17 VIA AA BUS 106, AND HIT/MISS OF CACHE IS JUDGED.

S STAGE

CONTENT OF DDW REGISTER 212 IS TRANSFERRED TO OPERAND ACCESS UNIT 17 VIA DD BUS 107. (TWO DATA ARE CONCATENATED AND OUTPUTTED TO DD BUS 107 SO THAT DATA FETCHED FROM D1 BUS 124 POSITIONS AT HIGHER 4 BYTES. )
IN CASE OF CACHE HIT, CONTENT OF DATA CACHE IS UPDATED.
DATA IS STORED INTO EXTERNAL MEMORY.

DATA PROCESSOR

This application is a continuation of application Ser. No. 08/555,425 filed Nov. 9, 1995.

BACKGROUND OF THE INVENTION

1. Field of the Invention

The present invention relates to a data processor realizing a high processing capability by a parallel processing mechanism, and, more particularly, relates to a data processor capable of executing a plurality of instructions in parallel.

2. Description of the Related Art

In recent years, together with its high processing speed resulting from the improvement of operating frequency, a data processor is making a remarkable progress in performance due to the development of parallel processing techniques such as pipeline processing or superscalar techniques. A superscalar technique is a technique for decoding and executing a plurality of instructions in parallel. For example, Japanese Patent Application Laid-Open No. 3-91029 (1991), discusses a data processor which decodes and executes, in parallel, two instructions with no operand interference. The data processor uses a superscalar technique that cannot execute certain combinations of instructions in parallel such as instructions having an operand interference or instructions whose operand is a memory operand. A key to the improvement of performance is in increasing the combination of instructions capable of being executed in parallel.

In a conventional data processor, in most cases, two instructions whose operands are interdependent are not executed at the same time by simply connecting operators in series.

Known data processors execute two instructions having operand interference in parallel by serially connecting ALU's in two steps or by simply connecting operators in series. However, it is difficult to obtain a high speed operation and to improve the operating frequency of the data processor.

In order to execute, in parallel, two instructions having a memory operand or whose operand is a memory operand, it is necessary to execute two memory accesses in parallel. In order to access the two independent memory operands in parallel, it is necessary to provide two ports on a main memory or a cache memory, or to have an interleaved memory by providing multi-ports on only a tag memory of a built-in cache. In a conventional data processor having such a configuration, in order to execute in parallel the two instructions having two memory operands, a large amount of hardware must be added and the control becomes complicated.

In such a way, in order to improve the performance of the data processor by using a superscalar system, it is important to increase the combination of the instructions executable in parallel. However, as mentioned above, it is difficult to execute, in parallel, the two instructions having operand interference at high speed. Also, in order to execute two instructions accessing the memory in parallel, a large amount of hardware is required.

SUMMARY OF THE INVENTION

The present invention has been devised in view of such circumstances and disadvantages of know data processors. It is an object of the present invention to provide a data processor which improves performance by using a superscalar system, by executing two instructions having operand interference at high speed in parallel or two instructions accessing storing means in parallel without increasing an amount of hardware considerably. It is also an object of the present invention to provide a data processor in which the combination of instructions executable in parallel is increased.

A first aspect of the data processor applies to a shift instruction as a first instruction, and an arithmetic operation, a logical operation or a comparing instruction as a second instruction. Instruction executing means includes composite operating means having a shifter executing a shift processing for only one or a plurality of predetermined shift count values, and operating means, whose, at least, one input is connected to an output of the shifter, for executing, at least, either the arithmetic operation or logical operation. Instruction decoding means includes means for decoding instructions of an instruction group consisting of a plurality of instructions including the first instruction and the second instruction succeeding the first instruction. Furthermore, there is provided judging means for judging whether or not a first condition, in which the first instruction is a shift instruction executing the shift processing of a shift count value which can be executed by the shifter, and a second condition, in which the second instruction is an instruction executing the operation executable by the operating means, and the second instruction refers to a shift result of the first instruction, are satisfied.

A second aspect of the data processor applies to an arithmetic operation or a logical operation instruction as a first instruction, and a shift instruction as a second instruction. Instruction executing means includes composite operating means having operating means for executing, at least, either the arithmetic operation or the logical operation, and a shifter, whose input is connected to an output of the operating means, for executing a shift processing for only one or a plurality of predetermined shift count values. Instruction decoding means includes means for decoding instructions of an instruction group consisting of a plurality of instructions including the first instruction and the succeeding second instruction. Furthermore, there is provided judging means for judging whether or not a first condition, in which the first instruction is an instruction executing an operation executable by the operating means, and a second condition, in which the second instruction is the shift instruction executing a shift processing of any shift count value executable by the shifter, and the second instruction refers to an operation result of the first instruction, are satisfied.

A third aspect of the data possessor applies to an operation instruction as a first instruction, and a register-register transfer instruction as a second instruction. Instruction executing means includes operating means for executing, at least, one of an arithmetic operation, a logical operation and a shift processing, and data transferring means for transferring an operation result of the operating means to a plurality of registers. Instruction decoding means includes means for decoding instructions of an instruction group consisting of a plurality of instructions including the first instruction and the succeeding second instruction. Furthermore, there is provided judging means for judging whether or not a first condition, in which the first instruction is an instruction executing an operation executable by the operating means, and transferring the result to a register corresponding to a first value included in itself, and a second condition, in which the second instruction is an instruction transferring the operation result of the first instruction to a register corresponding to a second value included in itself, are satisfied.

A fourth aspect of the data processor applies to an operation instruction as both a first and a second instructions. Instruction executing means includes first and second operating means for respectively executing, at least, one of an arithmetic operation, a logical operation and a shift processing, and data transferring means for transferring a operation result of the first operating means and an operation result of the second operating means respectively to the different registers in parallel. Instruction decoding means includes means for decoding instructions of an instruction group consisting of a plurality of instructions including the first instruction and the succeeding second instruction. Furthermore, there is provided judging means for judging whether or not a first condition, in which the first instruction is an instruction executing an operation executable by the first and second operating means and transferring a result to a register corresponding to a first value included in itself, and a second condition, in which the second instruction is an instruction transferring an operation result of the first instruction to a register corresponding to a second value included in itself, are satisfied.

A fifth aspect of the data processor applies to a pop instruction as both a first and a second instructions. Instruction executing means includes data transferring means for transferring two data to the registers, in parallel, from data accessing means. Instruction decoding means includes means for decoding instructions of an instruction group consisting of a plurality of instructions including the first instruction and the succeeding second instructions. Furthermore, there is provided judging means for judging whether or not a condition, where both the first and second instructions are the ones each of which pops data from a stack area specified by a stack pointer to the register corresponding to a value included in itself, is satisfied.

A sixth aspect of the data processor applies to a push instruction as both a first and a second instructions. Instruction executing means includes data transferring means for transferring data read out in parallel from two registers to data accessing means in parallel. Instruction decoding means includes means for decoding instructions of an instruction group consisting of a plurality of instructions including the first instruction and the succeeding second instruction. Furthermore, there is provided judging means for judging whether or not a condition, where both the first and second instructions are the ones each of which pushes data of a register corresponding to a value included in itself to a stack area specified by a stack pointer, is satisfied.

A seventh aspect of the data processor applies to a load instruction of a register indirect mode as a first instruction, and a load instruction of a register relative indirect mode as a second instruction. Instruction executing means includes data transferring means for transferring two data to registers from the data accessing means in parallel. Instruction decoding means includes means for decoding instructions of an instruction group consisting of a plurality of instructions including the first instruction and the succeeding second instruction. Furthermore, there is provided judging means for judging whether or not a first condition, in which the first instruction is an instruction transferring address data of storing means specified by an content of a register corresponding to a first value included in itself, to a register corresponding to a second value included in itself, and the second instruction is a instruction transferring address data of storing means specified by a value obtained by adding a third value included in itself to the content of the register corresponding to the first value included in itself, to a register corresponding to a fourth value included in itself, and a second condition, in which a data length of the data specified by the first instruction is same as the third value included in the second instruction, are satisfied.

An eighth aspect of the data processor applies to a load instruction of a register relative indirect mode as both a first and a second instructions. Instruction executing means includes data transferring means for transferring two data to registers from data accessing means in parallel. Instruction decoding means includes means for decoding instructions of an instruction group consisting of a plurality of instructions including the first instruction and the succeeding second instruction. Furthermore, there is provided judging means for judging whether or not a first condition, in which the first instruction is an instruction transferring address data of storing means specified by a value obtained by adding a second value to a content of a register corresponding to a first value included in itself, to a register corresponding to a third value included in itself, and the second instruction is an instruction transferring address data of the storing means specified by a value obtained by adding a fourth value included in itself to the content of the register corresponding to the first value included in itself, to a register corresponding to a fifth value included in itself, and a second condition, in which a data length of the data specified by the first instruction is same as the difference between the fourth value included in the second instruction and the second value included in the first instruction, are satisfied.

A ninth aspect of the data processor applies to a store instruction of a register indirect mode as a first instruction, and a store instruction of a register relative indirect mode as a second instruction. Instruction executing means includes data transferring means for transferring data read out, in parallel, from two registers to data accessing means in parallel. Instruction decoding means includes means for decoding instructions of an instruction group consisting of a plurality of instructions including the first instruction and the succeeding second instruction. Furthermore, there is provided judging means for judging whether or not a first condition, in which the first instruction is an instruction transferring data of a register corresponding to a second value included in itself, to an address of storing means specified by a content of the register corresponding to a first value included in itself, and the second instruction is an instruction transferring data of a register corresponding to a fourth value included in itself, to an address of the storing means specified by a value obtained by adding a third value included in itself to a content of a register corresponding to the first value included in itself, and a second condition, in which a data length of data specified by the first instruction is same as the third value included in the second instruction, are satisfied.

A tenth aspect of the data processor applies to a store instruction of a register relative indirect mode as both a first and a second instructions. Instruction executing means includes data transferring means for transferring data read out, in parallel, from two registers to data accessing means in parallel. Instruction decoding means includes means for decoding instructions of an instruction group consisting of a plurality of instructions including the first instruction and the succeeding second instruction. Furthermore, there is provided judging means for judging whether or not a first condition, in which the first instruction is an instruction transferring data of a register corresponding to a third value included in itself, to an address of storing means specified by a value obtained by adding a second value included in itself to a content of a register corresponding to a first value included in itself, and the second instruction is an instruction transferring data of a register corresponding to a fifth value included in itself, to an address of the storing means specified by a value obtained by adding a fourth value included in itself to the content of the register corresponding to the first value included in itself, and a second condition, in which a data length of the data specified by the first instruction is same as the difference between the fourth value included in the second instruction and the second value included in the first instruction, are satisfied.

An 11th aspect of the data processor applies to an arithmetic operation instruction or a logical operation instruction as a first instruction and a logical operation instruction as a second instruction. Instruction executing means includes composite operating means for executing, with 3 inputs or 2 inputs, a composite operation of a first operation including, at least, either an arithmetic operation or a logical operation, and a logical operation as a second operation. Instruction decoding means includes means for decoding instructions of an instruction group consisting of a plurality of instructions including the first instruction and the succeeding second instruction. Furthermore, there is provided judging means for judging whether or not a first condition, in which the first instruction executes an operation included in the first operation executable by the composite operating means, and a second condition, in which the second instruction is the instruction executing an operation included in the second operation executable by the composite operating means, and a second instruction refers to the operation result of the first instruction, are satisfied.

A 12th aspect of the data processor applies to a logical operation instruction as a first instruction, and an arithmetic operation instruction, a logical operation instruction or a comparing instruction as a second instruction. Instruction executing means includes composite operating means for executing, with 3 inputs or 2 inputs, a composite operation of the logical operation as a first operation and a second operation including, at least, one of the arithmetic operation, logical operation or comparing operation. Instruction decoding means includes means for decoding instructions of an instruction group consisting of a plurality of instructions including the first instruction and the succeeding second instruction. Furthermore, there is provided judging means for judging whether or not a first condition, in which the first instruction executes an operation included in the first operation executable by the composite operating means, and a second condition, in which the second instruction is an instruction executing an operation included in the second operation executable by the composite operating means, and the second instruction refers to an operation result of the first instruction, are satisfied.

A 13th aspect of the data processor applies to, at least, one instruction of an add instruction and a subtract instruction as a first instruction, and, at least, the add instruction or the subtract instruction of an immediate specified by an instruction code as a second instruction. Instruction executing means includes composite operating means for executing, with 3 inputs or 2 inputs, a composite operation of a first operation including, at least, one of the add operation or the subtract operation, and a second operation including, at least, one of the add operation and the subtract operation of an immediate specified by an instruction code. Instruction decoding means includes means for decoding instructions of an instruction group consisting of a plurality of instructions including the first instruction and the succeeding second instruction. Furthermore, there is provided judging means for judging whether or not a first condition, in which either the first instruction or the second instruction executes the first operation executable by the composite operating means, and a second condition, in which either the first instruction or the second instruction is an instruction executing the second operation executable by the composite operating means, and the second instruction refers to an operation result of the first instruction, are satisfied.

A 14th aspect of the data processor applies to an add instruction as a first instruction and an increment instruction as a second instruction. Instruction executing means includes composite operating means executing a composite operation of an add operation as a first operation and an increment operation as a second operation. Instruction decoding means includes means for decoding instructions of an instruction group consisting of a plurality of instructions including the first instruction and the succeeding second instruction. Furthermore, there is provided judging means for judging whether or not a first condition, in which either the first instruction or the second instruction executes the first operation executable by the composite operating means, and a second condition, in which either the first instruction or the second instruction is an instruction executing the second operation executable by the composite operating means, and the second instruction refers to an operation result of the first instruction, are satisfied.

A 15th aspect of the data processor applies to a subtract instruction as a first instruction and a decrement instruction as a second instruction. Instruction executing means includes composite operating means for executing a composite operation of a subtract operation as a first operation and a decrement operation as a second operation. Instruction decoding means includes means for decoding instructions of an instruction group consisting of a plurality of instructions including the first instruction and the succeeding second instruction. Furthermore, there is provided judging means for judging whether or not a first condition, in which either the first instruction or the second instruction executes the first operation executable by the composite operating means, and a second condition, in which either the first instruction or the second instruction is an instruction executing the second operation executable by the composite operating means, and the second instruction refers to an operation result of the first instruction, are satisfied.

A 16th aspect of the data processor applies to instructions reading data from storing means as both a first and a second instructions. Instruction executing means includes data transferring means for transferring two data to the instruction executing means from data accessing means in parallel. Instruction decoding means includes means for decoding instructions of an instruction group consisting of a plurality of instructions including the first instruction and the succeeding second instruction. Furthermore, there is provided judging means for judging whether or not a condition, in which the first instruction is an instruction reading data from the storing means and the second instruction is an instruction reading data in an area following the data read by the first instruction of the storing means, is satisfied.

A 17th aspect of the data processor applies to a load instruction as both the first and the second instructions in the 16th aspect.

An 18th aspect of the data processor applies to an instruction writing data into storing means as both a first and a second instructions. Instruction executing means includes data transferring means for transferring two data to data accessing means in parallel. Instruction decoding means includes means for decoding instructions of an instruction group consisting of a plurality of instructions including the first instruction and the succeeding second instruction. Furthermore, there is provided judging means for judging whether or not a condition, in which the first instruction is an instruction writing data into the storing means and the second instruction is an instruction writing data into an area following the data written by the first instruction of the storing means, is satisfied.

A 19th aspect of the data processor applies to a store instruction as both the first and the second instructions in the 18th aspect.

A 20th aspect of the data processor is constituted such that, in the first to 16th and 18th aspects, the instruction decoding means decodes the first instruction and the succeeding second instruction in parallel.

In the first aspect of the data processor, when the judging means judges that both the first and second conditions are satisfied, the instruction executing means makes the composite operating means execute two composite operations of the shift processing of the first instruction and the operation processing of the second instruction so that the first and second instructions are executed in parallel.

In the second aspect of the data processor, when the judging means judges that both the first and second conditions are satisfied, the instruction executing means makes the composite operating means execute two composite operations of the operation processing of the first instruction and the shift processing of the second instruction so that the first and second instructions are executed in parallel.

In the third aspect of the data processor, when the judging means judges that both the first and second conditions are satisfied, the instruction executing means makes the first operating means and second operating means execute the operation processing of the first instruction in parallel, and makes the data transferring means execute the data transfer processing of the first instruction and the data transfer processing of the second instruction in parallel so that the first and second instructions are executed in parallel.

In the fourth aspect of the data processor, when the judging means judges that both the first and second conditions are satisfied, the instruction executing means makes the data transferring means execute, in parallel, the data transfer processing of the first instruction from the data accessing means to the register corresponding to the value included in the first instruction, and the data transfer processing of the second instruction from the data accessing means to the register corresponding to the value included in the second instruction so that the first and second instructions are executed in parallel.

In the fifth aspect of the data processor, when the judging means judges that the condition is satisfied, the instruction executing means makes the data transferring means execute, in parallel, the data transfer processing of the first instruction from the data accessing means to the register corresponding to the value included in the first instruction, and the data transfer processing of the second instruction from the data accessing means to the register corresponding to the value included in the second instruction so that the first and second instructions are executed in parallel.

In the sixth aspect of the data processor, when the judging means judges that the condition is satisfied, the instruction executing means makes the data transferring means executes in parallel, the data transfer processing of the first instruction to the data accessing means from the register corresponding to the value included in the first instruction, and the data transfer processing of the second instruction to the data accessing means from the register corresponding to the value included in the second instruction so that the first and second instruction are executed in parallel.

In the seventh aspect of the data processor, when the judging means judges that both the first and second conditions are satisfied, the instruction executing means makes the data transferring means execute, in parallel, the data transfer processing of the first instruction and the data transfer processing of the second instruction so that the first and second instructions are executed in parallel.

In the eighth aspect of the data processor, when the judging means judges that both the first and second conditions are satisfied, the instruction executing means makes the data transferring means execute, in parallel, the data transfer processing of the first instruction and the data transfer processing of the second instruction so that the first and second instructions are executed in parallel.

In the ninth aspect of the data processor, when the judging means judges that the condition is satisfied, the instruction executing means makes the data transferring means execute, in parallel, the data transfer processing of the first instruction to the data accessing means from the register corresponding to the second value, and the data transfer processing of the second instruction to the data accessing means from the register corresponding to the fourth value so that the first and second instructions are executed in parallel.

In the tenth aspect of the data processor, when the judging means judges that the condition is satisfied, the instruction executing means makes the data transferring means execute, in parallel, the data transfer processing of the first instruction to the data accessing means from the register corresponding to the third value, and the data transfer processing of the second instruction to the data accessing means from the register corresponding to the fifth value so that the first and second instruction are executed in parallel.

In the 11th aspect of the data processor, when the judging means judges that both the first and second conditions are satisfied, the instruction executing means makes the composite operating means execute two composite operations of the first instruction processing and the second instruction processing so that the first and second instructions are executed in parallel.

In the 12th aspect of the data processor, when the judging means judges that both the first and second conditions are satisfied, the instruction executing means makes the composite operating means execute two composite operations of the first instruction processing and the second instruction processing so that the first and second instructions are executed in parallel.

In the 13th aspect of the data processor, when the judging means judges that both the first and second conditions are satisfied, the instruction executing means makes the composite operating means execute two composite operations of the first instruction processing and the second instruction processing so that the first and second instructions are executed in parallel.

In the 14th aspect of the data processor, when the judging means judges that both the first and second conditions are satisfied, the instruction executing means makes the composite operating means execute two composite operations of the first instruction processing and the second instruction processing so that the first and second instruction are executed in parallel.

In the 15th aspect of the data processor, when the judging means judges that both the first and second condition are satisfied, the instruction executing means makes the composite operating means execute two composite operations of the first instruction processing and the second instruction processing so that the first and second instructions are executed in parallel.

In the 16th and 17th aspects of the data processor, when the judging means judges that the condition is satisfied, the instruction executing means makes the data transferring means execute, in parallel, the data transfer processing of the first instruction to the instruction executing means from the data accessing means, and the data transfer processing of the second instruction to the instruction executing means from the data accessing means so that the first and second instructions are executed in parallel.

In the 18th and 19th aspects of the data processor, when the judging means judges that the condition is satisfied, the instruction executing means makes the transferring means execute, in parallel, the data transfer processing of the first instruction to the data accessing means, and the data transfer processing of the second instruction to the data accessing means so that the first and second instructions are executed In the 20th aspect of the data processor, in the first to 16th and 18th aspects, the first instruction and the succeeding second instruction are decoded in parallel.

The above and further objects and features of the invention will more fully be apparent from the following detailed description with accompanying drawings.

BRIEF DESCRIPTION OF THE DRAWINGS

FIG. 21 is a schematic diagram showing a format of an addressing mode according to one embodiment of a data processor, FIG. 28 is a schematic diagram showing a configuration unit of an instruction of a data processor, FIGS. 47A and 47B are flow charts of the case where two instructions are executed in parallel by a data processor, FIGS. 49A and 49B are flow charts showing a processing flow of the case where two instructions are executed in parallel by a data processor, FIGS. 51A and 51B are flow charts showing a processing flow of the case where two instructions are executed in parallel by a data processor, FIGS. 52A and 52B are flow charts showing a processing flow of the case where two instructions are executed in parallel by a data processor, FIGS. 53A and 53B are flow charts showing a processing flow of the case where two instructions are executed in parallel by a data processor, FIGS. 54A and 54B are flow charts showing a processing flow of the case where two instructions are executed in parallel by a data processor, FIGS. 55A and 55B are flow charts showing a processing flow of the case where two instructions are executed in parallel by a data processor, FIGS. 56A and 56B are flow charts showing a processing flow of the case where two instructions are executed in parallel by a data processor, FIGS. 57A and 57B are flow charts showing a processing flow of the case where two instructions are executed in parallel by a data processor, FIG. 58 is a schematic diagram showing a position of instruction codes on an II bus of the case where two load instructions whose source operands are specified by a register direct/indirect mode can be decoded in parallel by a data processor, FIGS. 59A and 59B are flow charts showing a processing flow of the case where two instructions are executed in parallel by a data processor, FIGS. 60A and 60B are flow charts showing a processing flow of the case where two instructions are executed in parallel by a data processor.

DESCRIPTION OF THE PREFERRED EMBODIMENTS

In the following, the present invention will be particularly described with reference to the drawings showing its embodiments.

Configuration of System using Data Processor

Figure 1:
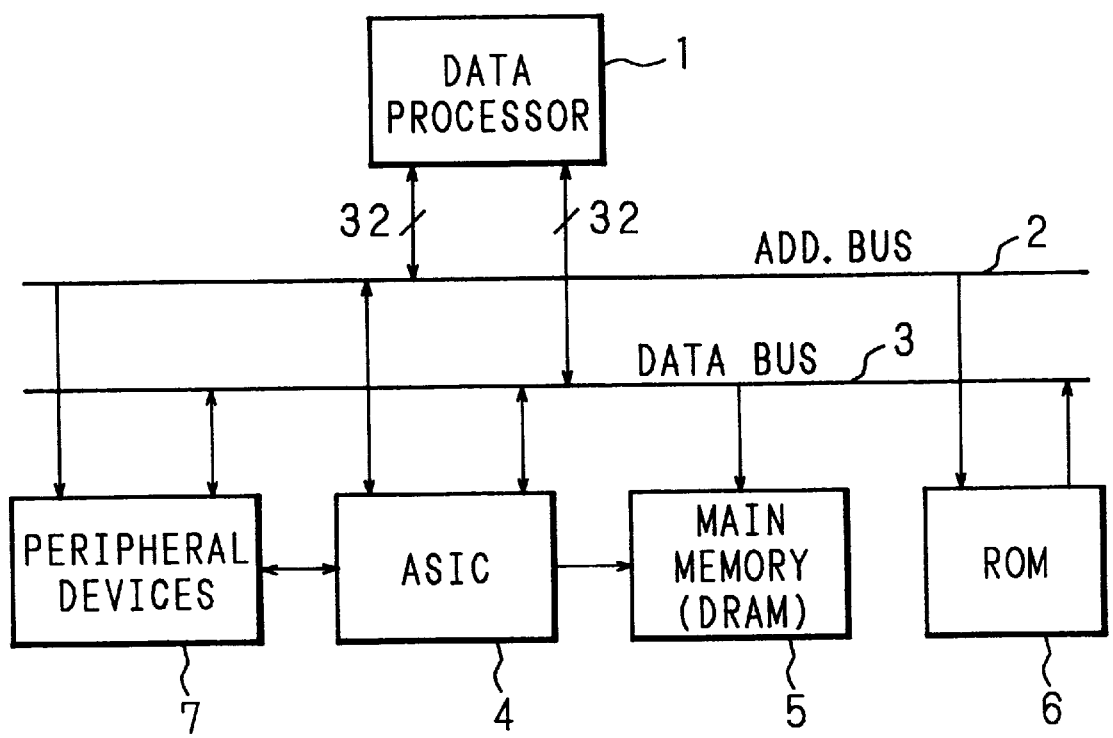
FIG. 1 is a block diagram showing a configuration of a system using a data processor.

FIG. 1 is a block diagram showing a configuration example of a system using a data processor 1.

The data processor 1 of the invention includes a 32-bit address bus 2 and a 32-bit data bus, and accesses a main memory (DRAM) 5, a ROM 6 and peripheral devices 7 by buses 2 and 3. Control circuits such as a DRAM controller, a DMA controller and a timer are built in an ASIC 4. Accordingly, these circuits are not included in the data processor 1 of the invention.

Accessing to the main memory 5, a single transferring by which data of 32 bits or less is accessed by outputting one address at the time of one accessing, and a burst transferring by which four 32-bit data (16 bytes) are accessed by outputting one address at the time of one accessing are possible.

Instruction of a Data Processor

Instruction Format

An instruction of a data processor 1 is formed on a 16-bit unit basis, being variable in length. No instruction of an odd number byte length is used herein.

The data processor 1 has an instruction format specifically devised for the purpose of making frequently-used instructions to be in a short format. For example, as to a two-operand instruction, two formats are provided; a general format which has basically a configuration of "four bytes+ extension part(s)" and allows the utilization of all addressing modes and a short format allowing only the use of a frequently used instruction and an addressing mode.

The meanings of symbols appearing in the instruction format of the data processor 1 shown in FIG. 3 to FIG. 11 are as follows:

—: Field for operation code

: Field in which literal or immediate enters

Ea: Field for specifying an operand in a general type 8-bit addressing mode

Sh: Field for specifying an operand in a short type 6-bit addressing mode

Rn: Field for specifying an operand on a register file by the register number

Figure 2:
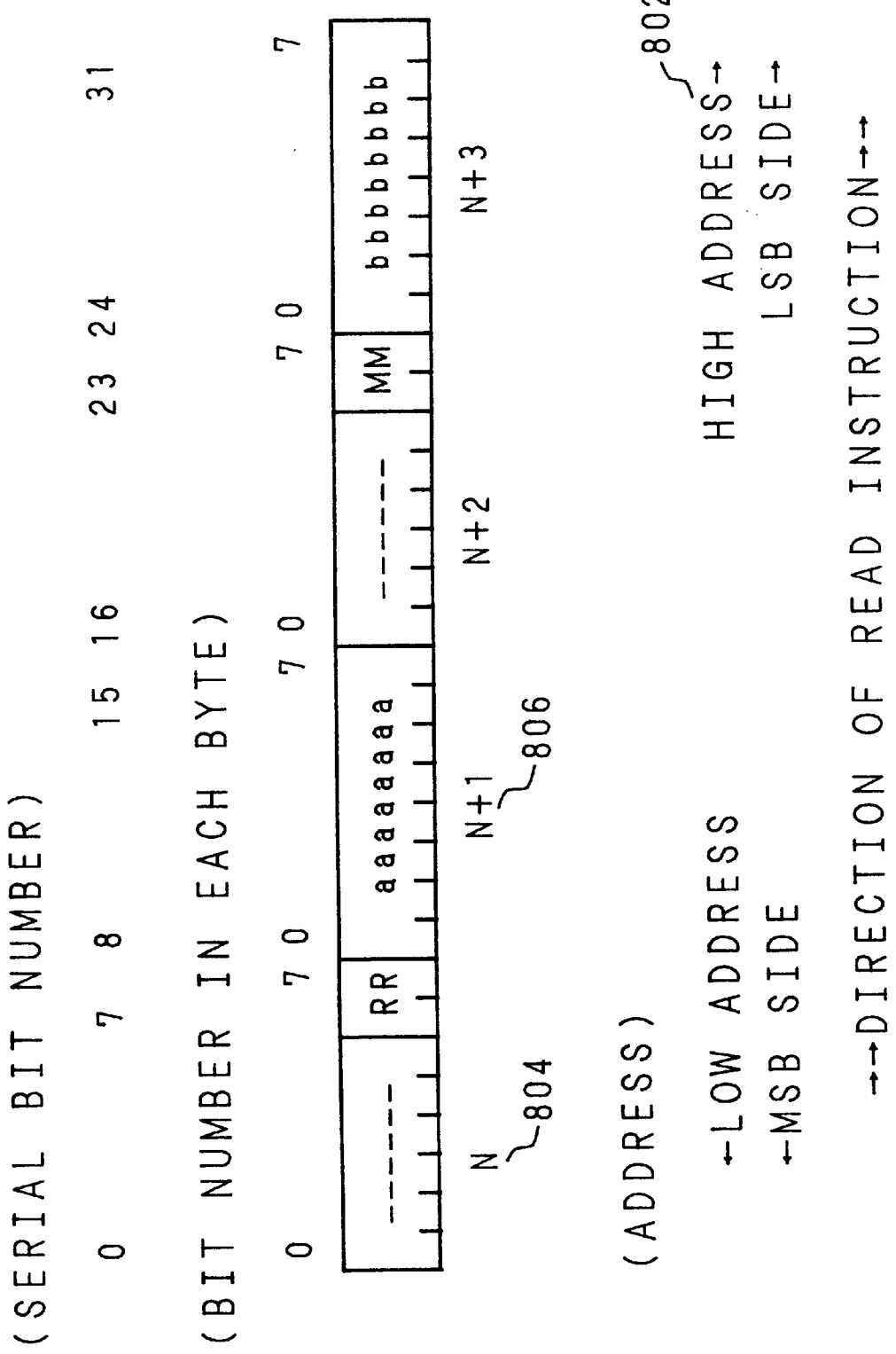
FIG. 2 is a schematic diagram showing an arrangement state of an instruction on a memory of a data processor.

As shown in FIG. 2, the right side 802 of the instruction data is the LSB side and is higher address. The instruction format can be discriminated only after an address N 804 and an address N+1 806 are checked. This is because of a premise that the instruction is fetched and decoded on a 16-bit (half word) unit basis without fail.

In the data processor 1, in case of any format, the extension part of Ea or Sh of each operand is sure to be positioned immediately after 16 bits (half word) including the basic part of that Ea or Sh. This takes precedence over the immediate data specified implicitly by the instruction or the extension part peculiar to the instruction. Accordingly, as to an instruction of four or more bytes, there are cases where the operation code of the instruction is decomposed by the extension part of Ea.

Also, as described later, in the case where another extension part is further appended to the extension part of Ea by a chained addressing mode, this part takes precedence over the next operation code. In addition, the instruction format of the data processor 1 is disclosed in detail in Japanese Patent Application Laid-Open No. 64-91225 (1989) and U.S. Pat. No. 5,029,069.

Short-Format Two-Operand Instruction

FIG. 3 to FIG. 6 are schematic diagrams showing short format of the two-operand instruction.

Figure 3:
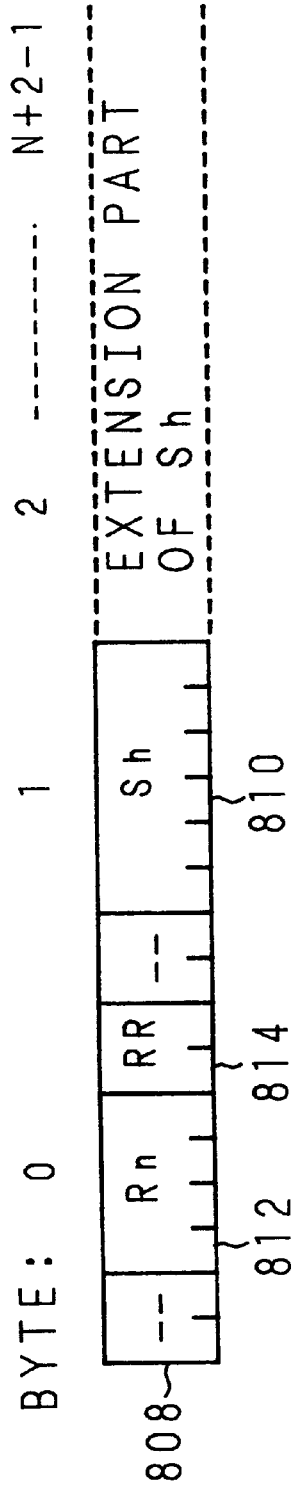
FIG. 3 is a schematic diagram showing an instruction format according to one embodiment of a data processor.

FIG. 3 is a schematic diagram showing a format 808 of instruction of operation between memory and register. This format includes an L-format wherein the source operand side is memory and an S-format wherein the destination operand side is memory.

In the L-format, symbol Sh 810 represents the specifying field of the source operand, symbol Rn 812 represents the specifying field of the register of the destination operand and RR 814 represents specifying of the operand size of Sh 810, respectively. The size of the destination operand located on the register is fixed to 32 bits. In the case where the size of the register side differs from that of the memory side and the size of the source side is smaller, sign extension is performed. And, in some instructions (addition instruction, subtraction instruction), the operand size of the source is fixed to a word. In this case, the RR field is the operation code. In the S-format, symbol Sh 810 represents the specifying field of the destination operand, symbol Rn 812 represents the register specifying field of the source operand and RR 814 represents specifying field of the operand size of Sh 810, respectively. The size of the source operand located on the register is fixed to 32 bits. In the case where the size of the register side differs from that of the memory side and the size of the source side is larger, truncating of the overflow portion and overflow check are performed.

Figure 4:
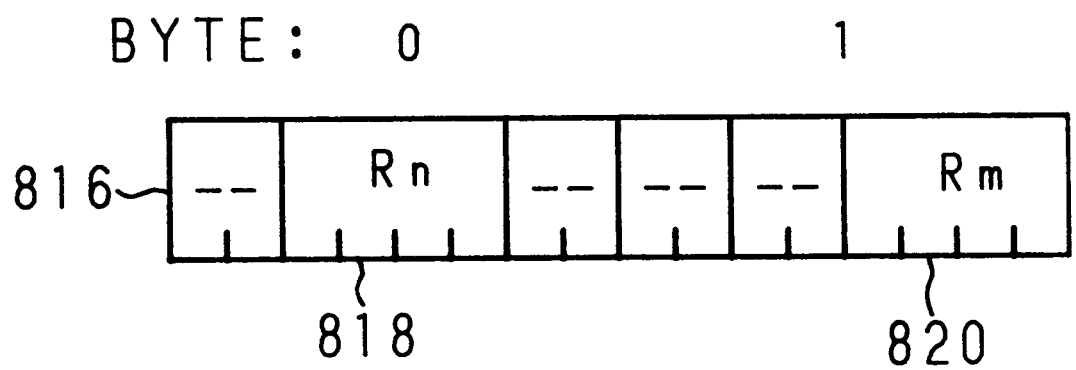
FIG. 4 is a schematic diagram of an instruction format according to one embodiment of a data processor.

FIG. 4 is a schematic diagram showing a format (R-format) 816 of instruction of operation between register and register. In this format, symbol Rn 818 represents the specifying field of the destination register and symbol Rm 820 represents the specifying field of the source register. The operand size is limited to only 32 bits.

Figure 5:
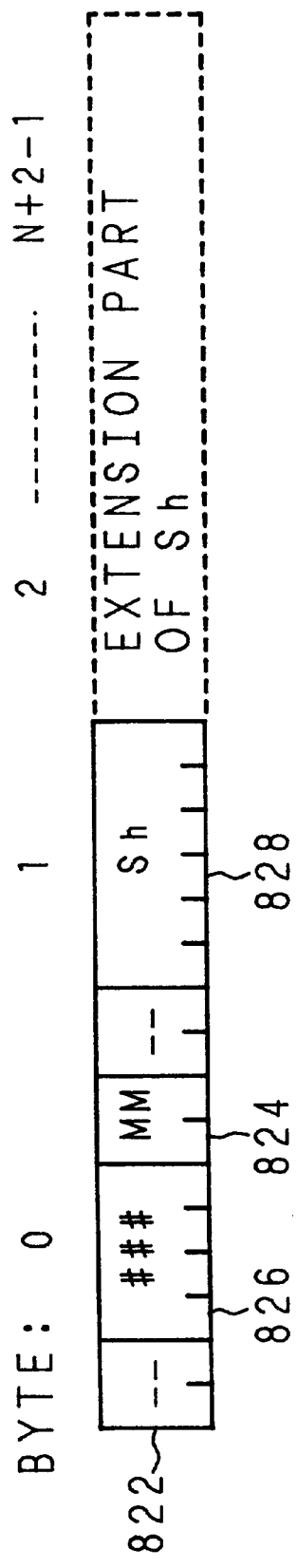
FIG. 5 is a schematic diagram of an instruction format according to one embodiment of a data processor.

FIG. 5 is a schematic diagram showing a format (Q-format) 822 of instruction of operation between literal and memory. In this format, symbol MM 824 represents the specifying field of the destination operand size, symbol ### 826 represents the specifying field of the source operand due to literal and symbol Sh 828 represents the specifying field of the destination operand.

Figure 6:
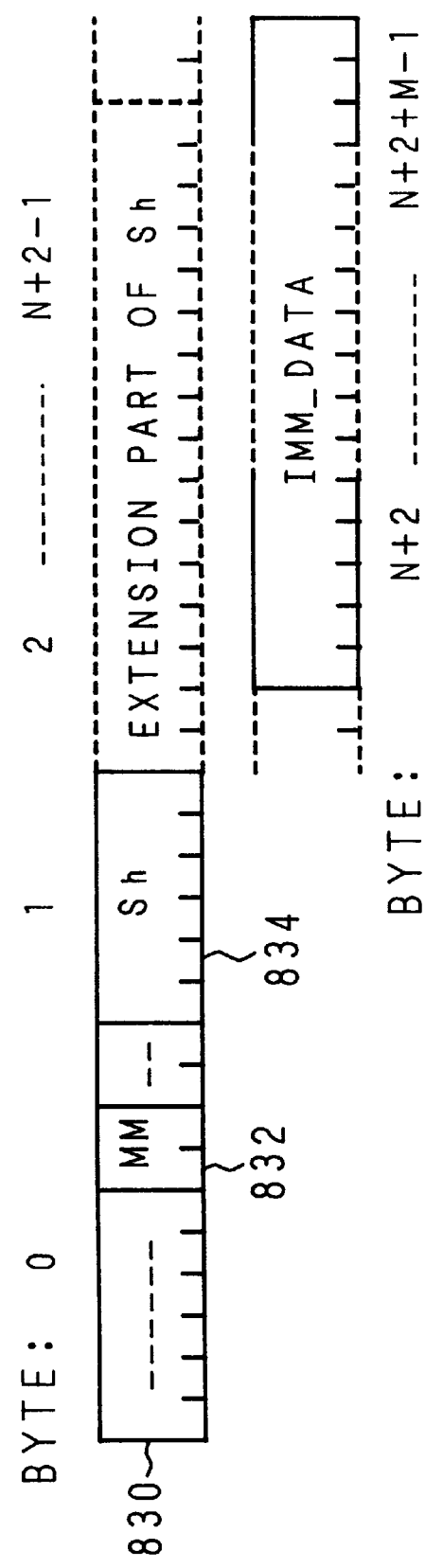
FIG. 6 is a schematic diagram of an instruction format according to one embodiment of a data processor.

FIG. 6 is a schematic diagram showing a format (I-format) 830 of instruction of operation between immediate and memory. In this format, symbol MM 832 represents the specifying field of the operand size (common in source and destination), and symbol Sh 834 represents the specifying field of the destination operand. The I-format immediate size is common with the operand size on the destination side and is 8, 16 and 32 bits, and zero extension and sign extension are not performed.

General-Format One-Operand Instruction

Figure 7:
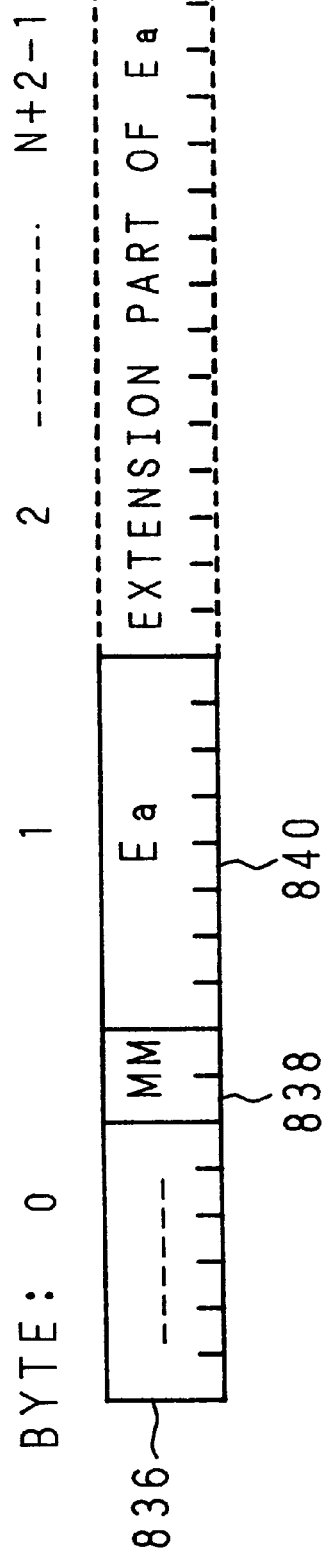
FIG. 7 is a schematic diagram of an instruction format according to one embodiment of a data processor.

FIG. 7 is a schematic diagram showing a general format (G1-format) 836 of one-operand instruction. In this format, symbol MM 838 represents the specifying field of the operand size. Some of the G1-format instructions comprise an extension part besides the extension part of Ea 840. There are also instructions using no MM 838.

General-Format Two-Operand Instruction

Figure 8:
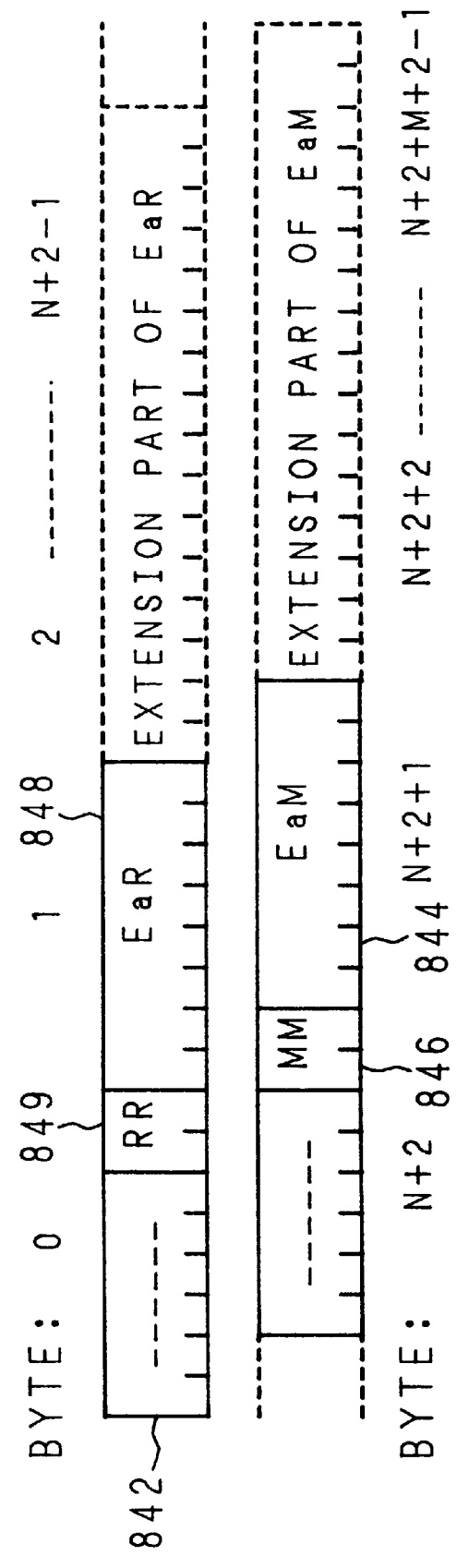
FIG. 8 is a schematic diagram of an instruction format according to one embodiment of a data processor.
Figure 9:
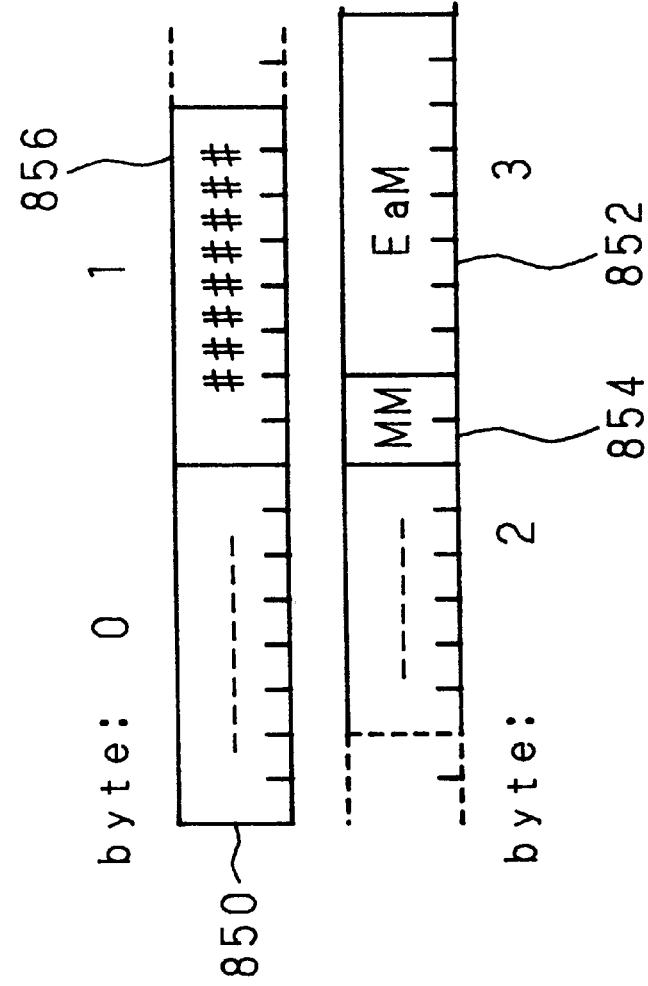
FIG. 9 is a schematic diagram of an instruction format according to one embodiment of a data processor.
Figure 10:
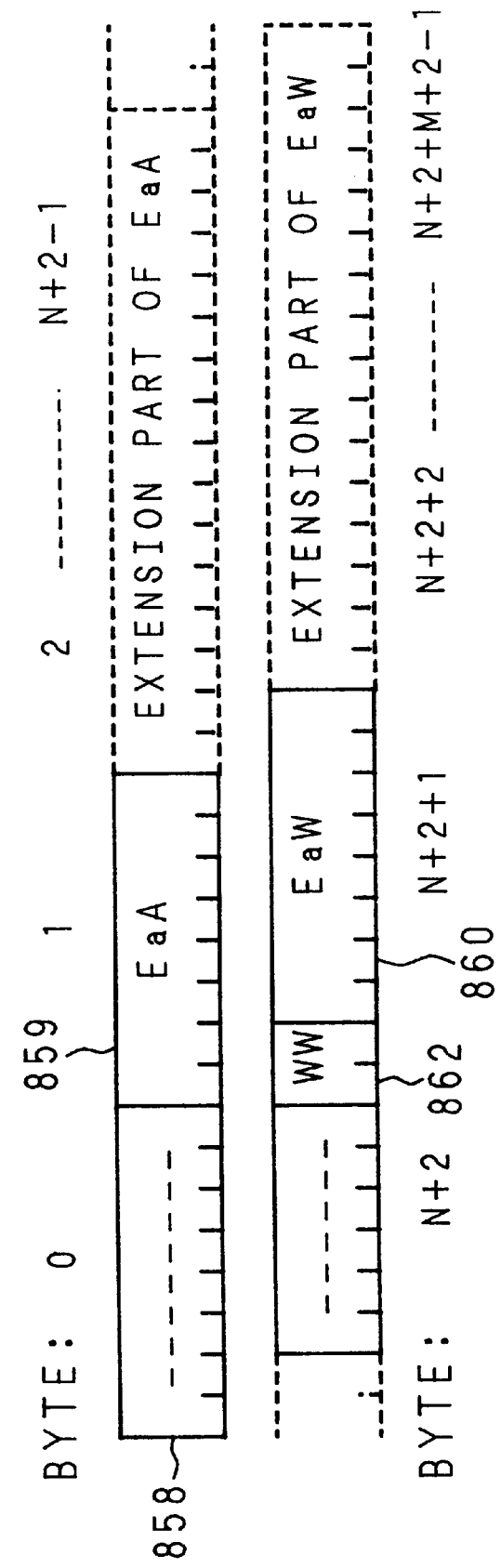
FIG. 10 is a schematic diagram of an instruction format according to one embodiment of a data processor.
Figure 11:
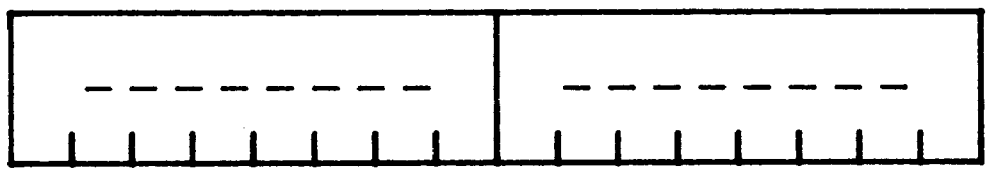
FIG. 11 is a schematic diagram of an instruction format according to one embodiment of a data processor.

FIG. 8 to FIG. 10 are schematic diagrams showing general format of two-operand instruction. This format comprises an instruction having a maximum of two operands of the general-type addressing mode which are specified by eight bits. There are cases where the total number of operands becomes three or more.

FIG. 8 is a schematic diagram showing a format (G-format) 842 of instruction in which the first operand needs reading of memory. In this format, symbol EaM 844 represents the specifying field of the destination operand, symbol MM 846 represents the specifying field of the destination operand size, EaR 848 represents the specifying field of the source operand, and RR 849 represents the specifying field of the source operand size. In addition, some of the G-format instructions comprise an extension part besides the extension part of EaM 844 and EaR 848.

FIG. 9 is a schematic diagram showing a format (E-format) 850 of instruction whose first operand is 8-bit immediate. In this format, symbol EaM 852 represents the specifying field of the destination operand, symbol MM 854 represents the specifying field of the destination operand size, and the symbol #### . . . 856 represents the source operand.

The E-format and the I-format are similar to each other in function. The E-format, however, is basically derived from the two-operand general format (G-format), and whose source operand size is fixed at 8 bits, and whose destination operand size can be selected from 8/16/32 bits. That is to say, on the assumption of operations between different sizes, 8-bit source operand is zero extended or sign extended according to the destination size.

FIG. 10 is a schematic diagram showing a format (GAformat) 858 of instruction whose first operand is only address calculation. In this format, symbol EaW 860 represents the specifying field of the destination operand, symbol WW 862 represents the specifying field of the destination operand size, and symbol EaA 859 represents the specifying field of the source operand. In addition, as the source operand, the calculation result itself of the effective address is used.

The Other Instruction

Besides the aforementioned instructions, there are some formats. In the schematic diagram of FIG. 11, an instruction in which all of 16 bits function as operation codes, or an instruction in which a part of operation code field of 16 bits is assigned as immediate. And some instructions have peculiar extension.

Addressing Mode

The methods of specifying the addressing mode of the data processor 1 include the short type specified by six bits including the register and the general type specified by eight bits.

Meanings of symbols used in the format diagram shown in FIG. 12 to FIG. 22 is as follows:

Rn: Register specifying field (Sh): Specifying method by the short-type addressing mode of six bits (Ea): Specifying method by the general-type addressing mode of eight bits In the format diagram, the portion surrounded by a broken line shows the extension part.

Basic Addressing Modes

The data processor 1 supports various addressing modes. Among them, the basic addressing modes supported by the data processor 1 include a register direct mode, a register indirect mode, a register relative indirect mode, an immediate mode, an absolute mode, a Program Counter (PC) relative indirect mode, a stack pop mode and a stack push mode.

Figure 12:
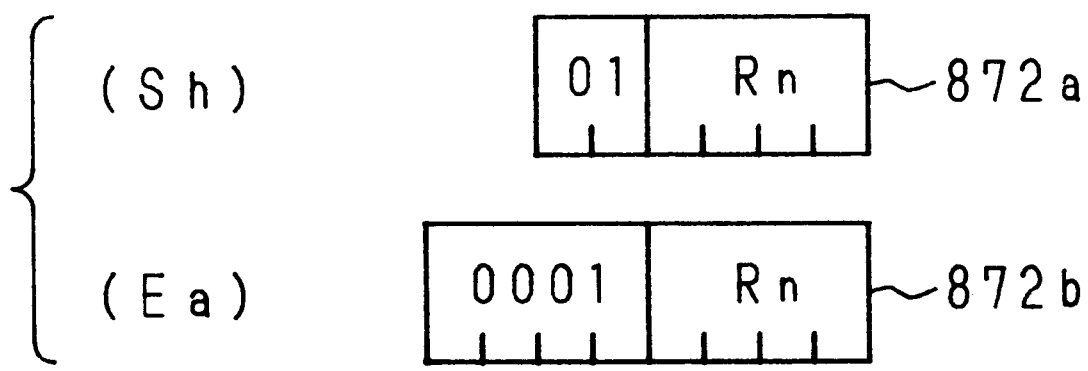
FIG. 12 is a schematic diagram showing a format of an addressing mode according to one embodiment of a data processor.
Figure 13:
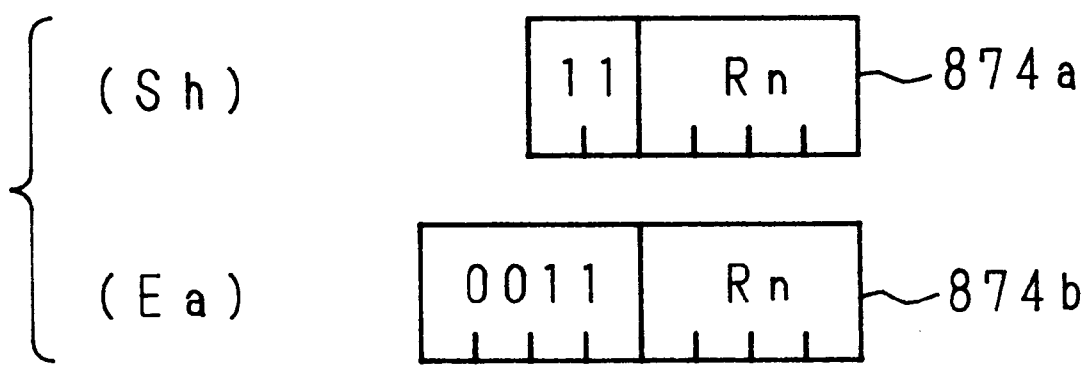
FIG. 13 is a schematic diagram showing a format of an addressing mode according to one embodiment of a data processor.

The register direct mode is an addressing mode which takes the content of a register intact as an operand. FIG. 12 is a schematic diagram of the format thereof. Each symbol Rn 872a, 872b shows the number of the general-purpose register or the FPU register. The register indirect mode is an addressing mode which takes as an operand the content of the memory at the address specified by the content of a general purpose register. FIG. 13 is a schematic diagram of the format thereof. Symbol Rn 874a, 874b shows the number of the general-purpose register.

Figure 14:
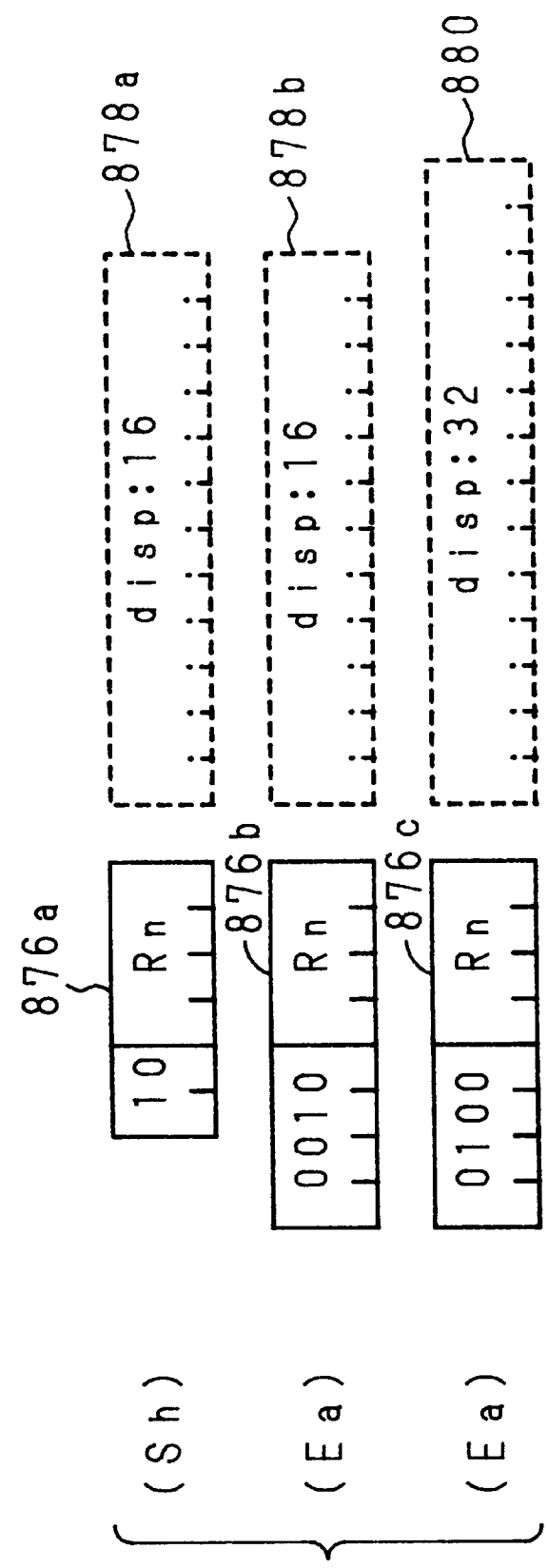
FIG. 14 is a schematic diagram showing a format of an addressing mode according to one embodiment of a data processor.

The register relative indirect mode includes two kinds due to 16 bits or 32 bits of the displacement. Each of them is an addressing mode which makes as an operand the content of the memory whose address is the value obtained by adding the value of displacement of 16 bits or 32 bits to the content of a general-purpose register. FIG. 14 is a schematic diagram of the format thereof. In the figure, symbol Rn 876a, 876b, 876c shows the number of the general-purpose register. Each symbol disp:16 878a, 878b and disp:32 880 show the displacement of 16 bits and the displacement of 32 bits, respectively. The displacement is handled as a signed number.

Figure 15:
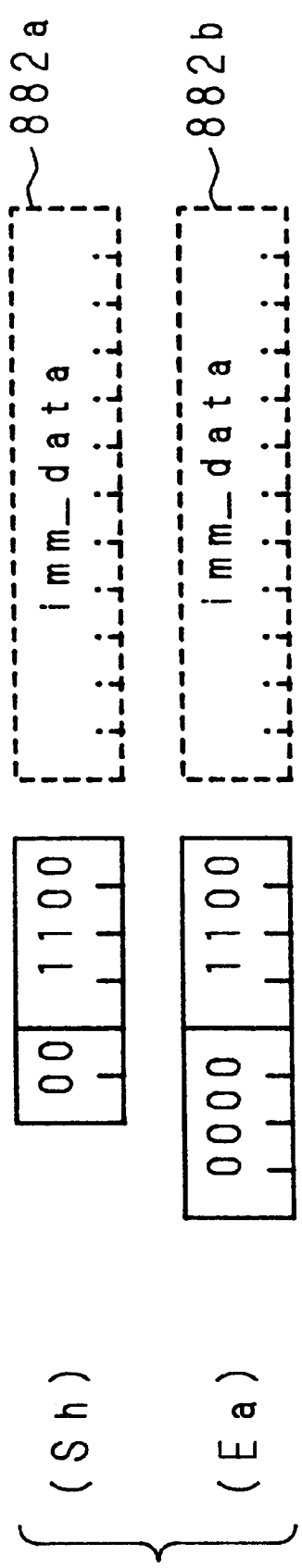
FIG. 15 is a schematic diagram showing a format of an addressing mode according to one embodiment of a data processor.

The immediate mode is an addressing mode which makes as an operand the bit pattern specified in the instruction code assuming it to be a binary number. FIG. 15 is a schematic diagram of the format thereof. Symbol imm_data 882a, 882b shows the immediate. The size of imm_data is specified in the instruction as the operand size.

Figure 16:
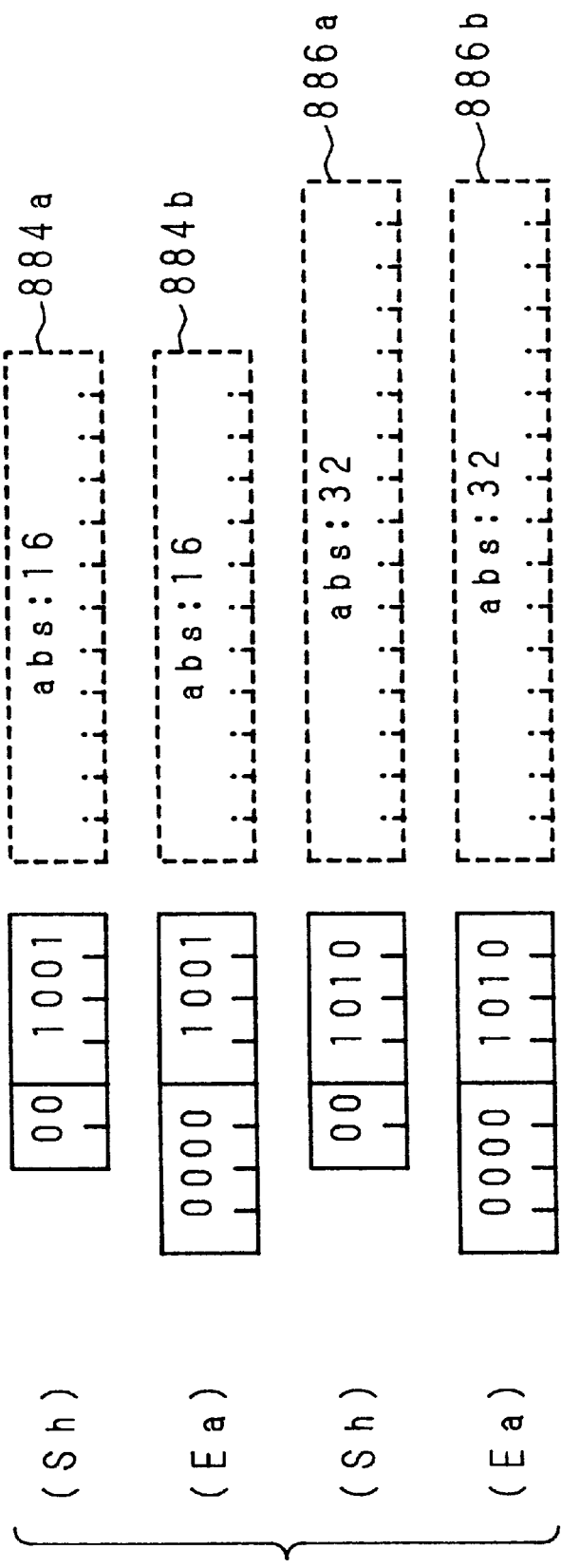
FIG. 16 is a schematic diagram showing a format of an addressing mode according to one embodiment of a data processor.

The absolute mode includes two kinds of field due to 16 bits and 32 bits of the address value. Each of them is an addressing mode which makes as an operand the content of the memory whose address is the bit pattern of 16 bits or 32 bits specified in the instruction code. FIG. 16 is a schematic diagram showing the format thereof. Each symbol abs:16 884a, 884b and abs:32 886a, 886b shows the address value of 16 bits and 32 bits, respectively. When the address is shown by abs:16, the specified address value is sign-extended to 32 bits.

Figure 17:
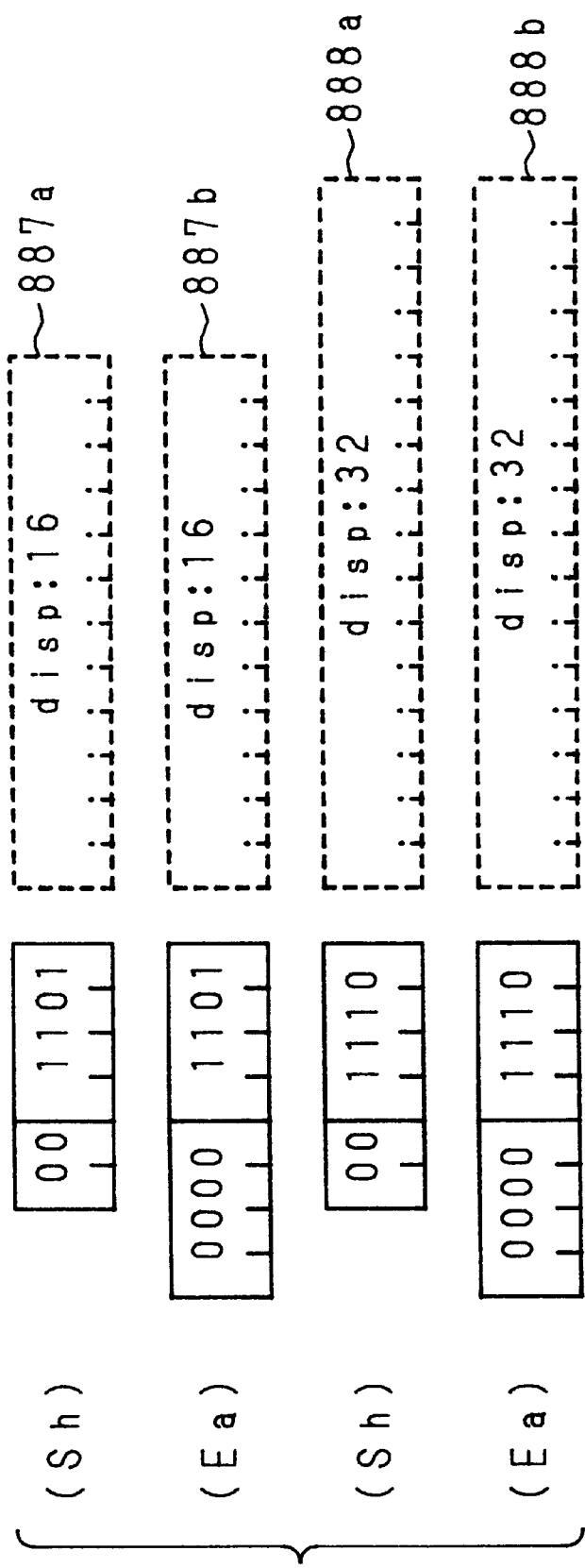
FIG. 17 is a schematic diagram showing a format of an addressing mode according to one embodiment of a data processor.
Figure 18:
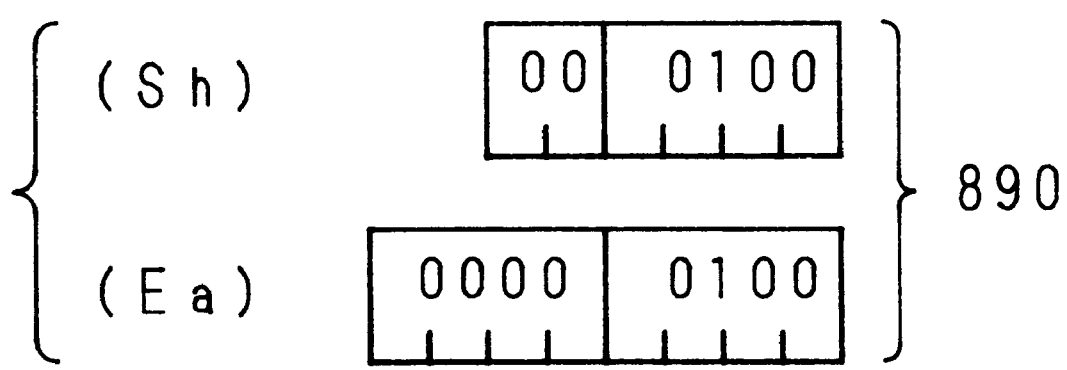
FIG. 18 is a schematic diagram showing a format of an addressing mode according to one embodiment of a data processor.

The PC relative indirect mode includes two kinds field due to 16 bits or 32 bits of the displacement. Each of them is an addressing mode which makes as an operand the content of the memory whose address is the value of the content of a program counter whereto the displacement of 16 bits or 32 bits is added. FIG. 17 is a schematic diagram showing the format thereof. Each symbol disp:16 887a, 887b and disp:32 888a, 888b shows the displacement of 16 bits and the displacement of 32 bits, respectively. The displacement is handled as a signed number. In the PC relative indirect mode, the value of the program counter to be referred is the start address of the instruction comprising the operand. In the case where the value of the program counter is referred in the chained addressing mode, the start address of the instruction is also used as a reference value of PC relative mode. The stack pop mode is an addressing mode which makes as an operand the content of the memory whose address is the content of a stack pointer (SP, R15). After operand access, the SP is incremented by the operand size. For example, in the case where 32-bit data is handled, the SP is updated by +4 after the operand access. Designating of the stack pop mode for operands of sizes of B (byte) and H (half word) can also be performed, and the SP is updated by +1 and +2, respectively. FIG. 18 is a schematic diagram of the format 890 thereof.

Figure 19:
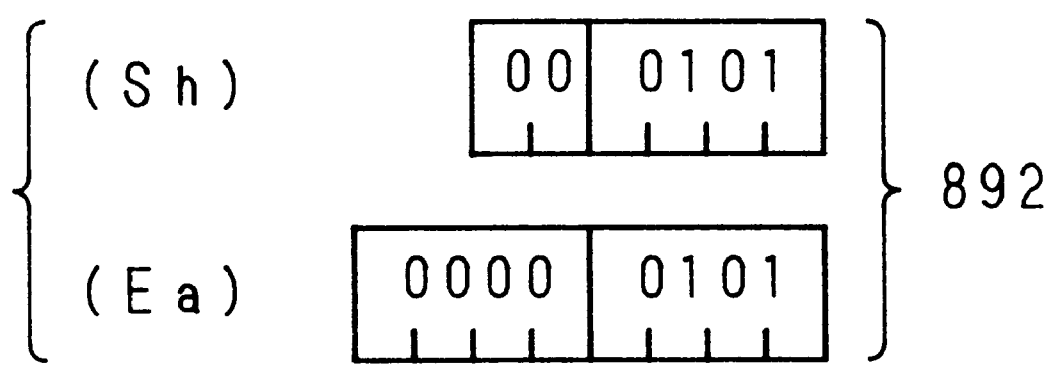
FIG. 19 is a schematic diagram showing a format of an addressing mode according to one embodiment of a data processor.

The stack push mode is an addressing mode which makes as an operand the content of the memory whose address is the content of the SP decremented by the operand size. In the stack push mode, the SP is decremented before operand access. For example, when handling 32-bit data, the SP is updated by −4 before operand access. It is also possible to specify the stack push mode for operands of sizes of B and H, and the SP is updated by −1 and −2, respectively. FIG. 19 is a schematic diagram showing the format 892 thereof.

Chained Addressing Mode

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized. The chained addressing mode of an instruction of the data processor 1 is an addressing mode based on such a conception.

When specifying the chained addressing mode, in the basic addressing mode specifying field, one is specified from among three kinds of specifying methods viz. a register base chained addressing mode, a PC base chained addressing mode and an absolute base chained addressing mode.

Figure 20:
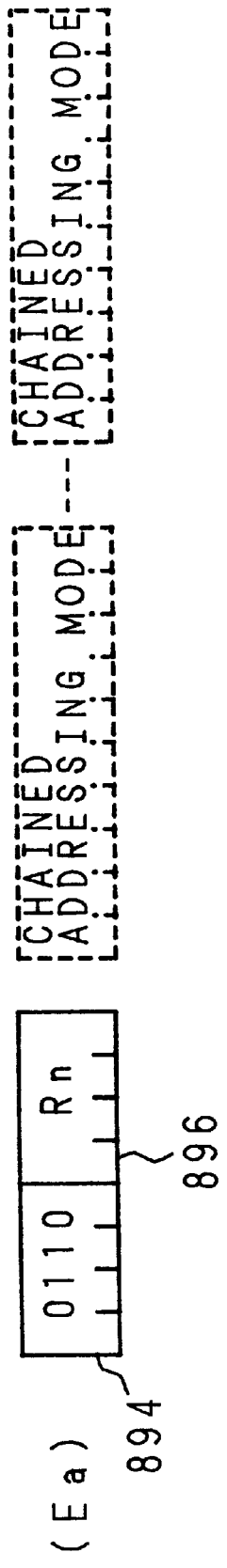
FIG. 20 is a schematic diagram showing a format of an addressing mode according to one embodiment of a data processor.

The register base chained addressing mode is an addressing mode making the value of general-purpose register as the base value of the chained addressing to be extended. FIG. 20 is a schematic diagram showing the format 894 thereof. Symbol Rn 896 shows the number of the general-purpose register.

Figure 22:
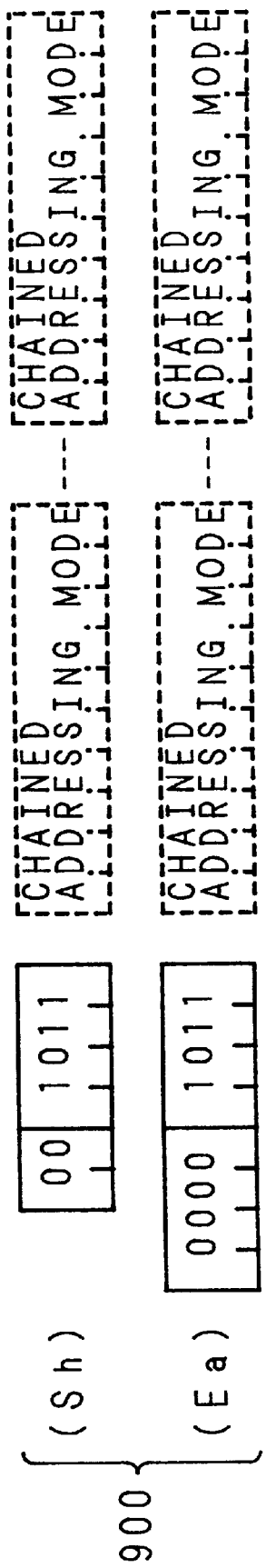
FIG. 22 is a schematic diagram showing a format of an addressing mode according to one embodiment of a data processor.

The PC base chained addressing mode is an addressing mode making the value of the program counter (PC) as the base value of the chained addressing to be extended. FIG. 21 is a schematic diagram showing the format 898 thereof. The absolute base chained addressing mode is an addressing mode making zero as the base value of the chained addressing to be extended. FIG. 22 is a schematic diagram of the format 900 thereof.

Figure 23:
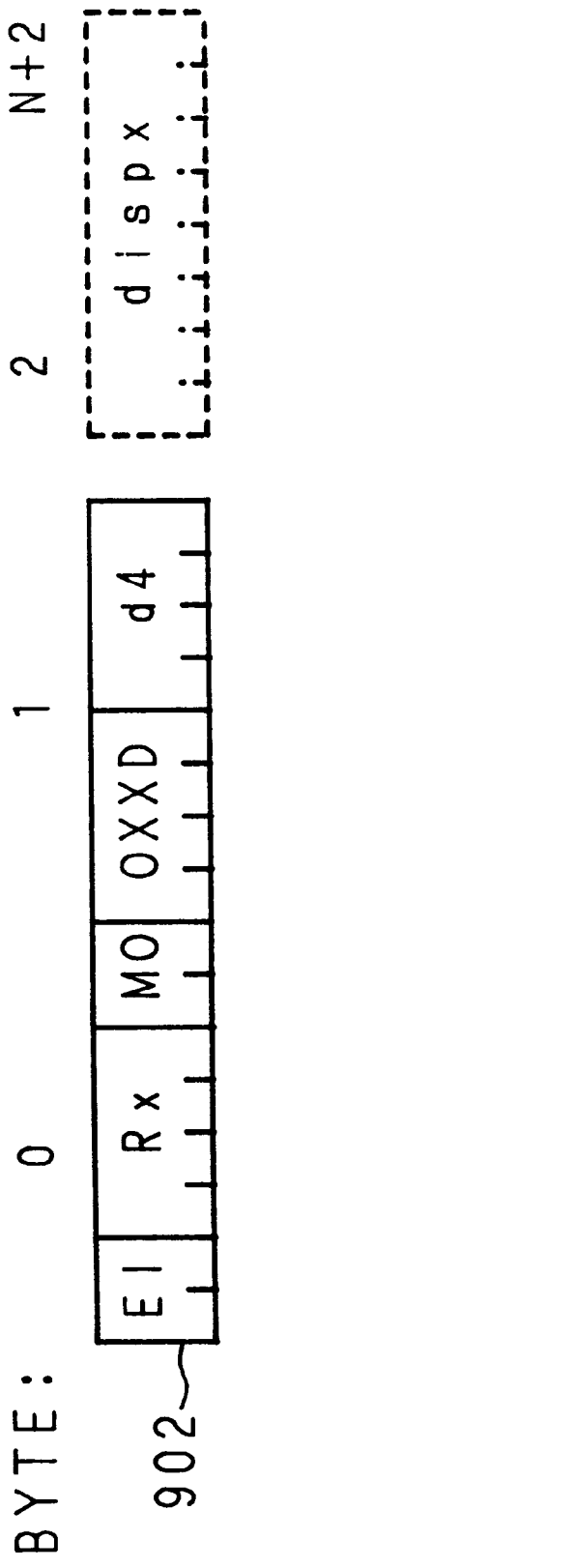
FIG. 23 is a schematic diagram showing a format of an addressing mode according to one embodiment of a data processor.

The chained addressing mode specifying field to be extended takes 16 bits as a unit, and this is repeated an arbitrary number of times. In each stage of the chained addressing mode, addition of displacement, scaling (x1, x2, x4, x8) and addition of an index register, and indirect reference of memory are performed. FIG. 23 is a schematic diagram showing the format 902 of the chained addressing mode. Each field has meanings as shown below.

E=0: Chained addressing mode is continued.

E=1: Address calculation ends. tzp==>address of operand

I=0: No memory indirect reference is performed. tmp+disp+Rx*Scale==>tmp

I=1: Memory indirect reference is performed. mem [tmp+disp+Rx*Scale]==>tzp

M=0: <Rx> is used as an index.

M=1: Special index <Rx>=0 Index value is not added (Rx=0). <Rx>=1 Program counter is used as an index value (Rx=PC). <Rx>=2 or more Reserved.

D=0: The value of field d4 of four bits in the chained addressing mode is quadrupled to be taken as a displacement, and this value is added. The d4 is handled as a signed number, and is used by surely quadrupling it irrespective of the size of the operand.

D=1: The dispx (16/32 bits) specified in the extension part of the chained addressing mode is taken as a displacement and this value is added. The size of the extension part is specified in the d4 field. d4=0001 dispx: 16 bits d4=0010 dispx: 32 bits XX: Index scale (scale=1/2/4/8)

In the case where scaling of x2, x4, x8 has been performed for the program counter, an indefinite value enters as an intermediate value (tmp) after completion of processing of that stage. The effective address obtained by this chained addressing mode becomes an unpredictable value, but no exception is generated. Designating of scaling for the program counter should not be performed.

Figure 24:
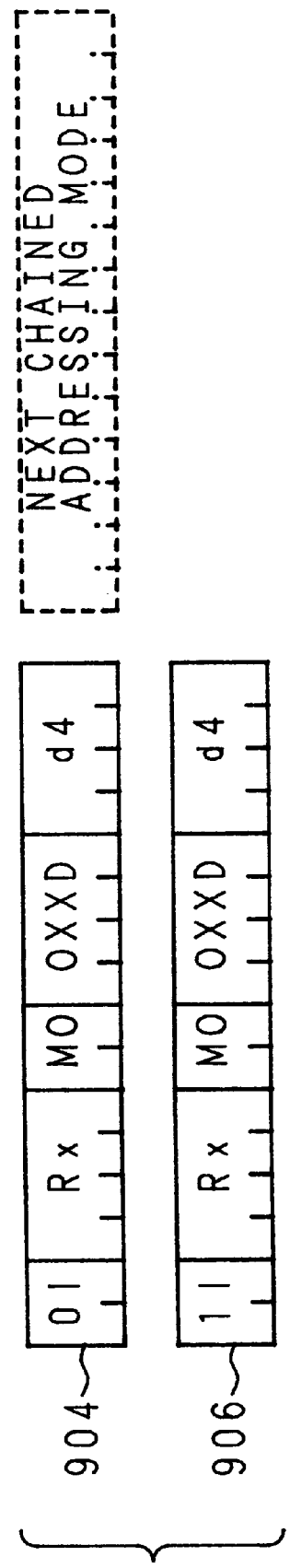
FIG. 24 is a schematic diagram showing a format of an addressing mode according to one embodiment of a data processor.
Figure 25:
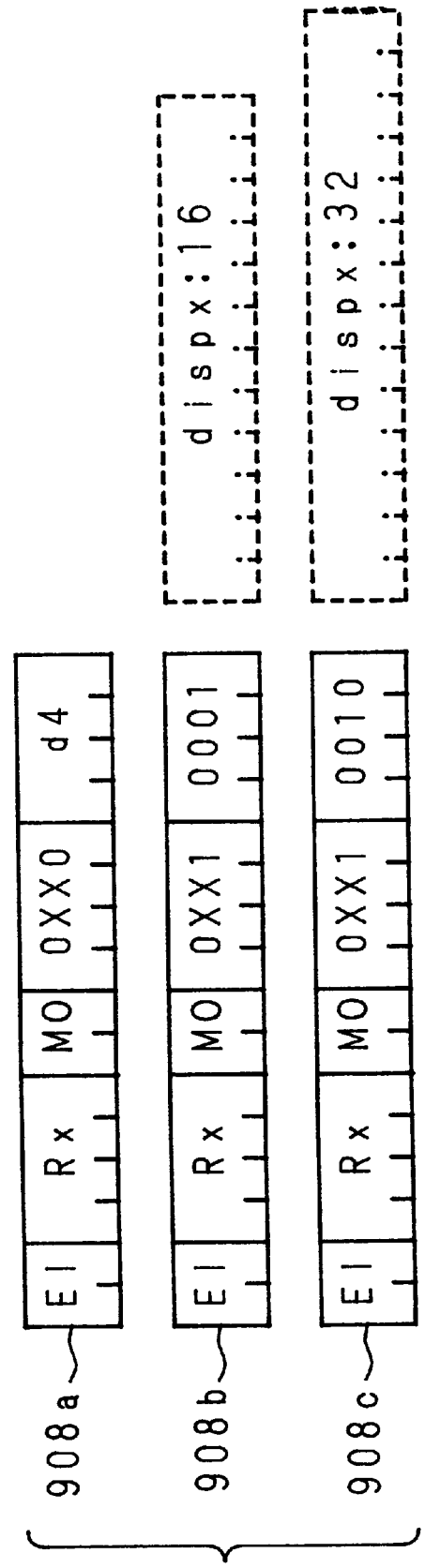
FIG. 25 is a schematic diagram showing a format of an addressing mode according to one embodiment of a data processor.

FIG. 24 and FIG. 25 show variations on the instruction format formed by the chained addressing mode. FIG. 24 shows variations 904, 906 of continuation and completion of the chained addressing mode. FIG. 25 shows variations 908a, 908b, 908c on the size of displacement.

In the case where the chained addressing mode of an arbitrary number of stages can be utilized, case-sorting in the compiler, on the basis of the number of stages, can be dispensed with, and therefore an advantage of alleviating the burden on the compiler is obtainable. This is because, even if frequency of chained reference is very low, the compiler has to be able to generate a correct code without fail. For this reason, arbitrary numbers of stages can be applied on the format.

Functional Blocks of the Data Processor of the Invention

Figure 26:
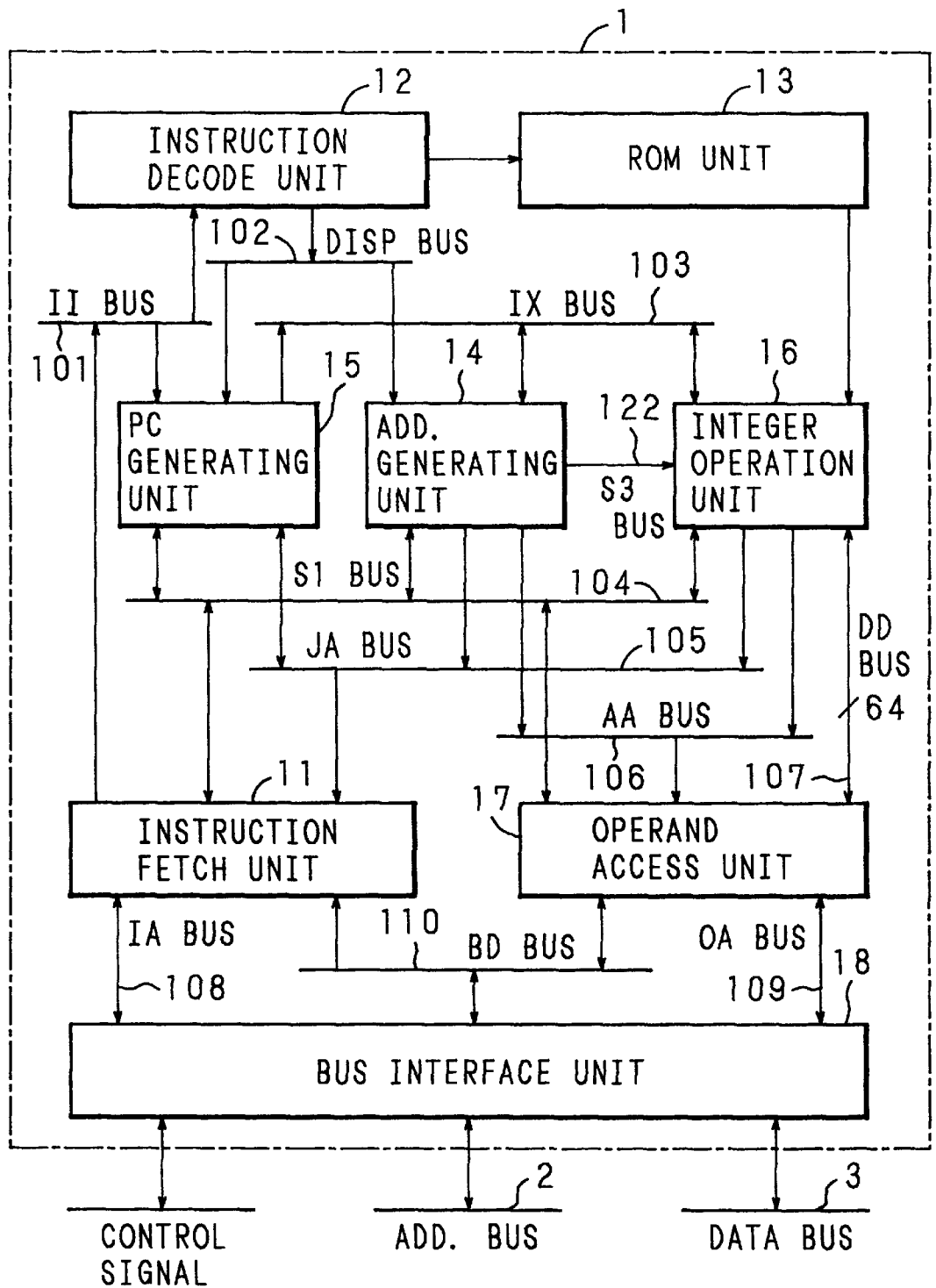
FIG. 26 is a block diagram showing an example of configuration of one embodiment of a data processor.

FIG. 26 is a block diagram showing a configuration example of data processor 1. An internal portion of the data processor 1 can be roughly divided, functionally, into an instruction fetch unit 11, an instruction decoding unit 12, a ROM unit 13, an address generating unit 14, a PC generating unit 15, an integer operation unit 16, an operand access unit 17 and bus interface unit 18. Numerals 101 to 110 designate internal buses for transferring data, address and the like. The bus interface unit 18 is connected to the outside through a 32-bit address bus 2, a 32-bit data bus 3 and various control signals.

The instruction fetch unit 11 fetches instructions from a built-in instruction cache or an external memory. The instruction decoding unit 12 decodes the instruction transferred from the instruction fetch unit 11 via the II bus 101. The ROM unit 13 controls the integer operation according to microprograms. The PC generating unit 15 calculates PC values of instructions. The address generating unit 14 calculates an operand address. The operand access unit 17 fetches the operand from a built-in data cache or the external memory and stores the operand in the external memory.

The instruction is fetched by the instruction fetch unit 11, decoded by the instruction decoding unit 12 and executed at the integer operation unit 16 under the microprogram control of the ROM unit 13. Calculation of the PC value of the instruction and the operand address, and operand accessing are performed by hard-wired control in a block independent from the integer operation unit 16.

The instruction address is transferred to the instruction fetch unit 11 from respective units by the JA bus 105. The operand address is transferred to an operand fetch unit from respective units by the AA bus 106. The operand is transferred between the integer operation unit 16 and the operand access unit 17 by the DD bus 107 of a 64-bit width.

The bus interface unit 18 issues a bus cycle according to the request of the instruction fetch unit 11 or the operand access unit 17 and accesses the external memory.

The memory access in the data processor 1 is performed by a clock synchronized protocol. At least two clock cycles are necessary in one bus cycle. In a read cycle and a write cycle, there are a single transfer for transferring the instruction code or data in a 4-byte boundary at one bus transfer, and a block transfer for transferring the instruction code or data in a 16-byte boundary at one time in four bus transfers. Meanwhile, in the block transfer, there are a burst mode in which the address is outputted one time and the instruction code or data is transferred four times continuously, and a quad-move mode in which the address is outputted four times and the instruction code or data is transferred four times continuously.

The bus cycle control and input/output of various signals are performed by the bus interface unit 18 by hard-wired control. The bus interface unit 18 includes, a circuit for incrementing the address at the block transfer of data and instruction. Also, the data processor 1 in addition to a 2-entry store buffer, each entry having 8 bytes, an address holding unit of the store buffer in the bus interface unit 18.

At the time of instruction fetch, the bus interface unit 18 outputs the address inputted from the instruction fetch unit 11 via the IA bus 108 to the external address bus 2, fetches the instruction code from the data bus 3 and transfers it to the instruction fetch unit 11 via the BD bus 110. At the time of data read, the bus interface unit 18 outputs the address inputted from the operand access unit 17 via the OA bus 109 to the external address bus 2, fetches data from the data bus 3 and transfers it to the operand access unit 17 via the BD bus 110. Furthermore, at the time of data write, the bus interface unit 18 outputs the address inputted from the operand address bus 17 via the OA bus 109 to the external address bus 2 and outputs data inputted via the BD bus 110 to the data bus 3. At the time of transferring the instruction code or data at a quad-move mode of the block transfer, only one address is outputted from the instruction fetch unit 11 or the operand access unit 17, and the remaining three addresses are generated and outputted by wrapping around lower bits in the bus interface unit 18.

Besides the memory access, the bus interface unit 18 also receives an external interruption and controls a bus arbitration. When an external device other than the data processor 1 serves as a bus master and the external device executes the data write or invalidation cycle during the bus snoop operation of the data processor 1, the bus interface unit 18 fetches the address outputted on the address bus 2, and transfers it respectively to the instruction fetch unit 11 via the IA bus 108 and to the operand access unit 17 via the OA bus 109.

Figure 27:
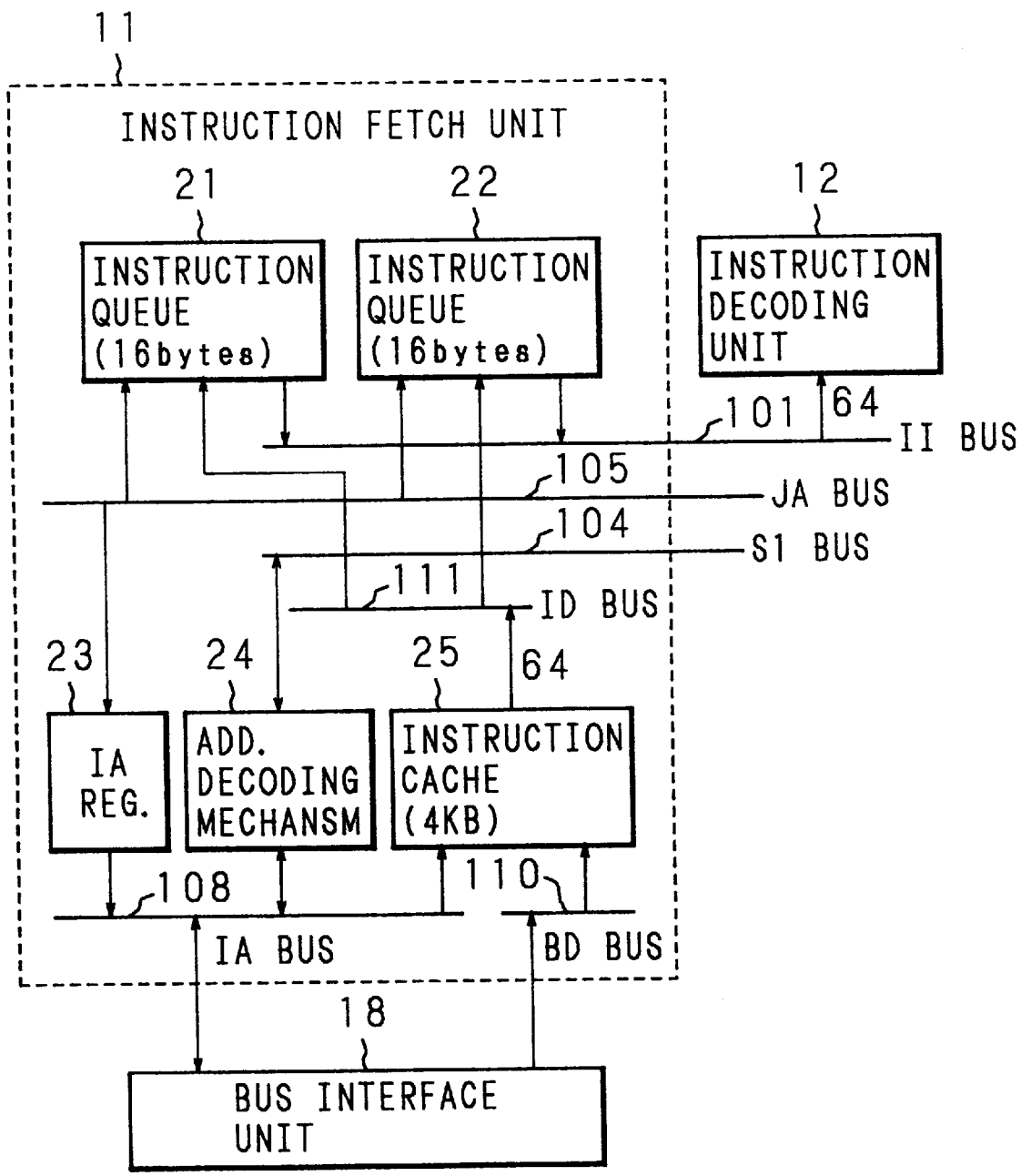
FIG. 27 is a block diagram showing a configuration example an instruction fetch unit of one embodiment of a data processor.

FIG. 27 is a block diagram showing a configuration example of the instruction fetch unit 11. The instruction fetch unit 11 includes, a 4K-byte built-in instruction cache 25, two 16-byte instruction queues 21, 22, an instruction address register (IA register) 23 holding and generating fetch addresses, an address decoding mechanism 24 and their control units. The instruction fetch unit 11 fetches the instruction from the instruction cache 25 or the external memory, and transfers the instruction code to the instruction decoding unit 12 via the instruction queues 21, 22 and II bus 101.

The bus interface unit 18 and the instruction cache 25 are connected with the IA bus 108 for transferring the 32 bit address and the BD bus 110 for transferring 32-bit data. The instruction cache 25 and the instruction queues 21, 22 are connected by the ID bus 111.

The instruction code outputted from the bus interface unit 18 is transferred to the instruction cache 25 via the BD bus 110. The instruction code outputted from the instruction queues 21, 22 is transferred to the instruction decoding unit 12 via the II bus 101.

There are provided two instruction queues 21, 22 for holding instruction in the branch/non-branch direction of the conditional branch instruction. One of the two instruction queues 21, 22 prefetches the instruction code following the conditional branch instruction so as to queue it, and another one prefetches the instruction code of a branch destination of the conditional branch instruction so as to queue it.

The IA register 23 includes, two registers for holding fetch addresses of the two instruction queues 21, 22 and an exclusive counter for incrementing the address. When a jump occurs including a rest time, a jump destination address is transferred to the IA register 23 from the address generating unit 14, PC generating unit 15 or integer operation unit 16 via the JA bus 105. A part of jump destination address is also sent to the instruction queues 21, 22 and used for initializing an input/output pointer. The instruction address other than the jump destination is calculated by a built-in counter of the IA register 23. The instruction address is outputted to the address decoding mechanism 24 and instruction cache 25 from the IA register 23 via the IA bus 108.

The address decoding mechanism 24 includes some control registers which check whether or not the instruction address is in an I/O area or in a non-cache area.

The instruction cache 25 is operated by a direct map control of 16-byte×256-entry configuration. The instruction cache 25 outputs a cache address tag and the instruction code according to lower 12 bits of the address transferred from the IA register 23. The cache address tag is compared with higher 20 bits of the address, and the instruction cache 25 hits when they coincide. In this case, the instruction code is transferred to the instruction queues 21, 22 via the ID bus 111. When the instruction queues 21, 22 are empty, the instruction code is transferred also to the instruction decoding unit 12 via the II bus 101 at the same timing bypassing the instruction queues 21, 22. When the instruction cache 25 has missed, by outputting the instruction address to the bus interface unit 18 from the address decoding mechanism via the IA bus 108, the external memory is accessed by the block transfer to fetch the instruction code, thereby an entry of the instruction cache 25 is updated.

In the bus snoop operation of the data processor 1, the bus interface unit 18 monitors the address on the external address bus 2, and the address is transferred to the instruction cache 25 via the IA bus 108. The bus interface unit 18 also transfers the memory address, into which the data processor 1 itself has written, to the instruction cache 25.

Instruction of the data processor 1 is a variable-length instruction of a 2-byte unit, as shown in a schematic diagram of FIG. 28, and basically, it is constituted by repeating "2-byte instruction base part+0 to 4-byte addressing modification part" by one to three times.

In the instruction base part, an operation code part and an addressing mode specifying part are included. When an index addressing or a memory indirect addressing is necessary, in place of the addressing modification part, "2 byte chained mode specifying part+0 to 4-byte addressing modification part" is extended as much as necessary. There is also the case where an extension part peculiar to the 2 or 4-byte instruction is added by the instruction.

In the data processor 1, in order to process the variable-length format instruction shown in FIG. 28 efficiently, one instruction is decomposed into one or several processing units (hereinafter, referred to as a step code) in an instruction decoding stage. Basically, the decoding result of "2-byte instruction base part+0 to 4-byte addressing modification part" or "chained mode specifying part+addressing modification part" makes one step code, and the instruction decoder outputs one step code in one clock. However, when the addressing modification part is not in the first operand or in case of instruction having no operand specified in the head instruction base part, two instruction base parts (32-bit length) are decoded in one clock. In the data processor 1, it is possible to decode a part of instruction in parallel with the preceding instruction to process the two instructions at the same time.

Figure 29:
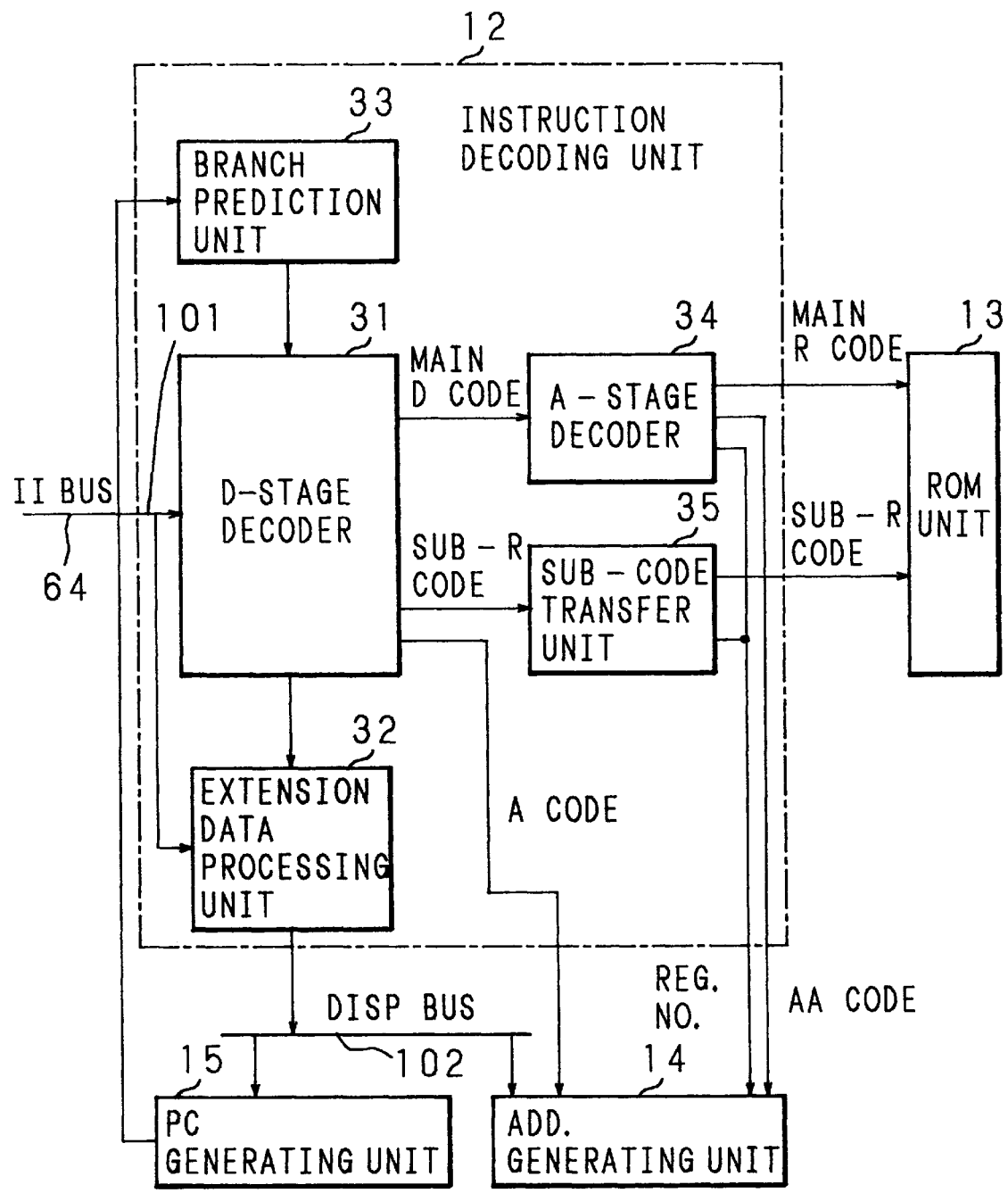
FIG. 29 is a block diagram showing a configuration example of an instruction decoding unit of one embodiment of a data processor.

FIG. 29 shows a block diagram of the instruction decoding unit 12 of the data processor 1. The instruction decoding unit 12 is constituted by a branch prediction unit 33, a D-stage decoder 31, an extension data processing unit 32, an A-stage decoder 34 and a sub-code transfer unit 35.

The branch prediction unit 33 holds a branch hysteresis of conditional branch instruction of a 1-bit×1 K-entry. The branch hysteresis is registered in association with the lower address of the PC value of the instruction executed just before the conditional branch instruction, and a branch prediction bit is outputted according to the lower address of the PC value of the instruction decoded just before the conditional branch instruction. The PC value used for reference and updating at that time is transferred from the PC generating unit 15.

The D-stage decoder 31 decodes a maximum 8-byte instruction code transferred via the II bus 101 and a 1-bit branch prediction bit. The data processor 1 is capable of decoding two instructions (preceding instruction and succeeding instruction) in parallel, the intermediate decoding result (main D code) of the preceding instruction is transferred to the A-stage decoder 34, and the decoding result (sub-D code) of the succeeding instruction is transferred to the sub-code transfer unit 35. Address calculation information (A code) related to the preceding instruction or the succeeding instruction is transferred to the address generating unit 14. Besides, information related to the PC calculation such as a processing code length and information related to the preceding branch (pre-branch) performing branch processing before executing the instruction are outputted to the PC generating unit 15, and information related to the output pointer control of the instruction queues 21, 22 or the prebranch is outputted to the instruction fetch unit 11. The instruction decoding is to be described later in detail.

The extension data processing unit 32, according to the decoded result by the D-stage decoder 3, fetches an addressing modification parts such as a displacement, an immediate and the like from the instruction code, and transfers them to the address generating unit 14 and PC generating unit 15 via a DISP bus 102.

The A-stage decoder 34 decodes, in detail, the main D code which is the intermediate decoded result of the instruction outputted from the D-stage decoder 31 to output an entry address, a parameter and the like of the microprograms to the ROM unit 13. In the A-stage decoder 34, the instruction transferring a plurality of operands such as an LDM instruction, an STM instruction and the like between the register and memory is divided into a plurality of memory register transfer instructions (step code) transferring data of 8 bytes or less at one time. At this time, the A-stage decoder 34 outputs an AA code to the address generating unit 14 and controls the address calculation of the operand having been decomposed.

The sub-code transfer unit 35 transfers the sub-D code, which is the decoded result of the succeeding instruction outputted from the D-stage decoder 31, to the ROM unit 13 in synchronism with the instruction decoded in the A-stage decoder 34.

Also, from the A-stage decoder 34 and sub-code transfer unit 35, the register numbers, into which operands are to be written, are transferred to the address generating unit 14 and controlled by a pipeline interlocking mechanism such that, the succeeding instruction does not cause a RAW data hazard (Read-after-write data hazard) by using a register value, which has not been written, for the operand address calculation.

PC Generating Unit

Figure 30:
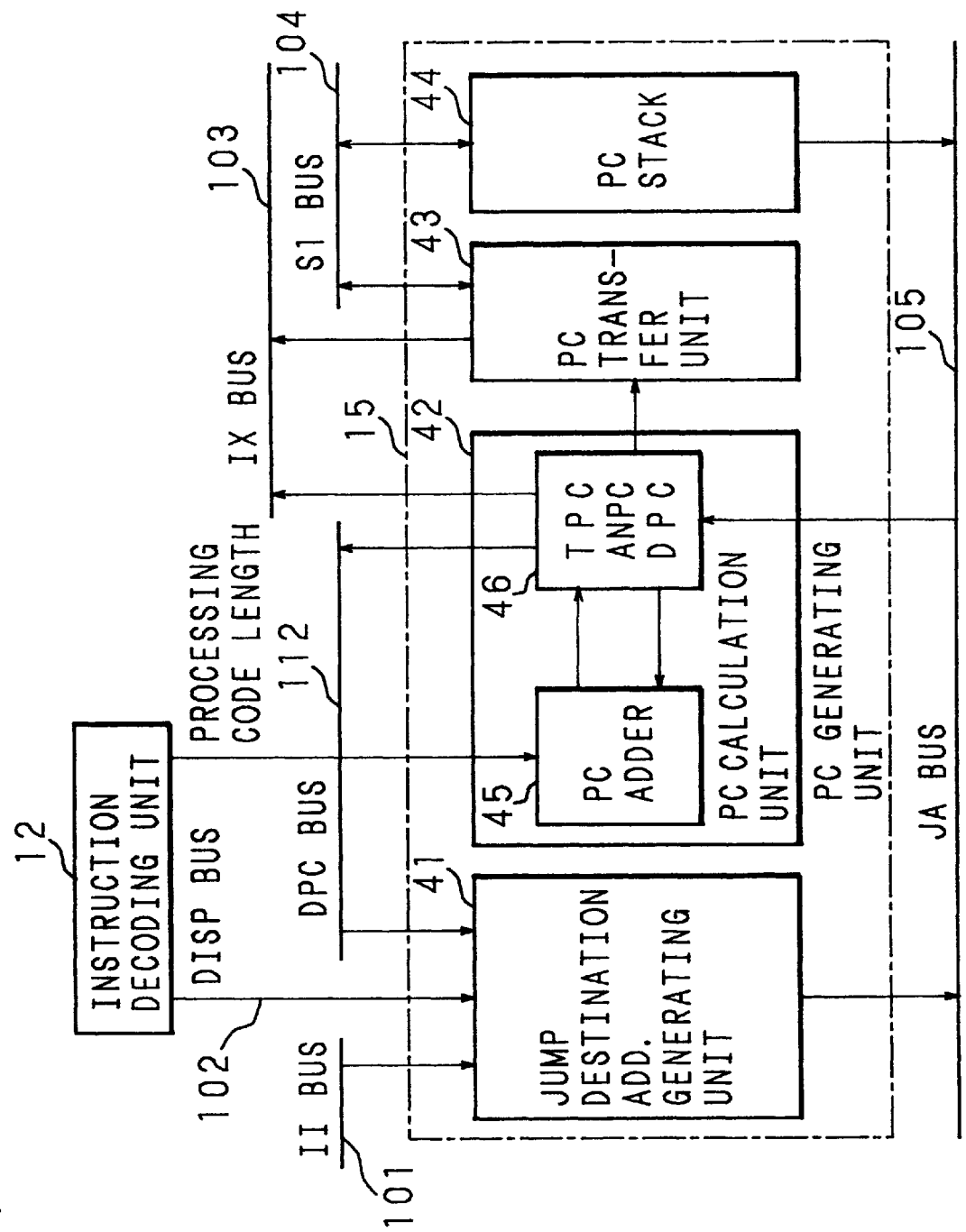
FIG. 30 is a block diagram showing a configuration example of a PC generating unit of one embodiment of a data processor.

FIG. 30 is a block diagram showing a configuration example of the PC generating unit 15. The PC generating unit 15 is constituted by a jump destination address generating unit 41 which calculates the preceding jump destination address in an instruction decoding stage, a PC calculation unit 42 which calculates a PC value of the instruction to be decoded, a PC transfer unit 43 which transfers the PC value in synchronism with the flow of instruction processed in a pipeline, and a PC stack 44 which manages a pre-return destination address from a subroutine.

The jump destination address generating unit 41 calculates a jump destination instruction address in case of decoding the instruction performing a PC relative jump or an absolute address jump in the instruction decoding stage. In the jump destination address generating unit 41, there are provided two adders connected to the II bus 101 and the DPC bus 112 for adding a value of a field possibly becoming as a branch displacement field on a II bus 101 and a start address of the instruction transferred from a DPC bus 112, in parallel with the instruction decoding. The jump destination address generating unit 41 performs cutting-off of a field possibly becoming as an absolute address on the II bus 101 and sign extension. When the instruction having been decoded is the instruction for PC relative jump or absolute address jump, one correct jump destination address is selected from the two add results and one sign extension result to output it to a JA bus 105. For a part of jump instructions whose execution frequency is low and which jumps by PC relative to the address other than the jump destination address calculated simultaneously with the instruction decoding, the jump destination address is obtained by adding the branch displacement transferred newly from the DISP bus 102 after the instruction decoding and the PC value, and is outputted to the JA bus 105.

The PC stack 44 holds a copy of return destination address from the subroutine jump instruction in the 8-entry stack, and outputs the return destination address to the JA bus 105 when the subroutine return instruction is decoded. In the PC stack 44, the return destination address is transferred from the S1 bus 104 and pushed when the subroutine jump instruction is executed. When the stack is switched by a task switch or an eight levels or more nesting of the subroutine or the like occurs, the return destination address outputted to the JA bus 105 from the PC stack 44 is no more the correct return destination address. And hence, at the time point when the subroutine return instruction reaches the execution stage of the pipeline, the pre-return address is again read from the PC stack 44 into the S1 bus 104, and compared with the correct return destination address read from the memory.

The PC calculation unit 42 is consisting of an adder and a plurality of working registers (TPC, ANPC, DPC) 46, and calculates a PC value of the instruction decoded in the instruction decoding unit 12. Calculation of the PC value is performed by adding a processing code length consumed in the instruction decoding unit 12 to the start address of the instruction decoded in that cycle. When the instruction execution sequence is changed by the jump instruction or the EIT, the jump destination instruction address is transferred from the JA bus 105. The calculation result of the PC calculation unit 45 is outputted to the PC transfer unit 43 in synchronism with the pipeline flow together with the instruction decoded result. The PC value of the instruction to be decoded next held in the working registers is transferred to the address generating unit 14 via the IX bus 103, and transferred to the jump destination address generating unit 41 via the DPC bus 112 in order to calculate the jump destination address.

The PC transfer unit 43 includes, a plural registers for holding PC holding registers corresponding to respective pipeline stages of the data processor 1. The PC value which is the start address of the instruction calculated in the PC calculation unit 46 is transferred through the plural registers in the PC transfer unit 43, together with the step code processed in respective pipeline stages of the data processor 1. When the PC value of the instruction is referred to at the time of address calculation, the PC value of the instruction which was the base of the step code during the address calculation processing is transferred to the address generating unit 14 via the IX bus 103. In the PC transfer unit 43, for starting an instruction address break or tracing operation for debug support, the PC value to be transferred and an instruction breakpoint address value or a trigger start instruction address value are compared.

Address Generating Unit

The address generating unit 14 is hardwired controlled by the control information (A code, AA code) associated with an address generation of the operand outputted from the Dstage decoder 31 and the A-stage decoder 34 of the instruction decoding unit 12, and generates the address of the operand. The preceding jump processing by the jump instruction of the register indirect addressing which does not generate the jump destination address, branch prediction of the conditional branch instruction and calculation of the instruction address on the reverse side thereof, and calculation of the return destination address of the subroutine jump instruction are also performed in the PC generating unit 15.

Figure 31:
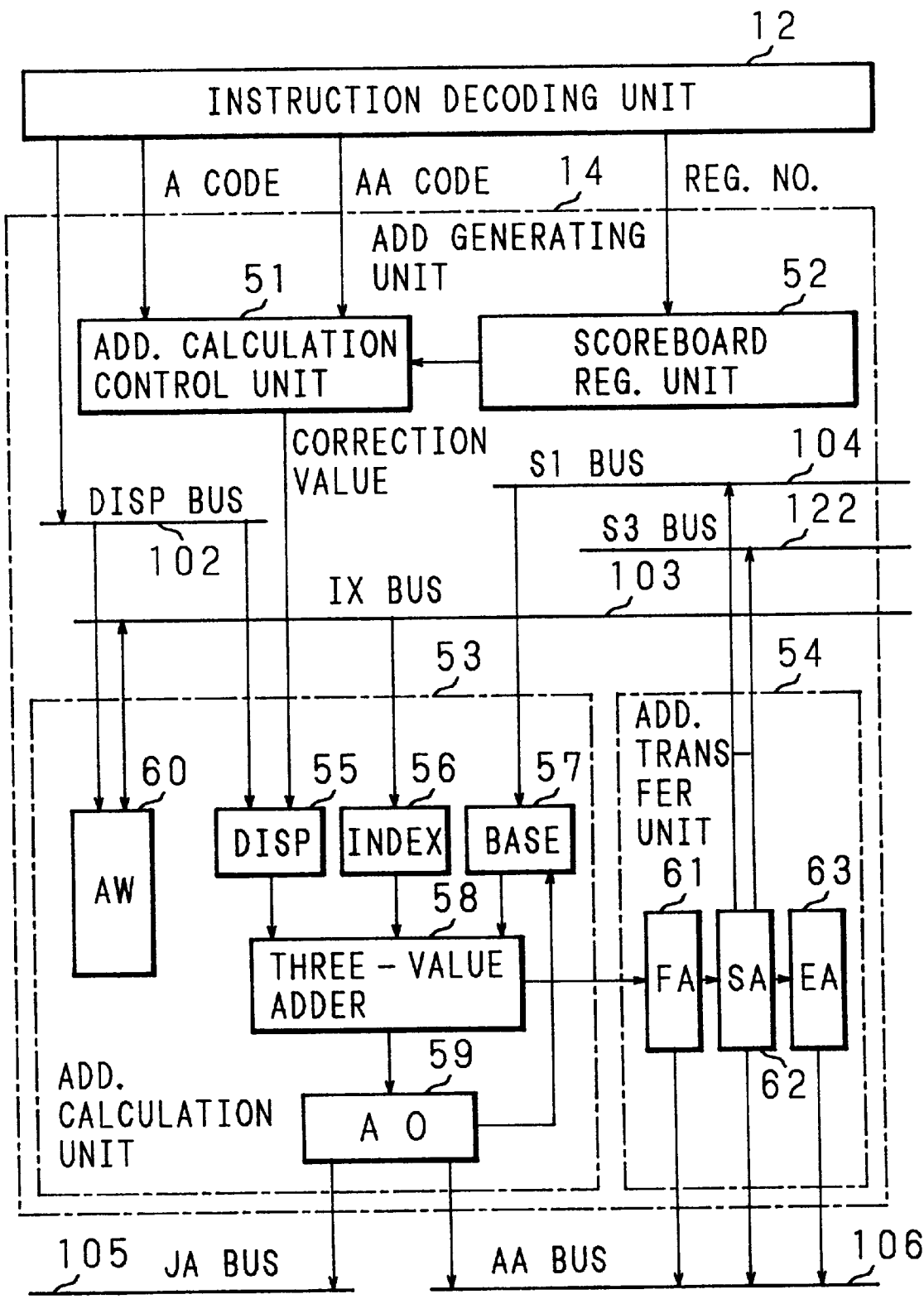
FIG. 31 is a block diagram showing a configuration example of an address generating unit of one embodiment of a data processor.

FIG. 31 is a block diagram showing a configuration example of the address generating unit 14. The address generating unit 14 includes, an address calculation control unit 51 generating an operation control signal from the A code and AA code which are control information associated with generating the address outputted from the instruction decoding unit 12, an address calculation unit 53 executing address calculation of the operand in a 3-input adder 58, an address transfer unit 54 transferring, in synchronism with the pipeline processing, an operand address value calculated by the address calculation unit 53, and a scoreboard register unit 52 for RAW data hazard detection related to the operand address calculation.

A displacement specified by an addressing mode is transferred to the address calculation unit 53 from the instruction decoding unit 12 via the DISP bus 102, and held by a DISP 55. It is possible to input a correction value (pre-decrement value) transferred from the instruction decoding unit 12 into the DISP 55 in order to pre-decrement processing of a SP value accompanying with a stack-push mode. A register value referred to in the address calculation is that, a value transferred from the register of the integer operation unit 16 via the IX bus 103 is inputted to and held in an INDEX 56. In case of PC relative mode or the like, the PC value is transferred from the PC transfer unit 43 of the PC generating unit 15 via the IX bus 103 and held in the INDEX 56, and in case of using a stackpop mode or a push mode, or in case of referring to the register 15 (register 15 specifies a stack pointer), the SP value is transferred from the integer operation unit 16 via the IX bus 103 and held in the INDEX 56. For executing scaled index addressing, in the INDEX 56, it is possible to output 1, 2, 4 and 8 times of the inputted value to the input adder 58. When the address calculation result till the preceding stage by the chained addressing is used as the base address of the next chained addressing, an output of the 3-input adder 58 is transferred to a BASE 57 from an A0 59. In memory indirect addressing, the address calculation result by the 3-input adder 58 is outputted to the AA bus 106 via the A0 59 to fetch an address from a memory and to transfer an object address to the BASE 57 via the SI bus 104. Three values held by the DISP 55, INDEX 56 and BASE 57 are added by the 3-input adder 58 and outputted to the A0 59. The DISP 55, INDEX 56 and BASE 57 respectively has a zero-clear function.

The address calculation result is outputted to the AA bus 106 from the A0 59 and used as the address for accessing the operand. The operand address itself outputted from the A0 59 is transferred to the address transfer unit 54 and managed by the unit 54 in synchronism with the instruction flow in the pipeline. An immediately value is also transferred to the address transfer unit 54 from the instruction decoding unit 102 via the DISP 55 and 3-input adder 58, and in the same way as the operand address, managed by the address transfer unit 54 in synchronism with the instruction flow in the pipeline.

The jump destination address calculation result of the jump instruction of the addressing mode, except the PC relative and absolute mode, is outputted to the JA bus 105 from the A0 59, and used in the pre-jump in an address generating stage.

The data processor 1 comprises, an SP preceding update mechanism consisting of an operand address generating exclusive SP (ASP) for processing the instruction without pipeline interlock even when the stack-pop addressing (@SP+) or stack-push addressing (@-SP) continues, and a register group (SP transfer unit) transferring the SP value updated in the operand address generating stage in the pipeline in synchronism with the instruction flow. Though the SP value is updated in the address calculation stage by a control signal outputted from the address calculation control unit 51, since, as the block, it is in the integer operation unit 16, it is to be described later in detail.

The scoreboard register unit 52 includes a plurality of scoreboard registers. Each of the scoreboard registers is constituted by 16 bits, each bit corresponding to one general-purpose register. There are a plural number of scoreboard registers corresponding to pipeline stages (till the execution state) after the address calculation. Update information of the register is registered in the instruction decoding stage, transferred as the pipeline proceeds and held until the instruction is executed and the register value is updated. The RAW data hazard is detected on the basis of the register number referred to at the time of address calculation.

Operand Access Unit

Figure 32:
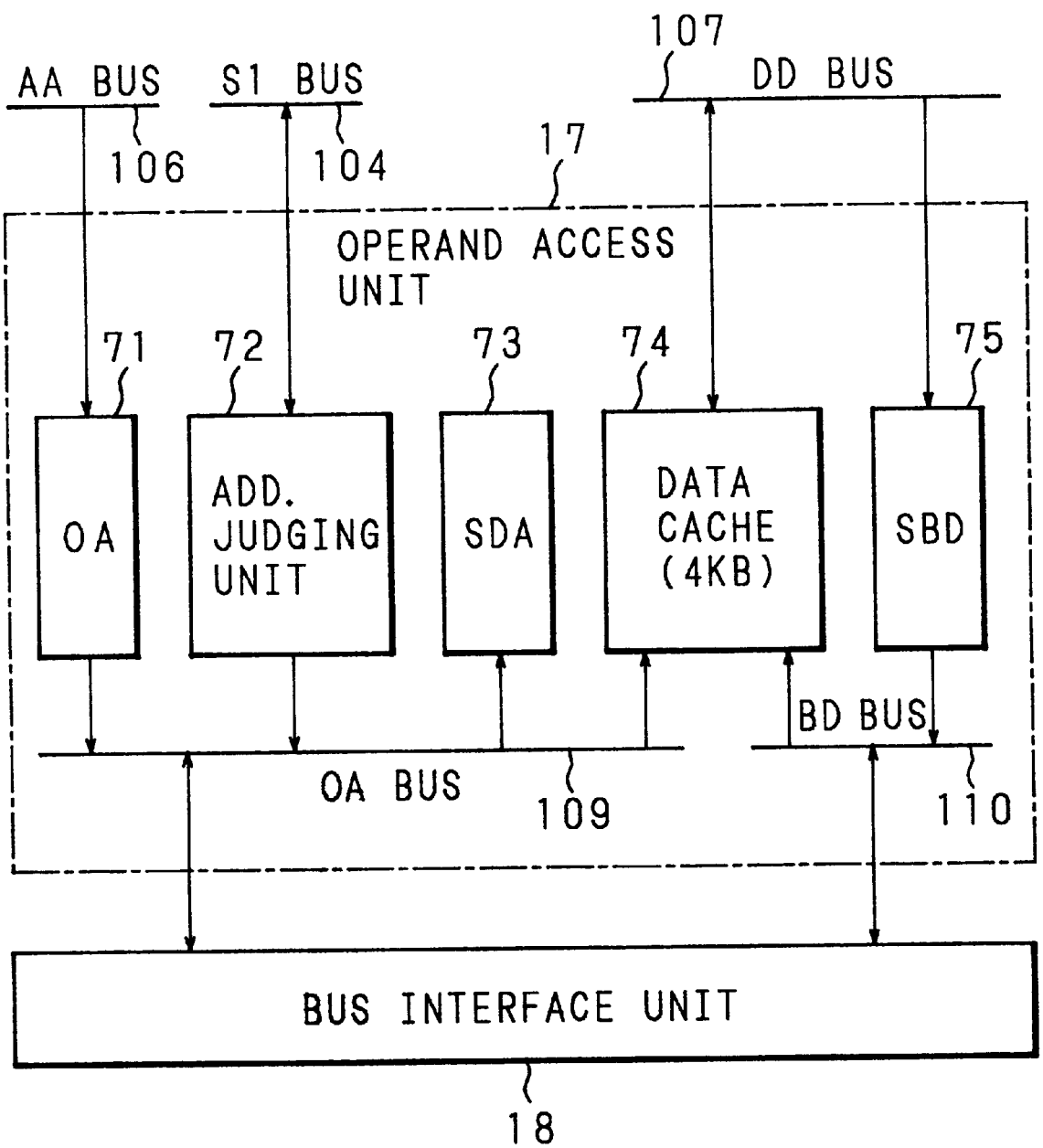
FIG. 32 is a block diagram showing a configuration example of an operand access unit of one embodiment of a data processor.

FIG. 32 is a block diagram showing a configuration example of the operand access unit 17. The operand access unit 17 includes, a 4-KB data cache 74, an address management unit (SDA) 73 of a 2-entry operand pre-fetch queue, a data hold unit (SBD) 75 of a 2-entry store buffer, an operand address register (OA) 71 holding and generating the operand access address, an address judging unit 72 and their control units (not shown). In case of accessing the operand, an operand address is outputted to an OA bus 109 from an AA bus 106 via the OA register 71. The address is also outputted to the address decoding mechanism 24. The address decoding mechanism 24 includes several control registers, whereby it is checked whether or not the instruction address is in an I/O area or in a non-cache area. It is also compared with a breakpoint address value for starting the operand break for debug support.

The data cache 74 is operated by direct map control of a write-through type 16-byte×256-entry configuration. The data cache 74 outputs a cache address tag and data according to lower 12 bits of a data address transferred from the OA bus 109. The cache address tag is compared with higher 20 bits of the data address, and the data cache hits when they coincide with each other.

In the data read operation, the data address to be read outputted from the address generating unit 14 or integer operation unit 16 is transferred to the OA register 71 to access the data ah 74. At the time of each hit, the data is transferred to the integer operation unit 16 from the data ah 74 via the DD bus 107. In the operand prefetch (operand fetch in the stage preceding the execution of the instruction), data addresses for every 8-byte boundaries of the fetch data gare transferred to and held in the SDA 73 for overlap check with the store operand.

When the data cache has missed, the data addressis outputted to the bus interface unit 18 from the OA bus 109, and by accessing the external memory by the block transfer, data is fetched from the BD bus 110 and the data cache entry is updated. Block read is performed by wrapping around the address in ascending order from the necessary data as the operand, and the necessary data as the operand is registered in the data cache, and at the same time, transferred to the integer operation unit 16 from the DD bus 107. The data cache 74 also includes a 16-byte block buffer and checks whether or not the data access, including the non-cache area access, hits data of the block buffer. The block buffer performs 8-byte data read for the non-cache area in a lump of 16 bytes by the block transfer, holds the 16-byte data and outputs from the block buffer when the next data read is in the same 16-byte boundary. Due to this function, it is possible to access the data in the non-cache area at high speed in a 16-byte unit by a string operation instruction or a bit map instruction.

In the data storing operation, an address of the data to be stored outputted from the AA bus 106 is transferred to the OA register 71, and the data outputted from the integer operation unit 16 is transferred via the DD bus 107. The storing operation is always performed to the external memory. The store data address is transferred to an address hold unit of the store buffer of the bus interface unit 18, and the store data is transferred to a store buffer data unit 292 (75). At the time of transferring the store address and data to the store buffer, when there is data overlapping with the store data in the pre-fetch data or data cache, the content is rewritten. Overlapping check of the pre-fetch data is performed in the SDA 73, and that of the data cache 74 is performed at a tag in the cache. The data cache 74 is a write-through type and the cache content does not change when missed (no overlap) in the write operation.

Even while the bus interface unit 18 is writing data of the store buffer 292 to the outside, the operand access unit 156 receives the succeeding read access or write access. Thus, even when there is unprocessed data in the store buffer 292, the operand access unit 17 is able to continue the following processing when the data cache has hit.

During the bus snoop operation of the data processor 1, the bus interface unit 18 transfers the address of the data to be invalidated to the operand access unit 17 via the OA bus 109. The data cache 74 invalidates all of the 16-byte block data hit by the address.

ROM Unit

Figure 33:
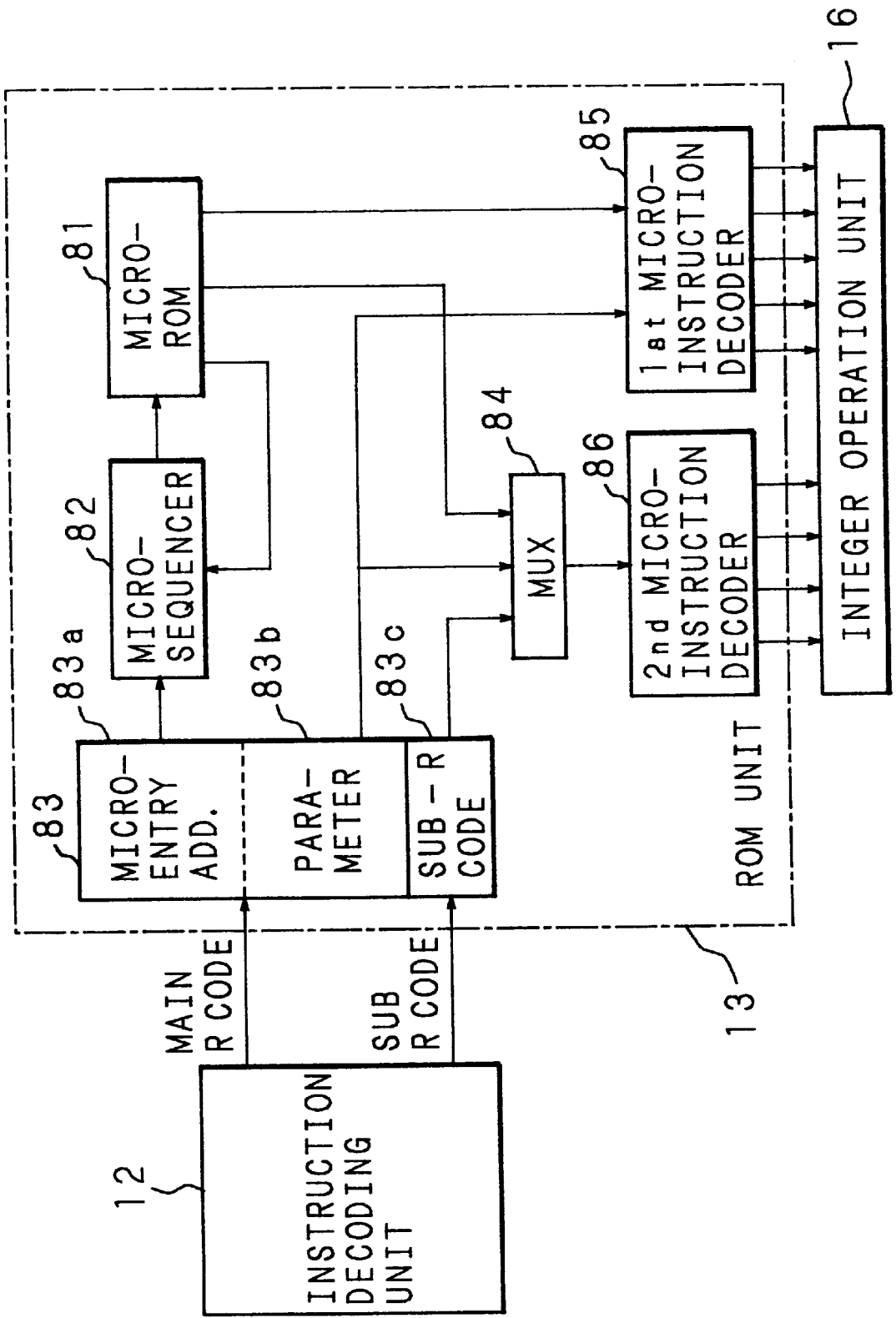
FIG. 33 is a block diagram showing a configuration example of a ROM unit of one embodiment of a data processor.

FIG. 33 is a block diagram showing a configuration example of the ROM unit 13. The ROM unit 13 includes, a micro-ROM 81 storing a microprogram routine, a microsequencer 82, first and second microinstruction decoders 85, 86, and an R-code latch 83 holding an R code outputted from the instruction decoder. The ROM unit 13 controls the operation of the integer operation unit 16 by microprograms according to the R code (main R code and sub-R code) outputted from the instruction decoding unit 12.

The microsequencer 82 mainly performs the sequence processing for executing the microprograms associated with the instruction execution. In the microsequencer 82, there are provided latches for holding a plurality of microinstruction addresses, an incremented incrementing a microinstruction address value, a condition judging unit of the operation execution result and so on, hereby besides the sequential microinstruction execution and 4-direction conditional branch, the microsubroutine execution is also controlled. Besides, the microsequencer 82 performs reception of the exception, interruption and trap (EIT) and the sequential processing of the microprograms corresponding to the EIT.

The R-code latch 83 is composed of a microentry address hold unit 83*a*, a parameter hold unit 83*b* and a sub-R code hold unit 83*c* to constitute a 2-entry queue.

The micro-ROM 81 includes a 155-bit×4 K-word ROM and a microinstruction register holding the microinstruction which has been read, and reads the microinstruction of the address outputted from the microsequencer. The microinstruction address is consisting of 12 bits, higher 10 bits of which are inputted into an X decoder of the microROM 81 and lower 2 bits are inputted into a Y decoder of the micro-ROM 81. In order to perform condition jump of the microprogram without delay slot, 4 words are read out at one time from the micro-ROM 81 at the time of condition jump of the microprogram, and one out of which is selected according to the condition judging result. The microinstruction is read out once in one clock from the micro-ROM 81 and one register-register operation is performed by the one microinstruction. Thus, basic instructions of transfer, comparison, addition, subtraction logical operation and so on are finished in one clock.

The first and second microinstruction decoders 85, 86 decode the microinstruction outputted from the micro-ROM 81, the parameter 83*b* and sub-R code 83*c* of the R-code, and output the control signal of the integer operation unit 16 and a small immediate. In case of decoding two instructions in the instruction decoding unit 16 at the same time, the preceding instruction decoded result is outputted as a main R code, and the decoded result of the succeeding instruction is outputted as the sub-R code. In executing the preceding instruction, the microinstructions necessary for the processing are read out, and the microinstruction read by the first microinstruction decoder 85 and parameter information obtained from the parameter hold unit 83*c* in the main R code are decoded to generate the control signal necessary for executing the preceding instruction. In executing the succeeding instruction, an output of the Rcode latch 83 is selected by a multiplexer 84 and decoded by the second microinstruction decoder 86. For the succeeding instruction, an effective control signal is generated together with the last microinstruction of the preceding instruction. In case of processing a highly functional instruction performing a plurality of operations by one instruction such as a string instruction, parallel execution of two instructions is not performed, and operation hardwares for processing the succeeding instruction at the time of parallel execution of two instructions is also controlled by the microprogram. In this case, the multiplexer 84 selects the outputs of the micro-ROM 81.

Though the ROM unit 13 mainly outputs an operation execution control signal to the integer operation unit 16, a number of control signals are outputted also to the other blocks for the operand access, jump, EIT processing and the like, but they are not shown.

Integer Operation Unit

The integer operation unit 16 is mainly controlled by the microprogram stored in the micro-ROM 81 of the ROM unit 13, and executes the operation necessary for executing various integer operation instructions by using a register file 205 and an operator.

Figure 34:
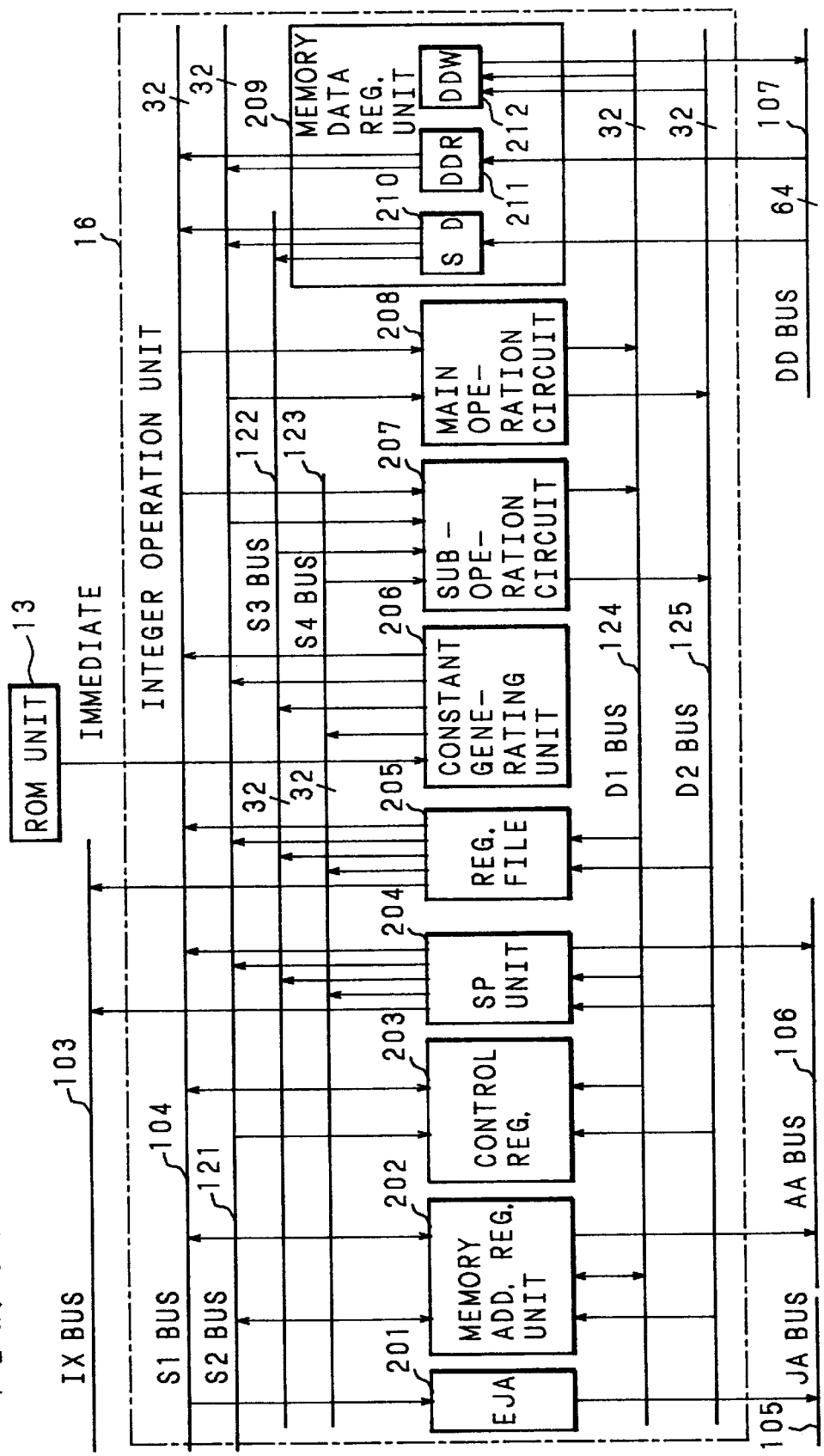
FIG. 34 is a block diagram showing a configuration example of an integer operation unit of one embodiment of a data processor.

FIG. 34 is a block diagram showing a configuration example of the integer operation unit 16. An E-stage jump address register (EJA) 201 is the register for storing the jump destination address at the time of executing jump in the instruction execution stage of the pipeline. When the EIT is detected or when the subroutine return instruction having an incorrect pre-return destination address is executed, the jump destination address is inputted to the EJA register 201 by the microprogram so as to execute a stage jump. The jump destination address at this time is transferred to the instruction fetch unit 11 via the JA bus 105.

A memory address register 202 and a memory data register 209 are the registers for communication between the integer operation unit 16 and the operand access unit 17, the former handling an address and the latter handling data. The memory address register 202 includes, two address registers, a counter incrementing and decrementing the address and the like. In case of executing the memory access at instruction execution, the operand address is outputted to the operand access unit 17 via the AA bus 106.

The memory data register 209 includes a 2-entry S-code data register (SD) 210 for holding the operand pre-fetched before executing the instruction, a reading register (DDR) 211 and a writing register (DDW) 212 at instruction execution. Each of the registers includes two 8-byte data registers and an alignment circuit so as to hold non-aligned 8-byte data, and exchanges data in an aligned 8-byte unit between itself and the operand access unit 156 by the DD bus 107 of 64-bit width. Though the pre-fetch operand is outputted from the SD 210 and DDR 211, the pre-fetch operand below 32 bits can be outputted to either an S1 bus 104 or an S3 bus 122. In case of outputting the 64-bit pre-fetch operand, an S2 bus 121 is connected to the S1 bus 104 or S3 bus 122 for use. Data to be stored in the memory is written into the DDW 212 via a D1 bus 124 and D2 bus 125.

In a main operation circuit 208, an ALU, a 64-bit barrel shifter, a multiplier, a priority encoder, a counter and so on are built in. In a sub-operation circuit 207, an ALU 27, a barrel shifter and so on are built in. In a register file 205, 15 general-purpose registers except an R15 which is a stack pointer, and 16 working registers are built in. A stack pointer unit (SP unit) holds the stack pointer (R15). The register file 205 and SP unit 204 includes, 4 output ports and 2 input ports connected to the main operation circuit 208 and sub-operation circuit 207 so as to execute the two operation instructions in parallel. Furthermore, there is provided another output port connected to the IX bus 103 transferring data to the address generating unit 14 for calculating the operand address.

Two instructions decoded in the instruction decoding unit 12 at the same time are executed simultaneously in the main operation circuit 208 and sub-operation circuit 207. Execution of the preceding instruction is controlled by an output of a first microdecoder 85 of the ROM unit 13, and the operation is executed in the main operation circuit 208. Execution of the succeeding instruction is hard-wired controlled by an output of a second microdecoder 86, and the operation is executed in the sub-operation circuit 207. In case of executing the highly functional instruction, by operating the main operation circuit 208 and sub-operation circuit 207 in parallel by the microprogram, it is possible to process 8-byte data at one time and to execute two operations in parallel.

The SP unit 204 not only holds a stack point value but also executes the complicated processing.

Figure 35:
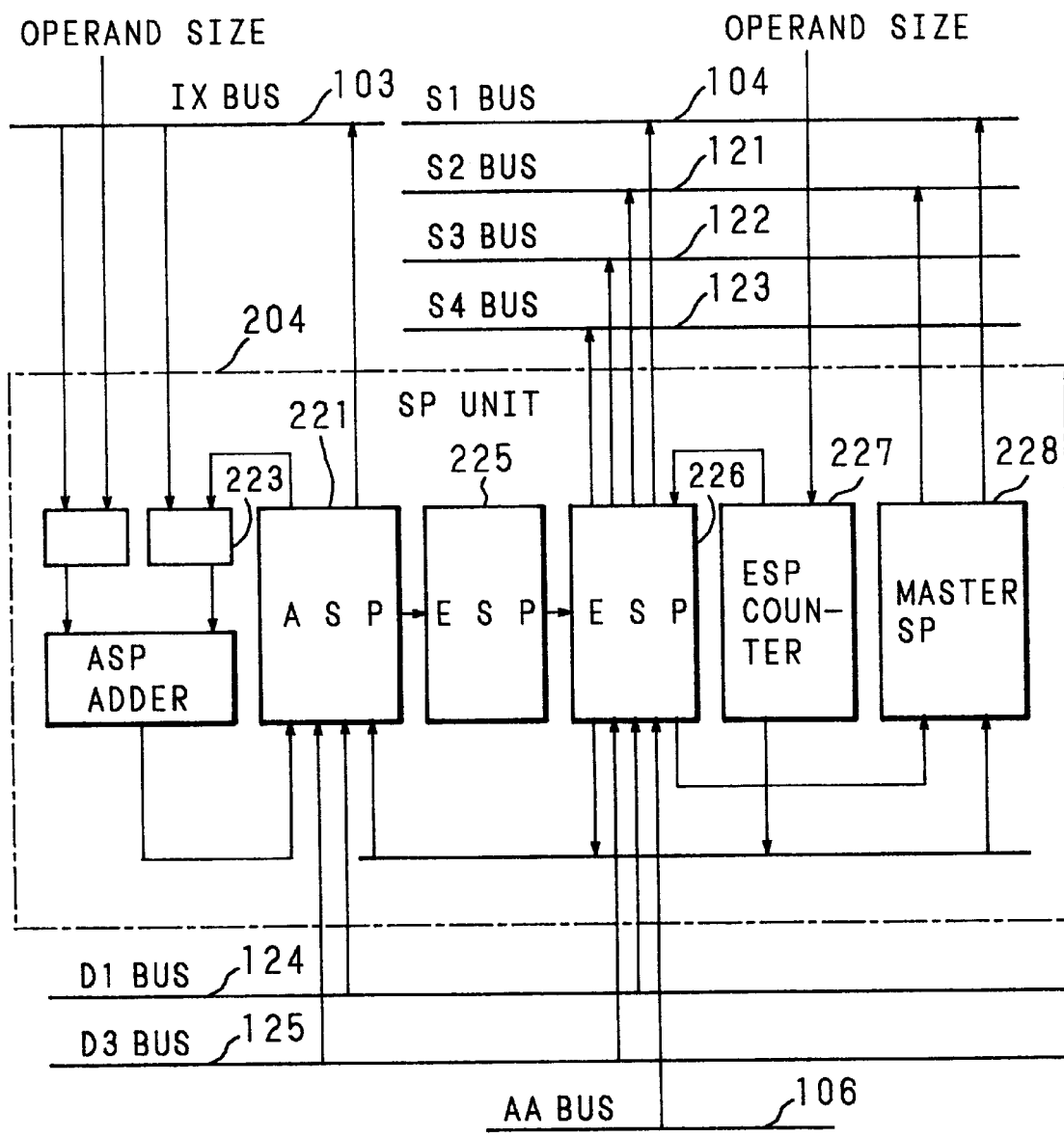
FIG. 35 is a block diagram showing a configuration example of an SP unit of one embodiment of a data processor.

FIG. 35 is a block diagram showing a detailed configuration example of the SP unit 204. In the data processor 1, there is provided a stack pointer in every ring for ring protection, and also five stack pointers are provided including the stack pointer for interruption processing. The five stack pointers are held by a master SP 228. An ESP 226 is a working stack pointer for instruction execution stage and holds a stack pointer value of the ring selected at present, incrementing and decrementing processing are executed in an ESP counter 227. At the time of finishing each instructions, a value of an ESP 226 is written back into the master SP 228.

In the data processor 1, even when the instructions for stack push or stack pop are in series, for the purpose of enabling the address calculation using an SP value without pipeline stall, the SP value is previously updated in the address calculation stage. The SP value in the address calculation stage is held by an ASP 221, and the decrement processing of the SP value accompanying with the stack push or updating of the SP value by an ASP adder 224 accompanying with the stack pop are executed. Meanwhile, the ASP adder 224 also performs processing in case of correcting the SP value by the highly functional instruction. When the address calculation unit 53 refers to the SP value, it refers to a value of the ASP 221 via the IX bus 103. The SP value updated in the address calculation stage is transferred to the ESP 226 via an FSP 225 in synchronism with the instruction flow in the pipeline. However, when the SP value is not updated in the address calculation stage, since it has not been guaranteed whether or not the value is correct by hardware, it is not transferred to the ESP 226. When writing the SP value in the instruction execution stage, an updated value is written into the ASP 221 and ESP 226 at the same time from a D1 bus 124 or D3 bus 125. When the jump occurs in the instruction execution stage and the pipeline is cleared, a value of the ESP 226 is transferred to the ASP 221. The ESP 226 includes an output path to the AA bus 106, whereby the memory can be accessed by the value of the ESP 226 without going through the memory address register unit 202.

A control register unit 359 includes various control registers for controlling processor status words (PSW) exception related processing, debug and so on. A constant generating unit 206 includes, a latch holding a small immediate specified by a constant ROM, and the instruction code outputted from the ROM unit 13 and a small constant specified by the microinstruction, and the constant value is outputted to the bus.

Pipeline Processing

Configuration of Pipeline

Figure 36:
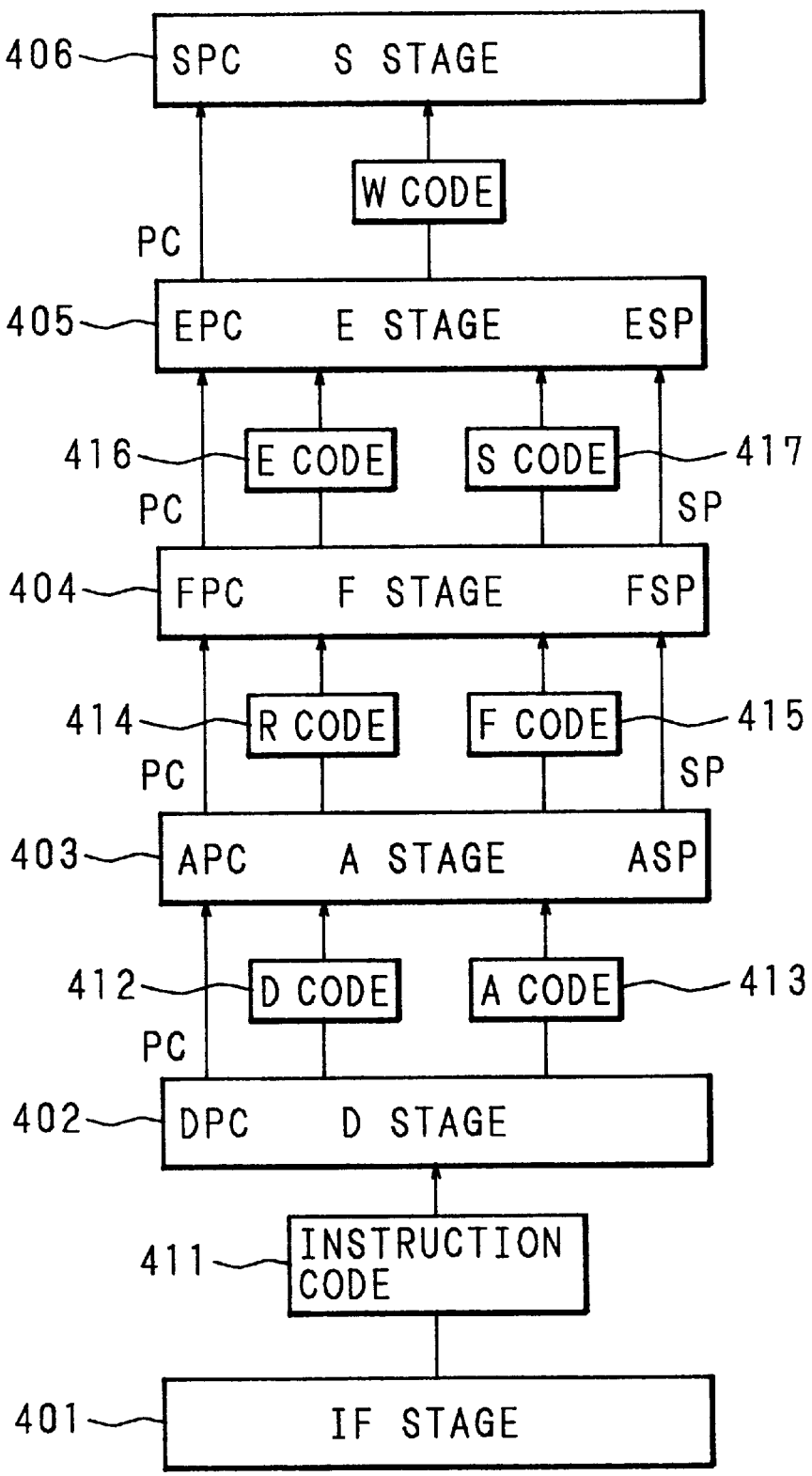
FIG. 36 is a schematic diagram showing an outline of a pipeline processing of one embodiment of a data processor.

A schematic view of FIG. 36 shows a configuration example of an instruction pipeline in the data processor 1. In the data processor 1, a pipeline processing is performed in six stages, namely, an instruction fetch stage (IF stage) 401 for pre-fetching the instruction, a decoding stage (D stage) 402 for decoding the instruction, an address generating stage (A stage) 403 for generating the operand address, an operand fetch stage (F stage) 404 for accessing the microROM 81 (particularly to be called an R stage) and for prefetching a memory operand (particularly to be called an OF stage), an execution stage (E stage) 405 for executing the instruction and a store stage (S stage) 406 for storing the memory operand. The 32-byte instruction pre-fetch queues 21, 22 correspond to the IF stage 401, the 2-entry operand pre-fetch queue (SD) 210 corresponds to the F stage 404 and the entry store buffer (SBD) 75 corresponds to the S stage 406.

The respective stages operate independently of the other stages, and logically, the six stages operate entirely independently. Each stage other than the S stage 406 perform one processing in, at least, one clock. The S stage 406 performs one operand store processing in one clock when there is a vacancy in the store buffer 75, and performs in, at least, two clocks when there is no vacancy. Thus, the instruction pipeline of the data processor 1 processes the instruction, ideally, in every one clock successively.

In the instruction of the data processor 1, though there is such a case where the processing is impossible by only one basic pipeline processing such as the memory-memory operation or memory indirect addressing, the instruction pipeline of the data processor 1 is so designed that, even for such processing, the pipeline processing balanced as much as possible can be performed. For the instruction having a plurality of memory operands, on the basis of the number of memory operands, the pipeline processing is performed by decomposing one instruction into a plurality of pipeline processing units (step codes) in the decoding stage.

Input/output step codes of the respective pipeline stages are named as shown in FIG. 36 for the sake of convenience. The step codes perform the processing related to operation codes, and there are two group, one as a parameter for entry address of the micro-ROM 81 or the E stage 405, and another one as an operand to be processed in the E stage 405. Between the D stage 402 and the S stage 406, a program counter value (PC) of the instruction being processed is transferred, and between the A stage 403 and the E stage 405, a stack pointer value (SP), and further, a scoreboard register value are transferred.

Information transferred to the D stage 402 from the IF stage 401 is an instruction code 411 itself.

Three information are transferred to the A stage 401 from the D stage 402, one is related to the operation specified by the instruction (to be called a D code 412), another one is related to address generation of the operand and the rest is a program counter value of the instruction.

Four information are transferred to the F stage 404 from the A stage 403, one is an R code 414 including an entry address of a microprogram routine or parameter for the microprogram, another one is an F code 415 including a operand address and accessing instructing information, the other one is the program counter value of the instruction being processed and the rest is a stack pointer value.

Four information are transferred to the E stage 405 from the F stage 404, one is an E code 416 including operation control information and a literal, another one is an S code 417 including the operand and operand address, the other one is the program counter value of the instruction being processed and the rest is the stack pointer value. The S code 417 is consisting of the address and data.

Two information are transferred to the S stage 406 from the E stage 405, one is a W code 418 which is the operation result to be stored and another one is the program counter value of the instruction outputting the operation result. The W code 418 is consisting of the address, data and store related information.

The E stage 405 is an original instruction execution stage. The IF, D, A and F stages are the stages performing the pre-processing for executing the instruction, wherein though the instruction code or operand are read, the content of the memory or register is never updated. And hence, there is a possibility that the processing in these stages is canceled depending upon the processing result in the E stage 405.

Instruction Fetch Stage

In the instruction fetch stage (IF stage), mainly, the instruction fetch unit 11 is operated, fetching the instruction from the built-in instruction cache 25 or the external memory, inputting it to the instruction queues 21, 22 and outputting the instruction code to the instruction decoding unit 12. Input to the instruction queues 21, 22 is accomplished in an aligned 8-byte unit within 16 bytes when the instruction cache 25 has hit, and in an aligned 4-byte unit when missed. There are two instruction queues 21, 22 for fetching both the instruction succeeding the condition branch instruction and the branch destination instruction.

When fetching the instruction from the external memory by a single transfer, at least, two clocks are is necessary for aligned 4 bytes. In the block transfer in a burst mode, at least, five clocks are necessary for 16 bytes. When fetching the instruction from the outside, it is checked whether or not the address of the fetch destination instruction is in a non-cache area, or in an I/O area. The instruction fetch from the I/O area is prohibited and the EIT occurs.

When the built-in instruction cache 25 has hit, any byte instruction within the aligned 16 bytes is fetched in one clock. An output unit of the instruction queues 21, 22 is variable at every 2 bytes, and up to maximum 8 bytes are outputted in one clock.

The built-in instruction cache 25, pre-fetch destination instruction address and instruction queues 21, 22 are controlled by the IF stage 401. Processing in the IF stage 401 are as follows.

pre-fetch of the instruction code and output to the D stage 402 management of two instruction queues 21, 22 increment of the instruction pre-fetch address management of the instruction cache 25 check whether or not the instruction address is in the non-cache area check whether or not the instruction address is in the I/O area Instruction Decoding Stage In the instruction decoding stage (D stage) 402, mainly, the D-stage decoder 31, extension data processing unit 32 and branch prediction unit 33 of the instruction decoding unit 12, and the PC calculation unit 42, jump destination address generating unit 41 and PC stack 44 of the PC generating unit 15 are operated.

In the D stage 402, a preceding stage decoding of an operation code of the instruction inputted from the IF stage 401 and decoding of the addressing mode are performed. The decoding is performed once in every clock, and 0 to 8-byte instruction code is consumed in one decoding processing (in some processing, there is a case where the instruction code is not consumed and only a step code output is processed). The instruction, which can not be decoded in one decoding processing such as the instruction having two memory operands or the instruction using a chained mode, is decomposed into a plurality of step codes in this stage. And hence, even when the instruction is not decoded entirely, the D code 412, A code 413 and the PC value of the instruction are outputted by the decoding processing in respective clocks.

In the D stage 402, two instructions are decoded in parallel, and when the parallel execution is possible, the decoded results of the two instructions are outputted at the same time. In the branch prediction unit 33, the branch prediction processing for condition branch instruction is performed. In respective decoding cycles, update information of an output pointer of the instruction queues 21, 22 is outputted to the instruction fetch unit 11.

In the D stage 402, on the basis of an instruction length consumed in the instruction decoding, the PC values of each instruction is calculated in the PC generating unit. For the condition branch instruction, the jump instruction to an absolute address or a PC relative address (including the subroutine jump instruction) and subroutine return instruction, the preceding jump processing (D stage jump) is performed in the PC generating unit.

When the non-conditional jump instruction is decoded to perform the preceding jump, for the IF stage 401, the content of the instruction queues 21, 22 being used at present is canceled, the instruction is fetched from the jump destination and inputted to the queues, and the code is instructed to be outputted to the instruction decoding unit 12. When the condition branch instruction is decoded, regardless of the branch prediction, for the IF stage 401, the queue being used at present is left intact and the other instruction queue is requested to fetch and input an instruction from the branch destination. In the condition branch instruction predicting the branch, it is instructed to output the instruction code to the instruction decoding unit 12 from a new queue.

From the D stage 402, the A code 413 which is address calculation information, the D code 412 which is the intermediate decoded result of the operation code and the instruction PC value are outputted to the A stage 403 in one decoding. Processing in the D stage 402 are as follows.

preceding stage decoding of the operation code of the instruction decoding of the addressing mode decomposing the instruction into step codes updating of the output pointer of the instruction queues 21, 22 calculation of PC value branch destination address calculation of the conditional branch instruction branch prediction and preceding branch processing of the condition branch instruction preceding jump processing to the absolute address or PC relative address preceding return processing of the subroutine return instruction Address Generating Stage In the address generating stage (A stage) 403, mainly, the A stage decoder 34 and sub-code transfer unit 35 of the instruction decoding unit 12, the address generating unit 14, the SP unit 204 of the integer operation unit 16 and the PC transfer unit 43 of the PC generating unit 15 are operated.

The A stage 403 decodes the D code 412 transferred from the D stage 402, outputs the R code 414, and according to the A code 413, generates the operand address and outputs the F code 415. The PC value transferred from the D stage 402 is transferred to the F stage 404 intact. Also, the A stage 403, independently of the instruction execution stage 405, calculates a stack pointer value of the instruction being processed and transfers the value to the F stage 404.

In the A stage 403, the intermediate decoded result of the operation code outputted from the D stage 402 is further decoded in detail, and the entry address of the micro-ROM 81 and a parameter of the microprogram are outputted as the R code 414.

The address generating unit 14 generates the operand address according to the A code 413. For the register indirect mode or register relative mode, a value of the general-purpose register is referred to via the IX bus 103. A displacement, immediate and absolute address value are transferred from the instruction decoding unit 12 via the DISP bus 102 as a part of A code 413. For the memory indirect mode, it is in the wait state until the step code generated in response to the generated indirect address fetches an object address value from the memory via the F stage 404 and E stage 405. For the PC relative mode, a PC value (APC) of the instruction being processed transferred from the D stage 402 is used. For the stack pop mode or push mode, the SP value is calculated by an exclusive working stack pointer. The calculated SP value is outputted to the F stage 404 together with the F code 415. When the operand is an immediate, the immediate is transferred by the same transfer path as the operand address.

For the jump instruction other than the absolute jump such as the register indirect jump or memory indirect jump and PC relative jump, the jump destination address is calculated in the address generating unit 14 so that preceding jump is processed (A stage jump). In calculating a return destination address of the subroutine jump instruction, the next instruction address of the instruction being processed in the A stage 403 sent from the PC calculation unit 42 via the IX bus 103 is referred to. For the condition branch instruction, since the PC generating unit 15 is initialized when branch prediction is in error, both the branch prediction-side address and reverse-side instruction address are calculated.

In the A stage 403, the destination operand is registered (write reservation) in the scoreboard register unit 52, and a data hazard is checked at the time of reading data from the register or memory for generating the address. When the register or memory used in the address calculation conflicts to cause the data hazard, the pipeline is interlocked.

The instruction decomposed into a plurality of step codes in the D stage 402 because of using the chained mode, calculates the operand address in the A stage 403 and is degraded into one step code.

A highly functional instruction for load/store processing of the operands is decomposed into a plurality of step codes in the A stage 403. The instructions are decomposed into the step codes transferring data of one or two registers in the A stage 403 and processed in the succeeding pipeline stage. The memory address accessed by each step code is generated by the address generating unit 14 according to a control signal (AA code) outputted from the A-stage decoder 34. Processing in the A stage 403 are as follows.

succeeding stage decoding of the instruction operation code generation of the operand address calculation of the stack pointer value branch prediction of the condition branch instruction and calculation of the reverse-side instruction address return destination address calculation of the subroutine jump instruction preceding jump processing for jump instruction of the register indirect and register relative addressing mode destination write reservation to the scoreboard register unit 52 data hazard check and pipeline interlock for address generation decomposing the instruction transferring the operands into step codes transfer of PC value Operand Fetch Stage In the operand fetch stage 404 (F stage), mainly, the ROM unit 13, operand access unit 17, the address transfer unit 54 and scoreboard register unit 52 of the address generating unit 14, the SP unit 204 of the integer operation unit 16 and the PC transfer unit 43 of the PC generating unit 15 are operated.

The micro-ROM 81 accessing operation of the ROM unit 13 and the operation of the operand access unit 17 for the R code 414 are performed under the independent control. When these two operations are conducted separately, the micro-ROM 81 accessing processing of the ROM unit 13 is particularly called an R-stage processing, and the processing of the operand access unit 17 is particularly called an OF-stage processing. The R code 414 is inputted to and the E code 416 is outputted from the R stage. The F code 415 is inputted to and the S code 417 is outputted from the OF stage. The F code 415 is not queued but the R code 414 is queued up to two, and the E code 416 is not queued but the S code 417 is queued up to two. In the F stage 404, the PC value, SP value and register write reservation information are transferred in synchronism with the transfer of the step code.

The micro-ROM 81 accessing, which is the R-stage processing, is the micro-ROM 81 accessing and microinstruction decoding processing based on the R code 414 for generating the E code 416 being an execution control code used in the execution in the following E stage 405.

When one processing for the R code 414 is decomposed into two or more microprogram steps, the ROM unit 13 is used in the E stage 405 and the next R code 414 may be in micro ROM 81 access wait. Accessing of the micro-ROM 81 to the R code 414 is performed when the micro-ROM 81 accessing is not performed in the E stage 405. In the data processor 1, since many integer operation instruction are finished in one microprogram step, in fact, there is a high possibility that the micro-ROM 81 accessing to the R code 414 is performed successively.

In the operand fetch stage 404, the built-in data cache 74 or the external memory is accessed by a data address of the F code 415 to fetch the operand, and the operand is combined with the data address of the F code 415 to generate the S code 417 for output.

In one F code 415, an 8-byte boundary may be crossed, but the operand fetch of 8 bytes or less is specified. It is also specified in the F code 415 whether or not to access the operand, and the operand is not fetched when the operand address itself and the immediate calculated in the A stage 403 are transferred to the E stage 405, and the content of the F code 415 is transferred as the S code 417. Since the S code 417 can be queued up to two, the operand can be prefetched up to two. When the operand is fetched from the external memory by a single transfer, at least, two clocks are necessary for the aligned 4 bytes. In a block transfer in a burst mode, at least, five clocks are necessary for the aligned 16 bytes.

When the operand is fetched from the outside, it is checked whether or not the fetch destination address is in the non-cache area or in the I/O area specified by the control register. The operand is not pre-fetched from the I/O area. In this case, the operand is fetched only after the preceding instruction finishes all executions and the instruction accessing the I/O area is surely executed. When the data cache 74 has missed at the time of executing the instruction succeeding the condition branch instruction (Bcc, ACB, SCB) or condition trap instruction (TRAP), the operand is not fetched until the preceding condition branch instruction or condition trap is executed. This is because that operand pre-fetch of the instruction, which can not be executed logically, is inhibited to the outside.

When the built-in data cache 74 has hit, the operand is fetched in one clock for aligned 8 bytes.

Control of the built-in data cache 74, management of the pre-fetch destination address and control of the S-code queue are performed in the OF stage.

Processing in the F stage 404 are as follows.

access of the micro-ROM 81 pre-fetch of the operand management of operand pre-fetch queues 210, 73 management of the data cache check of whether or not the operand address is in the non-cache area check of whether or not the operand address is in the I/O area inhibit of pre-fetch from the I/O area inhibit of external memory access of the succeeding instruction until finishing of execution of the preceding condition branch instruction and condition trap instruction transfer of PC value transfer of SP value transfer of register update information Execution Stage In the execution stage (E stage) 405, the integer operation unit 16 is mainly operated by inputting the E code 416 and S code 417, as well as the branch prediction unit 33 of the instruction decoding unit 12, the PC transfer unit 43 and PC stack 44 of the PC generating unit 15, the address transfer unit 54 and scoreboard register unit 52 of the address generating unit 14, the operand access unit 17 and control registers provided separately in respective units are operated.

The E stage 405 is the stage executing the instruction, all processing in the stages before the F stage 404 are the pre-processing for the E stage 405. When the jump is executed or the EIT processing is started in the E stage 405, the processing in the IF stage 401 to F stage 404 are invalidated. The E stage 405 is controlled by the microprograms, and executes the instruction by executing a series of microinstructions from the entry address of the microprogram routine shown in the R code 414.

Reading the micro-ROM 81 and executing the microinstruction are pipelined. Since the microprogram condition branch is performed by a Y decoder (which is a decoder for selecting the target microinstruction from four microinstructions read simultaneously from the micro-ROM 81) of the micro-ROM 81, even when the microprogram condition branch has occurred, the following microinstruction is executed without any gap of one clock.

In the E stage 405, canceling of write reservation to the scoreboard register unit 52 made in the A stage 403, updating of a branch hysteresis of the branch prediction unit 33 in case of wrong branch prediction in the D stage 402, registering of the return destination address from the subroutine to the PC stack 44, checking whether or not the pre-return address and the like are performed.

Various interruptions are accepted directly in the E stage 405 at instruction intervals, and the necessary processing is performed by the microprogram. Other various EIT processing are performed by the microprogram in the E stage 405.

When it is necessary to store the operation result in the memory, the E stage 405 outputs a W code 418 and a program counter value of the instruction for executing the storing processing to the S stage 406. The operands are stored in the memory in order specified logically by the program.

At the storing processing, for deciding the necessity of rewriting the data cache, a data cache tag is checked in the E stage 405. And hence, in the operand store operation, before the actual storing processing, the E stage 405 occupies the data cache during one clock cycle.

When executing a simple instruction, the operand is read in the F stage 404, the operation is executed in the E stage 405 and the operand is stored in the S stage 406. However, when executing the string operating instruction or bit-map operating instruction, the memory is accessed in the E stage 405 using effectively the block transfer (read/write) by the burst mode. Thus, in these instructions, one block (16 bytes) data are processed in a lump. When two instructions are decoded in parallel, the two instructions are executed in parallel using the main operation circuit 208, sub-operation circuit 209 and various buses. Processing in the E stage 405 are as follows.

executing of the instruction operation specified by the operation code with use of the microprogram updating of a general-purpose register value and a control register value updating of a flag in the PSW updating of stack pointers specified in every rings receiving and executing of the EIT processing, and executing of E-stage jump cancel of write reservation to the scoreboard register 52 updating of a branch hysteresis of the branch prediction unit 33 check of pre-return address

E-stage jump for correcting a wrong preceding jump updating of control registers and E-stage jump by executing the interlock instruction transfer of PC value Store Stage In the store stage (S stage) 406, the operand access unit 17 is operated. The S stage 406 stores data of a W code 418 into the built-in data cache 74 according to an address of the W code 418, and at the same time, inputs the W code 418 into the store buffer 75 to store the data of the W code 418 in the external memory.

The store buffer 75 has two entries and is capable of queuing the store request up to two 8-byte data. In a single transfer, store processing of the operand into the external memory from the store buffer 75 is executed once in, at least, two clocks for the aligned 4 bytes. In a block transfer of the burst mode, store processing of the operand into the external memory from the store buffer 75 is executed in, at least, five clocks for the aligned 16 bytes.

Operation in the S stage 406 is performed by the operand access unit 17, and a replacement processing is not performed even when the built-in data cache has missed. Processing in the S stage 406 are as follows.

store in the data cache 74 and memory control of the store buffer 75

Superscalar Processing

Outline of Superscalar Processing

The data processor 1 decodes the instruction having a high execution frequency in parallel with the preceding instruction to perform two-instruction superscalar processing executing both the instructions in parallel.

Specifically, the D-stage decoder 31 of the instruction decoding unit 12 shown in FIG. 29 decodes the two instructions (preceding instruction and succeeding instruction) in parallel, and when it is judged that the two instructions can be executed in parallel, outputs the decoded results of the two instructions at the same time. In this case, though execution information of the two instructions is transferred by the D code 412, R code 414 and E code 416, step codes related to the execution information of the preceding instruction among the step codes are called main codes, and step codes related to the execution information of the succeeding instruction are called sub-codes. The main code and the sub-code are basically processed in respective pipeline stages in synchronism with each other. When the two instructions are executed in parallel practically, in the integer operation unit 16 shown in FIG. 34, the main operation circuit 208 executes the preceding instruction under microprogram control, and the sub-operation circuit 207 executes the succeeding instruction under hard-wired control. When the preceding instruction is processed by two or more microprograms, the succeeding instruction is executed in parallel at the time of executing the last microinstruction of the preceding instruction.

Now, the superscalar processing is not always possible in all combinations of the two instructions due to hardware restrictions. The two instructions can be executed in parallel only when the following conditions are satisfied. Details are to be described later.

- preceding instruction is the 2-byte or 4-byte instruction
- preceding instruction does not generate branch exception processing depending on execution of the preceding instruction is not started before executing the succeeding instruction
- sub-operation circuit 207, S3 bus 122, S4 bus 123 or D2 bus 125 are not used in the last microstep of the preceding instruction
- an instruction base part of the succeeding instruction is one, and succeeding instruction is limited to the case of short format instruction or one operand instruction
- succeeding instruction is executed in one clock cycle in the sub-operation circuit 207
- the operand interference (succeeding instruction refers to a register value updated by the preceding instruction) does not occur. However, in the following cases, there is a possibility that the parallel execution is possible at the time of operand interference.
    - preceding instruction is the transfer instruction to the register
    - succeeding instruction is the instruction which transfers the operation result of the preceding instruction to the register or memory
    - preceding instruction is the shift instruction, and the succeeding instruction is the arithmetic operation/logical operation/comparing instruction
    - preceding instruction is the arithmetic/logical operation instruction, and the succeeding instruction is the left-shift instruction
    - preceding instruction is the arithmetic operation instruction, and the succeeding instruction is the arithmetic operation/comparing instruction
    - both the preceding instruction and succeeding instruction have no memory/immediate operand. However, when the two instructions are the load-store instructions accessing the continuous memory area, there is a case where parallel execution is possible.

Cases in which the two instructions can be executed in parallel can be classified as follows. However, an immediate operand excludes a small immediate (literal) buried in the instruction base.

Class A: succeeding instruction has no memory/immediate operand

Class A1: there is no operand interference

Class A2: there is operand interference, and preceding instruction is the transfer instruction to the register Class A3: there is operand interference, and succeeding instruction is the register-register transfer instruction, except the Class A2

Class A4: there is operand interference, and preceding instruction is the left-shift instruction of 3 bits or less, and succeeding instruction is the arithmetic operation/logical operation/comparing instruction Class A5: there is operand interference, and preceding instruction is the arithmetic/logical operation instruction, and succeeding instruction is the left-shift instruction of 3 bits or less Class A6: there is operand interference, and preceding instruction is the arithmetic operation instruction, and succeeding instruction is the arithmetic operation/comparing instruction Class B: The preceding instruction has no immediate/memory operand, and the succeeding instruction has immediate/memory operand.

Class B1: there is no operand interference

Class B2: succeeding instruction is the instruction which transfers the operation result of the preceding instruction to the memory Class B3: there is operand interference, and preceding instruction is the left-shift instruction of 3 bits or less, and succeeding instruction is the arithmetic operation/logical operation/comparing instruction Class B4: there is operand interference, and preceding instruction is the arithmetic operation instruction, and succeeding instruction is the arithmetic operation/comparing instruction Class C: two instructions have a memory operand (continuous area access)

Class C1: two instructions are the transfer instructions performing stack pop

Class C2: two instructions are the transfer instructions performing stack push

Class C3: preceding instruction specifies the operand in register indirect mode/register relative indirect mode, and succeeding instruction specifies the operand in the register relative indirect mode, and the two instructions are the transfer instructions which load two continuous word data Class C4: preceding instruction specifies the operand in the register indirect mode/register relative indirect mode, and succeeding instruction specifies the operand in the register relative indirect mode, and two instructions are the transfer instructions which store two continuous word data

Parallel Decoding Mechanism of Instruction Decoding Unit

Figure 37:
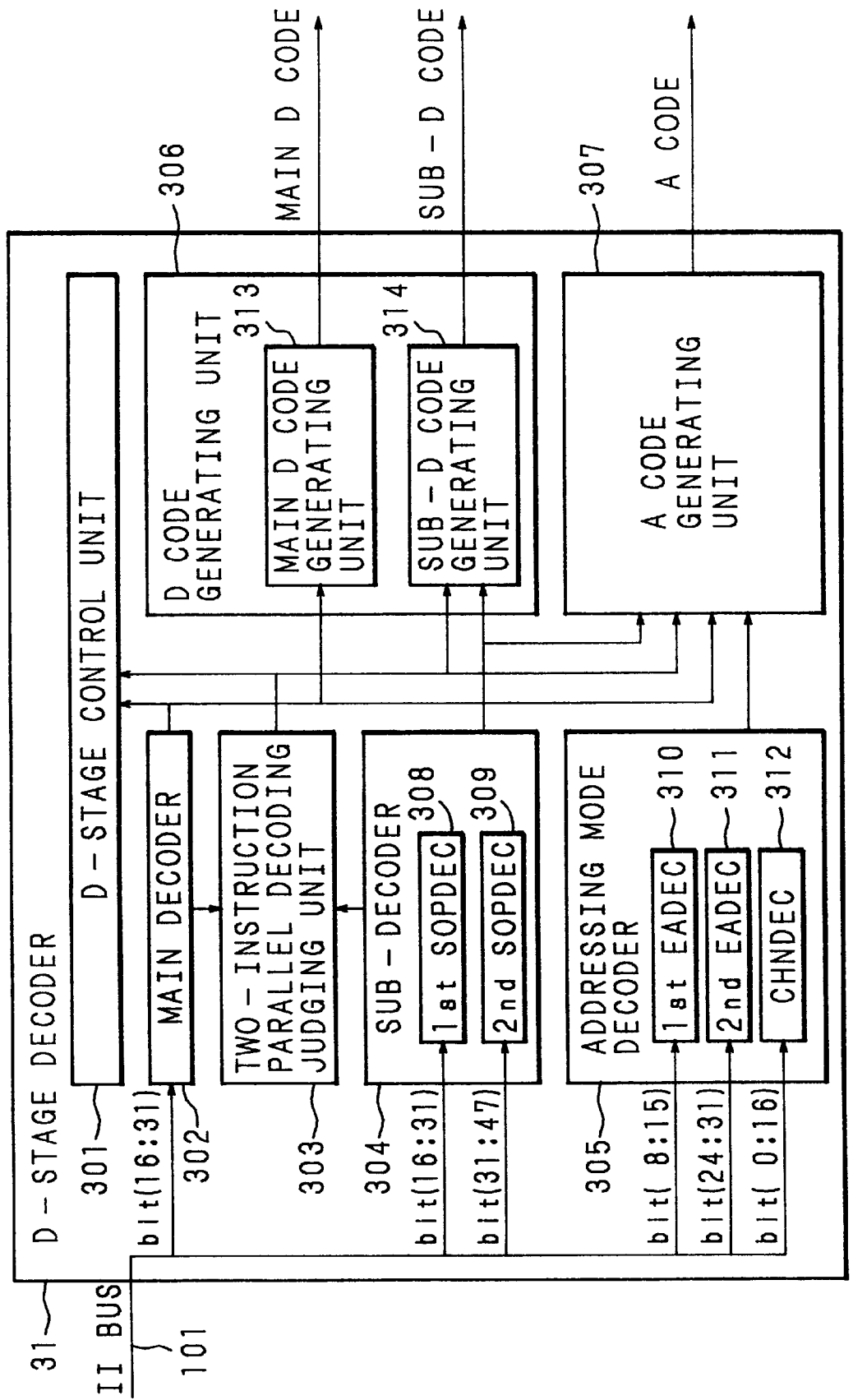
FIG. 37 is a block diagram showing a configuration example of a D stage decoder of one embodiment of a data processor.

The data processor 1 decodes two instructions in parallel by the D-stage decoder 31 of the instruction decoding unit 12. FIG. 37 is a block diagram showing a configuration example of the D-stage decoder 31.

The D-stage decoder 31 includes, a D-stage control unit 301 for state control of a D stage 402 including the D-stage decoder 31 itself, a main decoder 302 for decoding the preceding instruction when decoding two instructions in parallel, a sub-decoder 304 for decoding the succeeding instruction, a two-instruction parallel decoding judging unit 303 for judging whether or not the two-instruction parallel decoding is possible, a D code generating unit 306 generating a D code 412, an A code generating unit 307 generating an A code 413 and the like.

The main decoder 302 inputs the first to fourth bytes of the II bus 101, and decodes the instruction base part of maximum 4 bytes and 1-bit branch prediction bit.

The sub-decoder 304 includes, two decoders, a first SOPDEC 308 and a second SOPDEC 309, and decodes the instruction base part of an instruction succeeding the instruction to be decoded by the main decoder 302. The first SOPDEC 308, assuming that the instruction to be decoded by the main decoder 302 is 2 bytes, decodes the third and fourth bytes of the II bus 101. The second SOPDEC 309, assuming the instruction to be decoded by the main decoder 302 is 4 bytes, decodes the fifth and sixth bytes of the II bus 101. When the instruction decoded by the main decoder 302 and the instruction decoded by the sub-decoder 304 satisfy a parallel decoding condition to be described later, an output of either of the two decoders 308 or 309 is outputted to the D code generating unit 306.

In the main decoder 302 and sub-decoder 304, a cutting off processing of a field serving as a parameter such as the register number, size, a small immediate (literal) buried in the operation code is performed.

An addressing mode decoder 305 decodes an addressing mode part of the instruction specified by an 8-bit operand specified or a 16-bit chained mode field. The addressing mode decoder 305 includes, three decoders, a first EADEC 310 decoding an 8-bit general type addressing mode or 6-bit short addressing mode in the second byte of the II bus 101, a second EADEC 311 decoding the 8-bit general type addressing mode or 6-bit short addressing mode in the fourth byte of the II bus 101, and a CHNDEC 312 decoding the chained mode in the first and second bytes of the II bus 101. In the addressing mode decoder 305, information related to cutting-off the register number referred to in address calculation and cutting-off of extension data is also generated.

The D code generating unit 306 includes, a main D code generating unit 313 generating a main D code which is the decoded result of the preceding instruction, and a sub-D code generating unit 314 generating a sub-D code which is the decoded result of the succeeding instruction.

Since the D-stage decoder 31 has the hardware configuration described above, when the two instructions are decoded in parallel, it is limited to the case in which the processing code length in the last decoding cycle of the preceding instruction is 2-bytes or 4 bytes. The preceding instruction may be an instruction decomposed into plural steps. Since only one adder for address calculation is implemented in the operand address generating unit 14, instructions having plural memory operands can not be processed at the same time. When the succeeding instruction has a memory operand and the addressing mode decoder 305 is constituted as described above, D-stage decoder 31 is limited to the case where a processing code length in the last decoding cycle of the preceding instruction is 2 bytes except for special cases.

Figure 38:
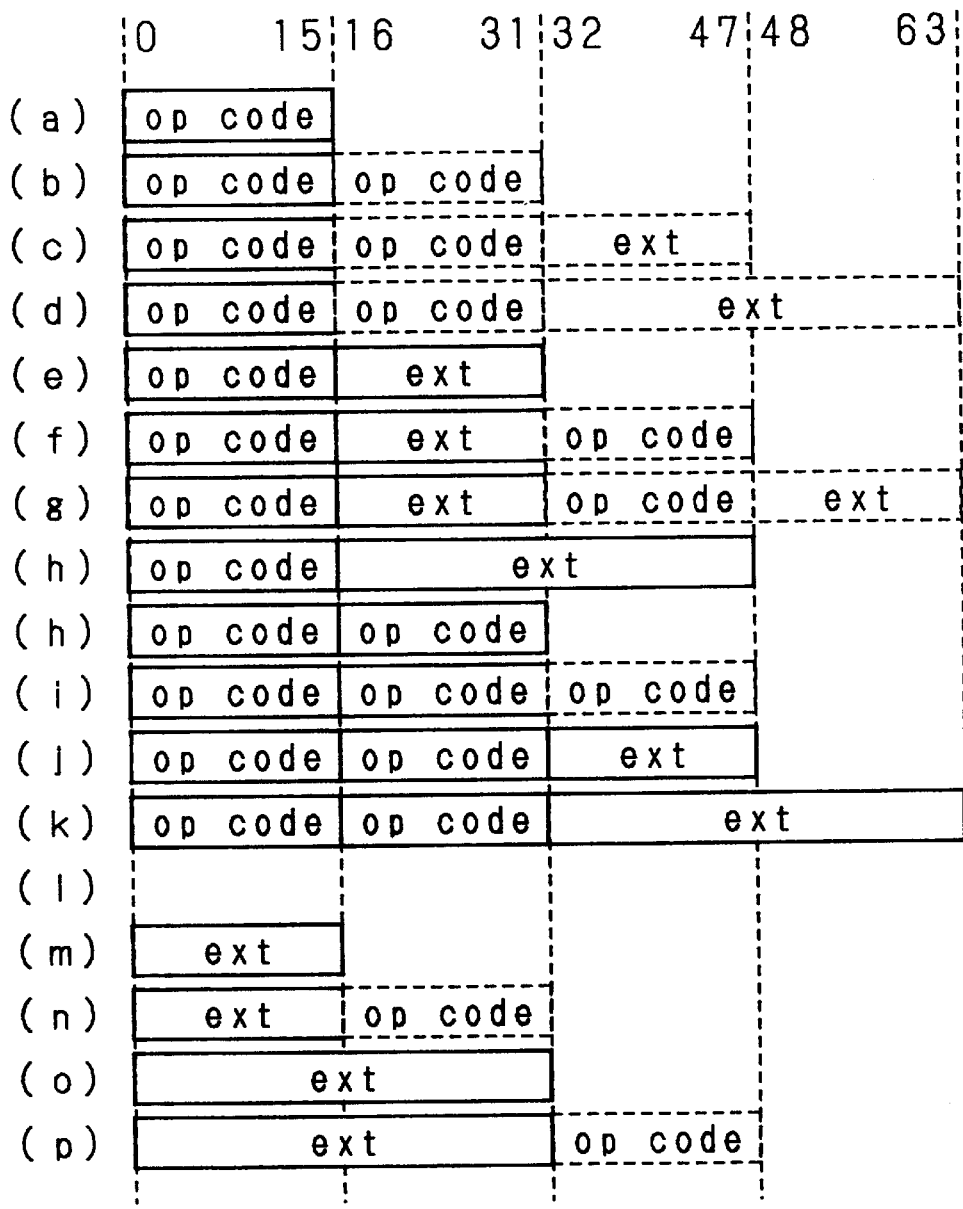
FIG. 38 is a schematic diagram showing positions of instruction codes which is decoded by a data processor by one cycle on an II bus.

Positional relationship of the instruction codes on the II bus 101 processed in one cycle is shown in a schematic diagram of FIG. 38. Hereupon, two instructions can be decoded in parallel only at the time of the last decoding cycle of the preceding instruction.

In FIG. 38, examples designated by reference characters (a) to (d) are cases where the preceding instruction has only one base part, among which, the two instructions can be decoded in parallel in the examples (b) to (d). When the preceding instruction has no immediate/memory operand, the succeeding instruction may have the memory/immediate operand or may have extension data up to 32 bits.

Examples designated by reference characters (e) to (g) are cases where the preceding instruction is consisting of one base part and a 16-bit extension part, among which, the two instructions can be decoded in parallel in the examples (f) to (g). As shown in the example (e), usually, the succeeding instruction should not have the memory/immediate operand. The example (g) is only the case where two transfer instruction performing the loading/storing in a continuous area in the register relative mode are in series.

An example designated by reference character (h) is the case where the preceding instruction is consisting of one base part and a 32-bit extension part. In this case, two instructions can not be decoded in parallel.

Examples designated by reference characters (h) to (k) are the cases where two instruction base parts of the preceding instruction are decoded at the same time. In this case, as the example (i), the two instructions can be decoded in parallel only when the instructions have no extension part.

An example designated by reference character (l) is the case where the instruction code is not consumed, and examples designated by reference characters (m) to (p) are the cases where only the extension part peculiar to the instruction is fetched. As the examples (n) or (o), there is the case where the two instructions can be decoded in parallel even when the extension part is fetched.

Figure 39:
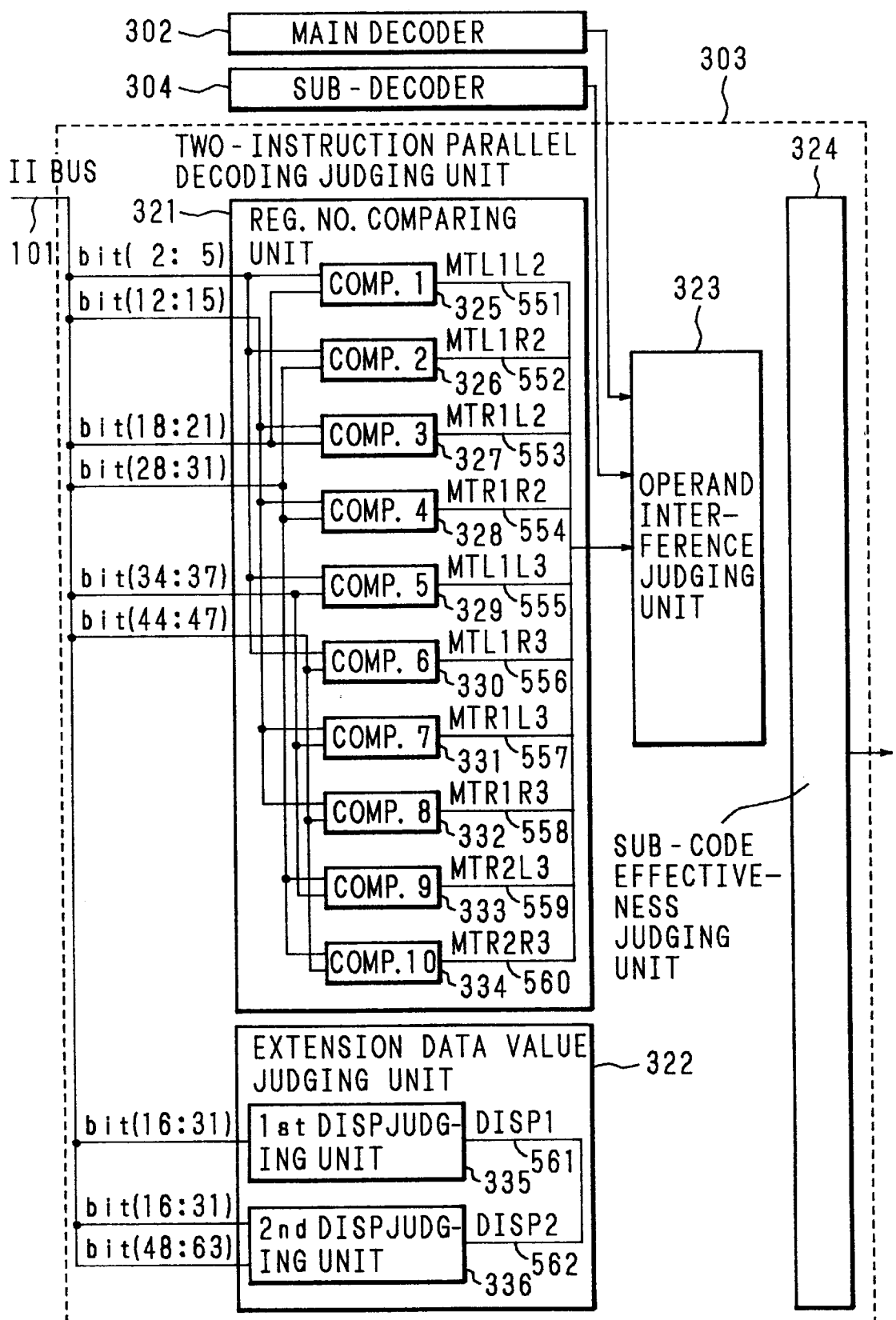
FIG. 39 is a block diagram showing a configuration example of a two-instruction parallel decoding judging unit of one embodiment of a data processor.

FIG. 39 shows a block diagram of the two-instruction parallel decoding judging unit 303, the two-instruction parallel decoding judging unit 303 includes, a register number comparing unit 321, an extension data value judging unit 332, an operand interference judging unit 323, a subcode effectiveness judging unit 324 and the like.

The register number comparing unit 321 compares register number fields on the II bus 101 for interference judgment of the register operand. In case of decoding two instructions in parallel in one cycle in the D-stage decoder 31, when considering the instruction base part, it can be classified into three cases as shown in a schematic diagram of FIG. 44.

Figure 44:
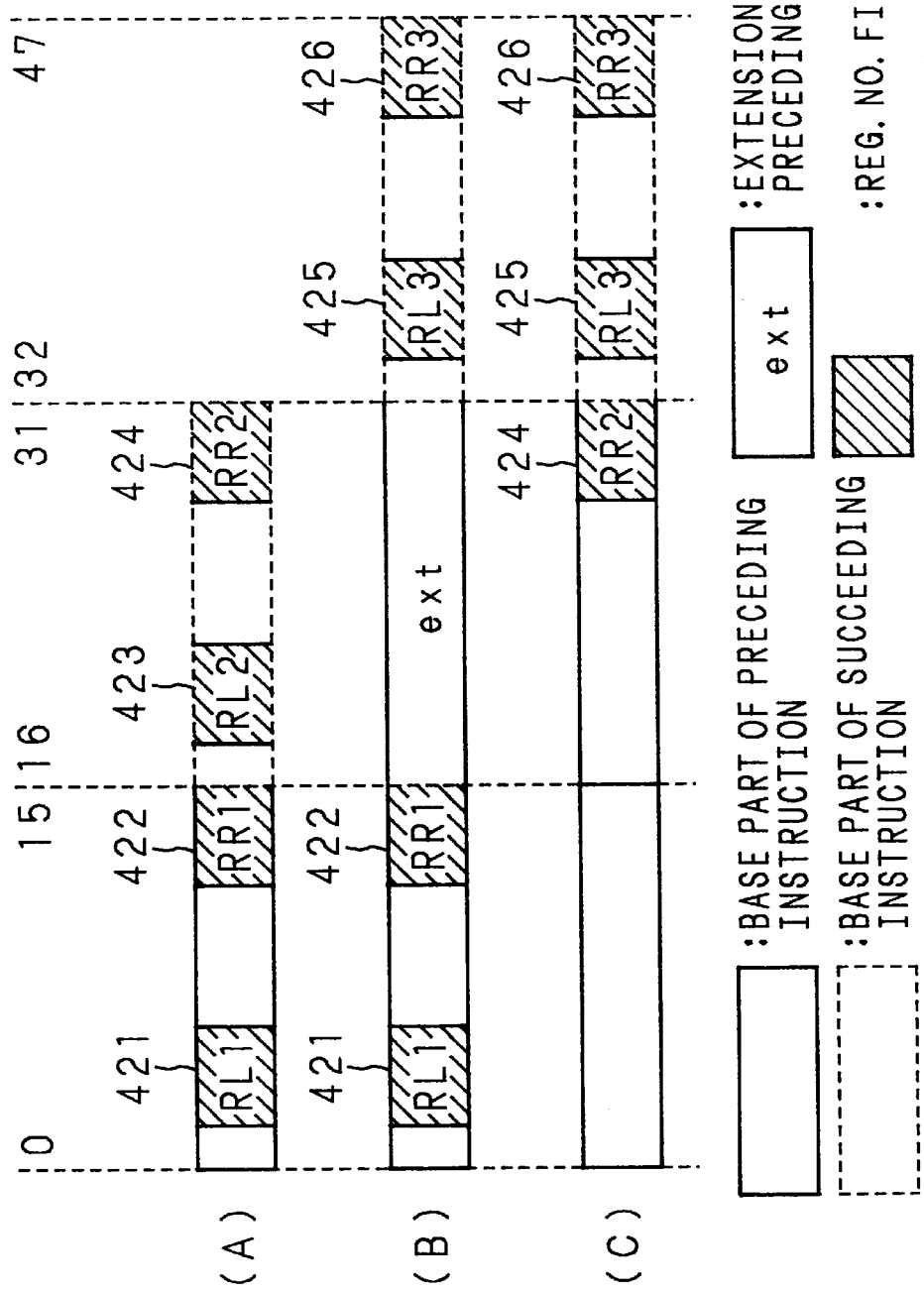
FIG. 44 is a schematic diagram showing a position of a register number field on an II bus of one embodiment of a data processor.

In FIG. 44, reference character (A) designates the case where the preceding instruction has only 2 bytes of the instruction base parts, wherein an RL1 field 421 and an RL2 field 423 must be compared with each other, and an RR1 field 422 and an RR2 field 424 must be compared with each other. Reference character (B) designates the case where the preceding instruction is 4 bytes having one instruction base part and the 16-bit extension part, wherein the RL1 field 421 and an RL3 field 425 must be compared with each other and the RR1 field 422 and an RR3 field 426 must be compared with each other. Reference character (C) designates the case where the preceding instruction is 4 bytes having two instruction base parts, wherein the RR2 field 424 must be compared with RL3 field 425 and RR3 field 426. However, in the case (C), though there is a case of updating the register of the RL2 field 423, in these instructions, the two instructions are not decoded in parallel. For comparing the register fields, in the register number comparing unit 321, there are provided ten 4-bit comparators, the comparators 1 to 10 being designated by reference characters 325 to 334.

The extension data value judging unit 322 judges extension data (displacement) in case of specifying the operand in the register relative mode, for judging whether or not two continuous transfer instructions performing the loading or storing access the continuous area. In a first DISP judging unit 335, it is judged whether or not the third byte and fourth byte (hereinafter, referred to as II (16:31)) on the II bus 101 are "4". In a second DISP judging unit 336, it is judged by subtraction whether or not the displacement specified by II (48:63) is the displacement "+4" specified by II (16:31).

Figure 40:
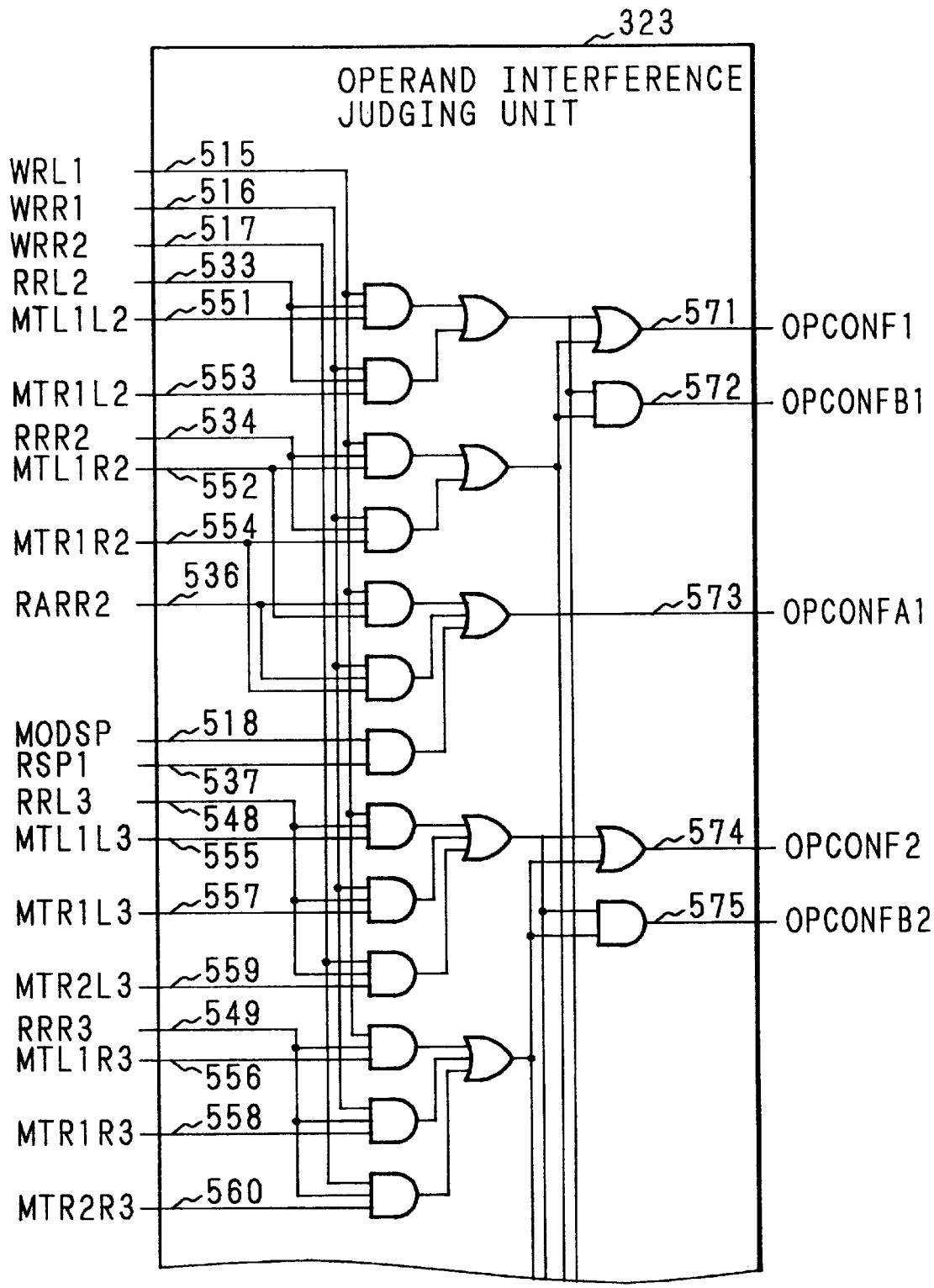
FIG. 40 is a part of a logical circuit diagram showing a detailed configuration example of an operand interface judging unit of one embodiment of a data processor.
Figure 41:
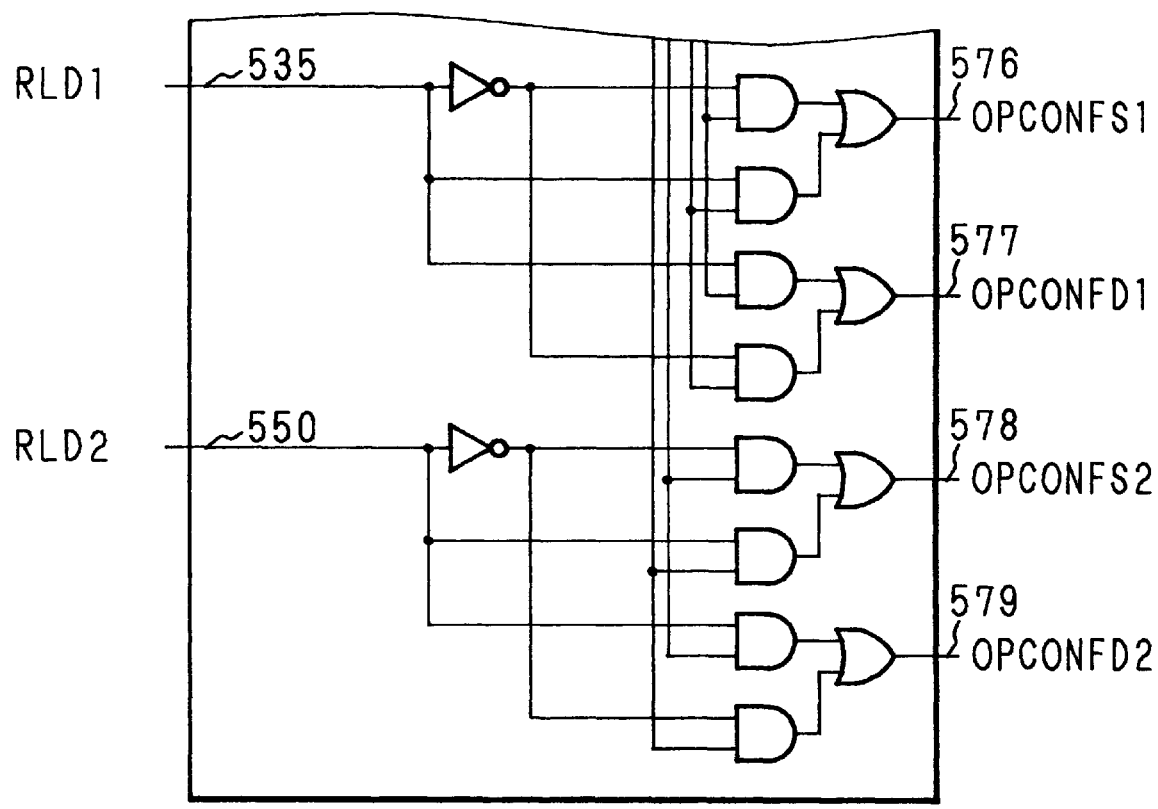
FIG. 41 is another part of the logical circuit diagram showing a detailed configuration example of an operand interference judging unit of one embodiment of a data processor.

In the operand interference judging unit 323, the interference judgment of the register operand is performed, on the basis of updating information of each register field outputted from the main decoder 302, reference information of each register field outputted from the sub-decoder 304 and the comparing result of each register field outputted from the register number comparing unit 321. A detailed logical configuration example of the operand interference judging unit 323 is shown in a logical circuit diagram of FIG. 40 and FIG. 41. However, this logical circuit diagram shows a functional processing content. FIG. 40 and FIG. 41 are originally one figure, in which a lower portion of FIG. 40 and an upper portion of FIG. 41 are connected.

Figure 42:
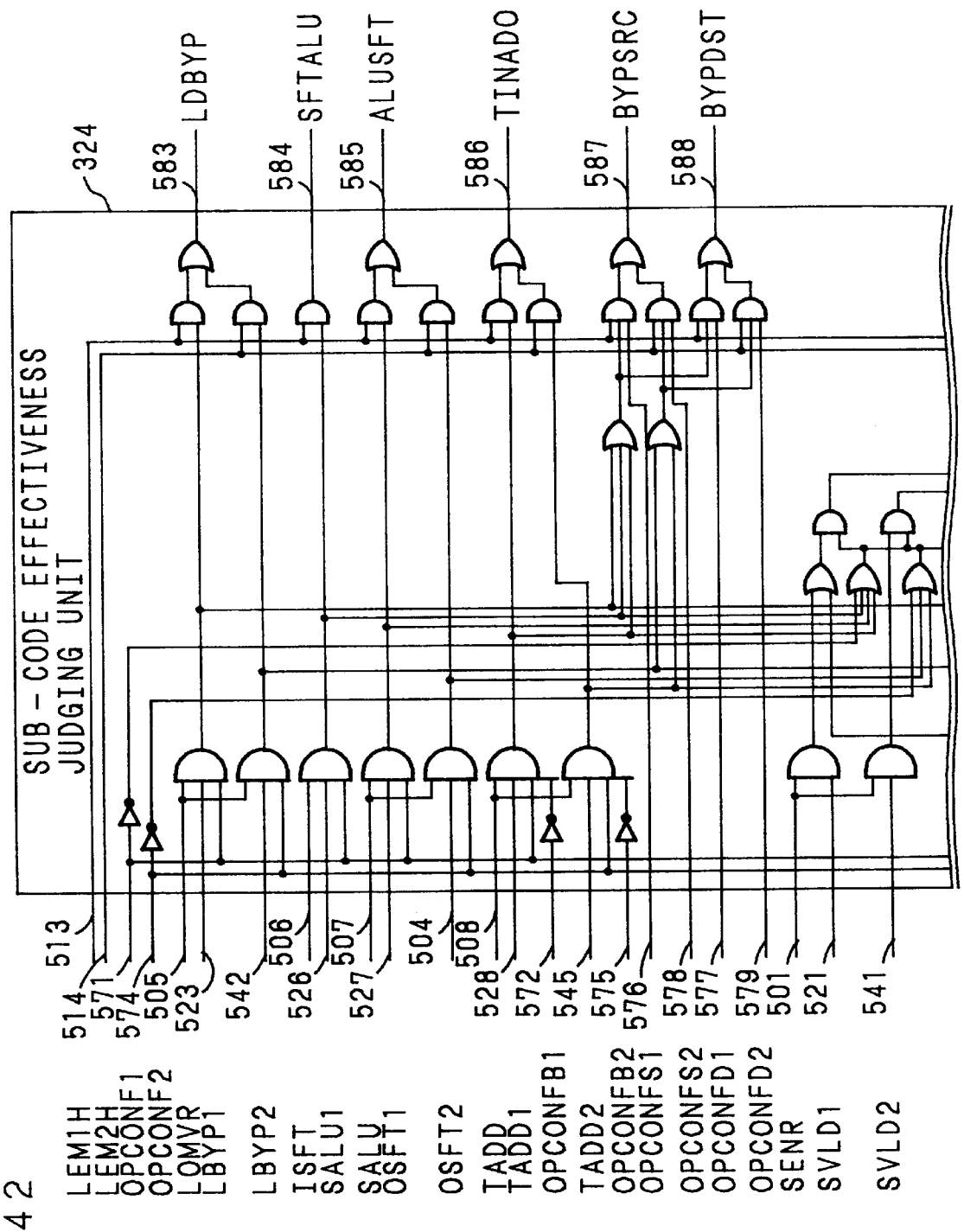
FIG. 42 is a part of a logic circuit diagram showing a detailed configuration example of a sub-code effectiveness judging unit of one embodiment of a data processor.
Figure 43:
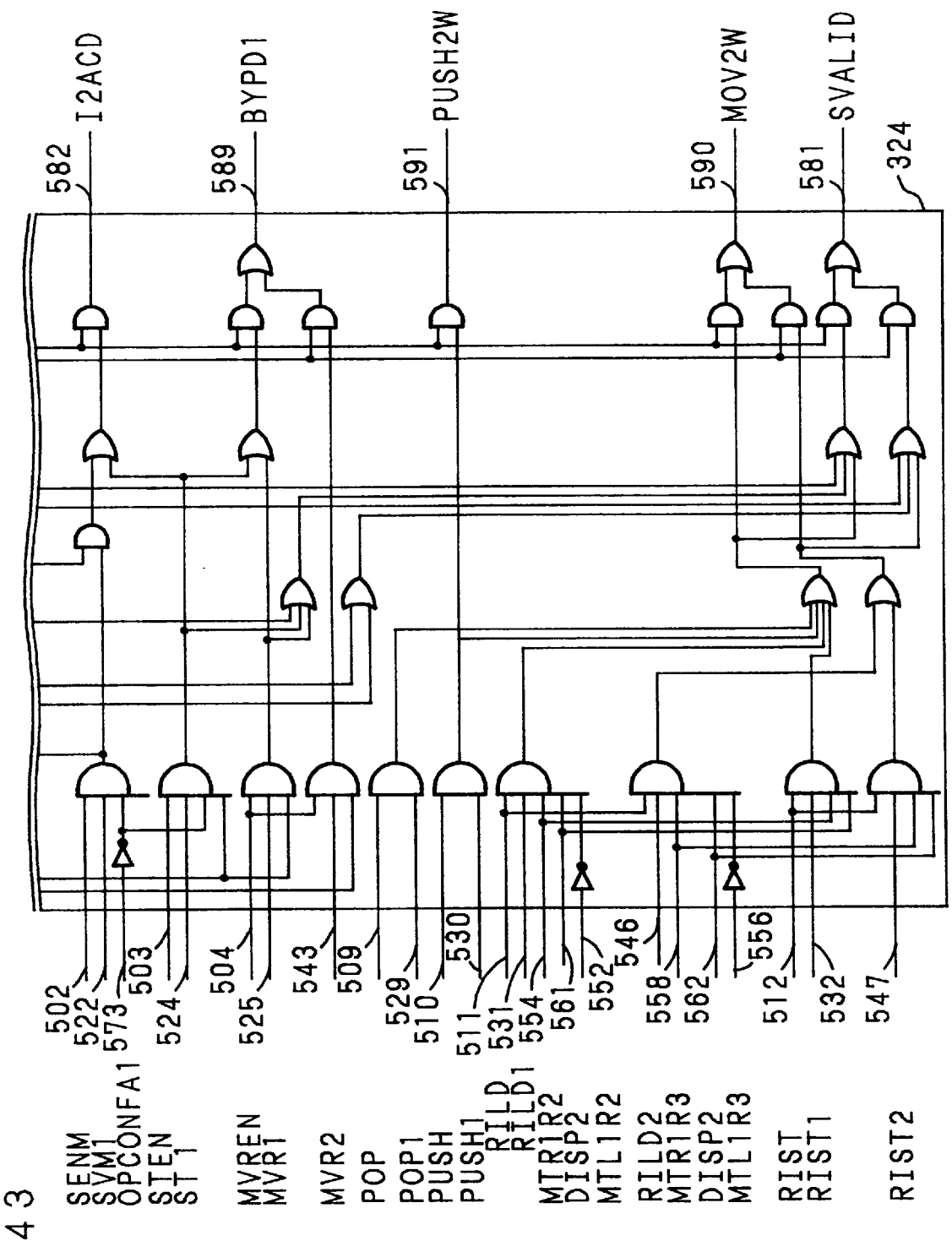
FIG. 43 is another part of the logical circuit diagram showing a detailed configuration example of a sub-code effectiveness judging unit of one embodiment of a data processor.

In the sub-code effectiveness judging unit 324, on the basis of information related to the preceding instruction outputted from the main decoder 302, information related to the succeeding instruction outputted from the sub-decoder 304, comparing result of the register fields outputted from the register number comparing unit 321, interference information of the register operand outputted from the operand interference judging unit 323, and extension data value information outputted from the extension data value judging unit 322, it is judged whether or not the two instructions can be decoded in parallel. Some control signals depending on the combination of two instructions are also generated. A detailed logical configuration example of the sub-code effectiveness judging unit 324 is shown in a logical circuit diagram of FIG. 42 and FIG. 43. This logical circuit diagram shows a functional processing content. FIG. 42 and FIG. 43 are originally one figure, in which a lower portion of FIG. 42 and an upper portion of FIG. 43 are connected.

Control signals outputted from the main decoder 302 and inputted to the two-instruction parallel decoding judging unit 303 are shown in Table 1. In Table 1, the signals designated by numerals 501 to 514 are inputted to the subcode effectiveness judging unit 324, and the signals designated by numerals 515 to 518 are inputted to the operand interference judging unit 323.

Control signals outputted from the first SOPDEC 308 of the sub-decoder 304 and inputted to the two-instruction parallel decoding judging unit 303 are shown in Table 2. In Table 2, the signals designated by numerals 521 to 532 are inputted to the sub-code effectiveness judging unit 324, and the signals designated by numerals 533 to 537 are inputted to the operand interference judging unit 323.

Control signals outputted from the second SOPDEC 309 of the sub-decoder 304 and inputted to the two-instruction parallel decoding judging unit 303 are shown in Table 3. In Table 3, the signals designated by numerals 541 to 547 are inputted to the sub-code effectiveness judging unit 324, and the signals designated by numerals 548 to 550 are inputted to the operand interference judging unit 323.

Signals transferred between blocks of the two instruction parallel decoding judging unit 321 are shown in Table 4. In Table 4, the signals designated by numerals 551 to 560 are outputted from the register number comparing unit 321, the signals designated by numerals 561 to 562 are outputted from the extension data value judging unit 322 and the signals designated by numerals 571 to 579 are outputted from the operand interference judging unit 323.

Signals outputted from the sub-code effectiveness judging unit 324 are shown in Table 5. In Table 5, the signals designated by numerals 581 to 591 are outputted from the sub-code effectiveness judging unit 324.

In these tables, contents of the signals indicate the meaning of the case where respective values are "1". The signal generated in the sub-code effectiveness judging unit 324 of the two-instruction parallel decoding judging unit 303 is transferred as a sub-code.

Parallel Execution Mechanism of Instruction Execution Unit

Tow instructions decoded in parallel by the instruction decoding unit 12 can always be executed in parallel. Basically, the preceding instruction is executed in the last microstep of the preceding instruction by the microcontrol by using the main operation circuit 208 and the S1 bus 104, S2 bus 121 or D1 bus 124, and the succeeding instruction is executed by the hard-wired control by using the subopertion circuit 207 and the S3 bus 122, S4 bus 123 or D2 bus 125.

Figure 61:
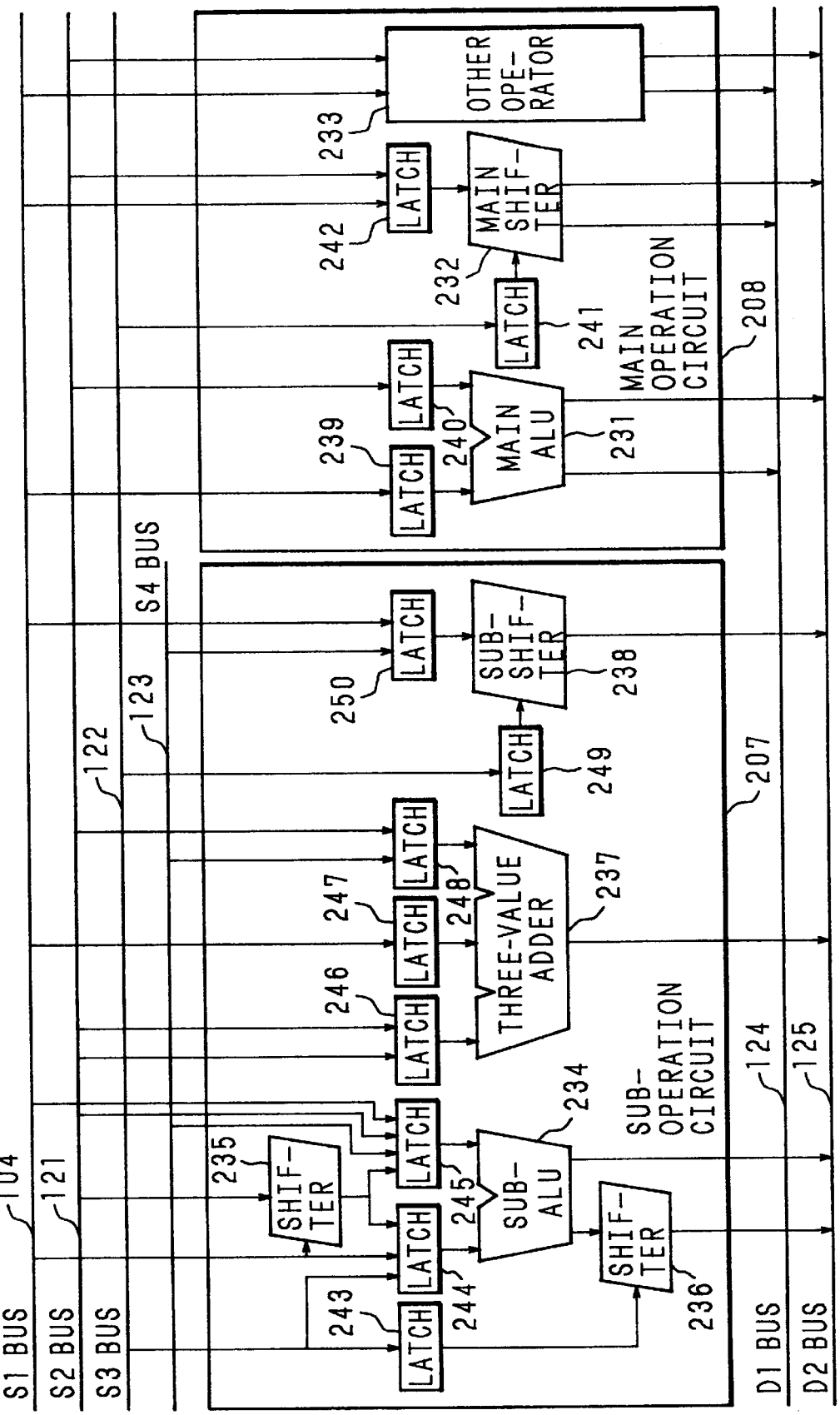
FIG. 61 is a block diagram showing a configuration example of a main operation circuit and a sub-operation circuit of one embodiment of a data processor.

FIG. 61 is a block diagram showing a more detailed configuration example of the main operation circuit 208 and sub-operation circuit 207.

The main operation circuit 208 includes, a main ALU 231 performing the arithmetic/logical operation, a main shifter 232 capable of shifting 64-bit data, another operator 233 and the like. For the purpose of complicated processing with high efficiency, some outputs of the operators are connected to the D2 bus 125 besides the D1 bus 124. The other operator 233 includes, operators such as a multiplier, a priority encoder, a counter and the like.

The sub-operation circuit 207 includes, a sub-ALU 234 performing the arithmetic/logical operation, a sub-shifter 238 shifting up to 8 bits, a three-value adder 237 for executing, in parallel, two arithmetic operation instruction having operand interference. For executing, in parallel, two instructions, a shift instruction having the operand interference and shift count number of 3 or less and an arithmetic/logical operation/comparing instruction, small shifters 235, 236 performing shift processing of 3 bits or less are connected to both inputs and output sides of the sub-ALU 234. Though the operators in the sub-operation circuit 207 are mainly connected to the S3 bus 122, S4 bus 123 and D2 bus 125, they are also connected to the S1 bus 104 or S2 bus 121 for bypassing the operand at the time of operand interference and performing the composite operation of the two instructions.

Details of Superscalar Processing

Since it is very complicated to described all cases in a lump, in the following, it is described what sort of processing is performed for each classification according to the specific processing examples. In the following description, the preceding instruction at the time of decoding two instructions in parallel is called the instruction 1 and the succeeding instruction is called the instruction 2 .

Processing in case of Class A1

At first, the case of class. A1 where the instruction 2 has no memory/immediate operand and there is not operand interference is described.

In the D stage 402, two instructions are decoded in parallel and it is judged whether or not the two instruction can be executed in parallel. As the positions of the instruction codes on the II bus 101 corresponding to class A1, there are three cases of (b), (f), (i) in FIG. 38. When the instruction 1 can execute, in parallel, the succeeding instruction 2 having no memory/immediate operand, an SENR signal 501 becomes "1". When the instruction 2 is the instruction having no memory/immediate operand executable in one cycle in the sub-operation circuit 207, in response to a code length of the instruction 1, an SVLD1 signal 512 or an SVLD2 signal 541 becomes "1".

In the operand interference judging unit 323, it is judged whether or not the instruction 2 refers to the operand updated by the instruction 1. When there is the operand interference, in response to the code length of the instruction 1, an OPCONF1 signal 571 or an OPCONF2 signal 574 becomes "1". When the above-mentioned conditions are all satisfied and the processing code length of the instruction 1 is 2 bytes or 4 bytes, it is judged that the two instructions can be executed in parallel and an SVALID signal 581 becomes "1". In this case, all of the other signals generated in the sub-code effectiveness judging unit 324 become "0".

In the main D code generating unit 313, the main D code is generated on the basis of an output of the main decoder 302. In the sub-D code generating unit 314, according to the processing code length of the instruction 1, either of the outputs of the first SOPDEC 308 or second SOPDEC 309 is selected, and together with an output signal from the two instruction parallel decoding judging unit 303, the sub-D code is generated. In the A code generating unit 307, on the basis of the output of the addressing mode decoder 305 or main decoder 302, the A code is generated. When the instruction 1 has an extension data, cutting-off of the extension data and output to the DISP bus 102 are performed in the extension data processing unit 32. In such a manner, decoded results of the two instructions are outputted at the same time when it is judged that the two instructions can be decoded in parallel.

In the A stage 403, succeeding stage decoding of the instruction 1 is performed in the A-stage decoder 34, and the sub-D code which is the decoded result of the instruction 2 is transferred by the sub-code transfer unit 35. Address calculation, correction of the SP value and so on are performed when the instruction 1 has the immediate/memory operand. Register updating information of the instruction 1 and instruction 2 are registered in the scoreboard register unit 52.

In the F stage 404, the microinstructions corresponding to the processing of the instruction 1 are read, and execution control information of the instruction 1 is generated in the first microinstruction decoder 85. An execution control information of the instruction 2 is generated in the second microinstruction decoder 86 by the hard-wired decoding of the sub-R code. When a plurality of microsteps are required for executing the instruction 1, the execution control information of the instruction 2 becomes effective in a last microstep of the instruction 1. Besides the last microstep of the instruction 1, there is the case where the second microinstruction decoder 86 decodes the microinstruction read from the micro-ROM 81 to generate execution control information related to the instruction 1. When the instruction 1 has the fetch operand, the operand is pre-fetched in the operand access unit 17.

In the E stage 405, the two instructions are executed in parallel in the last step of the instruction 1. The instruction 1 is executed by using the main operation circuit 208 and S1 bus 104 and S2 bus 121 or D1 bus 124. The instruction 2 is executed by using the sub-operation circuit 207 and S3 bus 122 and S4 bus 123 or D2 bus 125. When the instruction 1 is accompanied with an operand store in the memory, tag check of the data cache 74 and the decision of hit/miss of the cache are performed in the operand access unit 17. In this case, the cache data write and memory store are performed in the S stage 406.

Figure 45:
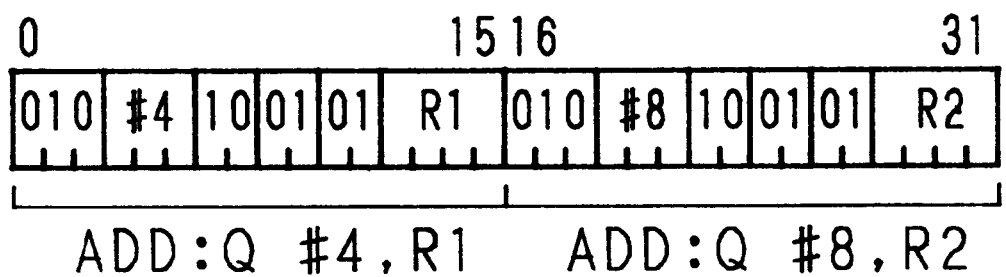
FIG. 45 is a schematic diagram showing an instruction code of the case where two instructions are executed in parallel by a data processor.
Figure 46:
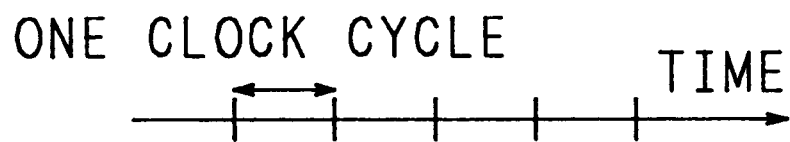
FIG. 46 is a schematic diagram showing a processing state of a pipeline of the case where two instructions are executed in parallel by a data processor.

In the following, description is made on the basis of a specific example. The case of two continuous add instructions of Q-format (ADD:Q) where the destination operand is the register is considered. The bit position of the instruction code on the II bus 101 at the time of decoding the two instructions is shown in a schematic diagram of FIG. 45. The instruction 1 is the instruction which adds "4" to R1 (register 1), and the instruction 2 is the instruction which adds "8" to R2 (register 2). In this case, since it is the combination capable of executing the two instructions in parallel and the instruction 2 never refers to the R1 rewritten by the instruction 1, the two instructions are executed in parallel. Also, in this case, since the processing code length of the instruction I is 2 bytes, the sub-D code is generated on the basis of the output result of the first SOPDEC 308. As shown in a schematic diagram of FIG. 46, the two instructions are executed in parallel in the respective pipeline stages. In the respective pipeline stages, the two instructions are processed in one cycle.

A specific process flow in the respective stages is shown in flow charts of FIGS. 47A and 47B. As shown in FIG. 47, the two instructions are processed in parallel in the respective pipeline stages and are executed in parallel in the E stage 405.

Processing in case of Class A2

Hereupon, the case of the Class A2 where the instruction 1 is the transfer instruction to the register, the instruction 2 has no memory/immediate operand and there is the operand interference is described. An instruction combination is a sub-set of the Class A1. For simplifying the processing, load operand bypassing is made possible only when two operand sizes of the instruction 1 and a destination operand size of the instruction 2 are the words. A source operand of the instruction 1 may be in the register or in the memory. Taking into consideration of an instruction execution frequency, bypassing processing of the operand is performed only when the instruction 1 is the transfer instruction of L-format (MOV:L), or the destination operand is the transfer instruction of S-format (MOV:S) of the register.

In the D stage 402, the two instructions are processed in parallel and it is judged whether or not the two instructions are to be executed in parallel. As positions of the instruction codes on the II bus 101 corresponding to the Class A2, there is the case of two positions of (b) and (f) in FIG. 38. When the instruction 1 is the aforementioned transfer instruction, an LDMVR signal 505 becomes "1". When the instruction 2 is the instruction having no memory/immediate operand which can be executed in one cycle at the sub-operation circuit 207, and the destination operand size is the word, an LBYP1 signal 523 or an LBYP2 signal 542 becomes "1" in response to the code length of the instruction 1.

In the operand interference judging unit 323, it is judged whether or not the instruction 2 refers to the operand updated by the instruction 1. When there is the operand interference, an OPCONF1 signal 571 or an OPCONF2 signal 574 becomes "1" in response to the code length of the instruction 1. When all of the above-mentioned conditions are satisfied and the processing code length of the instruction 1 is 2 bytes or 4 bytes, it is judged that the two instructions can be executed in parallel and the SVALID signal 581 becomes "1", and at the same time, an LDBYP signal 583 indicating that the load operand is bypassed becomes "1". Furthermore, when bypassing the source operand of the instruction 2, a BYPSRC signal 587 becomes "1" and when bypassing the destination operand of the instruction 2, a BYPDST signal 588 becomes "1". However, there is also the case where both signals 587 and 588 become "1". All of the other signals generated in the sub-code effectiveness judging unit 324 become "0". A signal related to the operand bypass is also outputted as the sub-D code and to be transferred. Other processing are same as the case of the Class A1.

Processing in the A stage 403 and F stage 404 are same as the case of the Class A1.

In the E stage 405, the two instructions are executed in parallel in the last step of the instruction 1. The Class A2 is different from the Class A1 in that the operand bypassing processing is performed. The instruction 1 is executed by writing the source operand data outputted to the S1 bus 104 into a register specified as a destination through the main ALU 231 and D1 bus 124. Though the instruction 2 is basically executed by the S3 bus 122, S4 bus 123, D2 bus 125 and sub-operation circuit 207, data with the operand interference can obtain the correct result by bypassing and fetching data on the S1 bus 104 in place of data on the S3 bus 122 and S4 bus 123. For example, when the operand interference has occurred in the source operand of the instruction 2 at the time of executing the instruction 2 in the sub-ALU 234, data is fetched into the latch 244 by bypassing from the S1 bus 104 in place of the S3 bus 122, and when the operand interference has occurred in the destination operand of the instruction 2, data is fetched into the latch 245 by bypassing from the S1 bus 104 in place of the S4 bus 123. When the instruction 2 is the shift instruction executed in the sub-shifter 238, and the operand interference has occurred in the destination operand of the instruction 2, data is fetched into the latch 250 by bypassing from the S1 bus 104 in place of the S4 bus 123. The instruction 2 is processed by the sub-shifter 238 because it is only the shift instruction of W-format where a literal is specified as the shift count value, and the shift count value of the shift instruction need not be bypassed. When the instruction 2 writes the operation result into a same register as the destination of the instruction 1, writing from the D2 bus 125 has priority.

Figure 48:
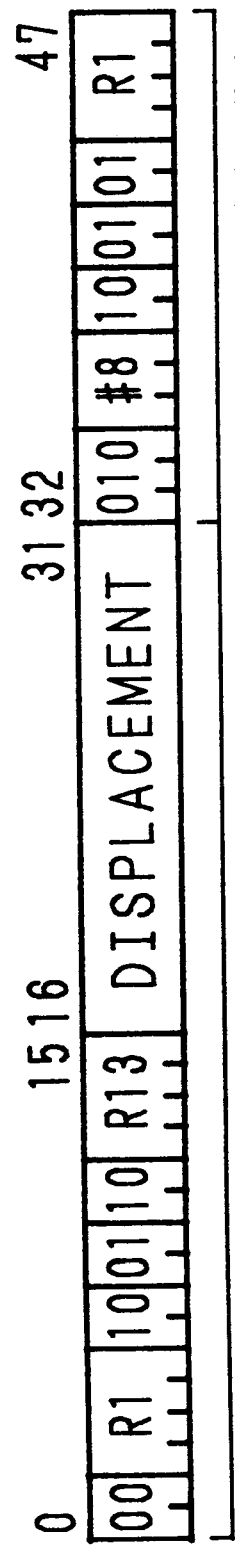
FIG. 48 is a schematic diagram showing an instruction code of the case where two instructions are executed in parallel by a data processor.

In the following, description is made on the basis of a specific example. The case where the instruction 1 is the transfer instruction of L-format (MOV:L) which loads the memory operand specified by the register relative indirect mode onto the R1, and the instruction 2 is the add instruction of Q-format (ADD:Q) which adds "8" to the R1 is considered. Assuming that a base register of the memory operand of the instruction 1 is R13, a displacement is 16 and specified by 16-bit extension data. Bit position on the II bus 101 of the instruction codes at the time of decoding the two instructions are shown in a schematic diagram of FIG. 48. In this case, though there is operand interference between the two instructions, it is an instruction combination capable of executing the two instruction in parallel by bypassing the load operand. In this case, since the load operand bypass is performed as to the destination operand of the instruction 2, an LDBYP signal 583 and BYPDST signal 588 become "1". Also, since the processing code length of the instruction 1 is 4 bytes, the sub-D code is generated on the basis of the output result of the second SOPDEC 309.

Figure 49B:
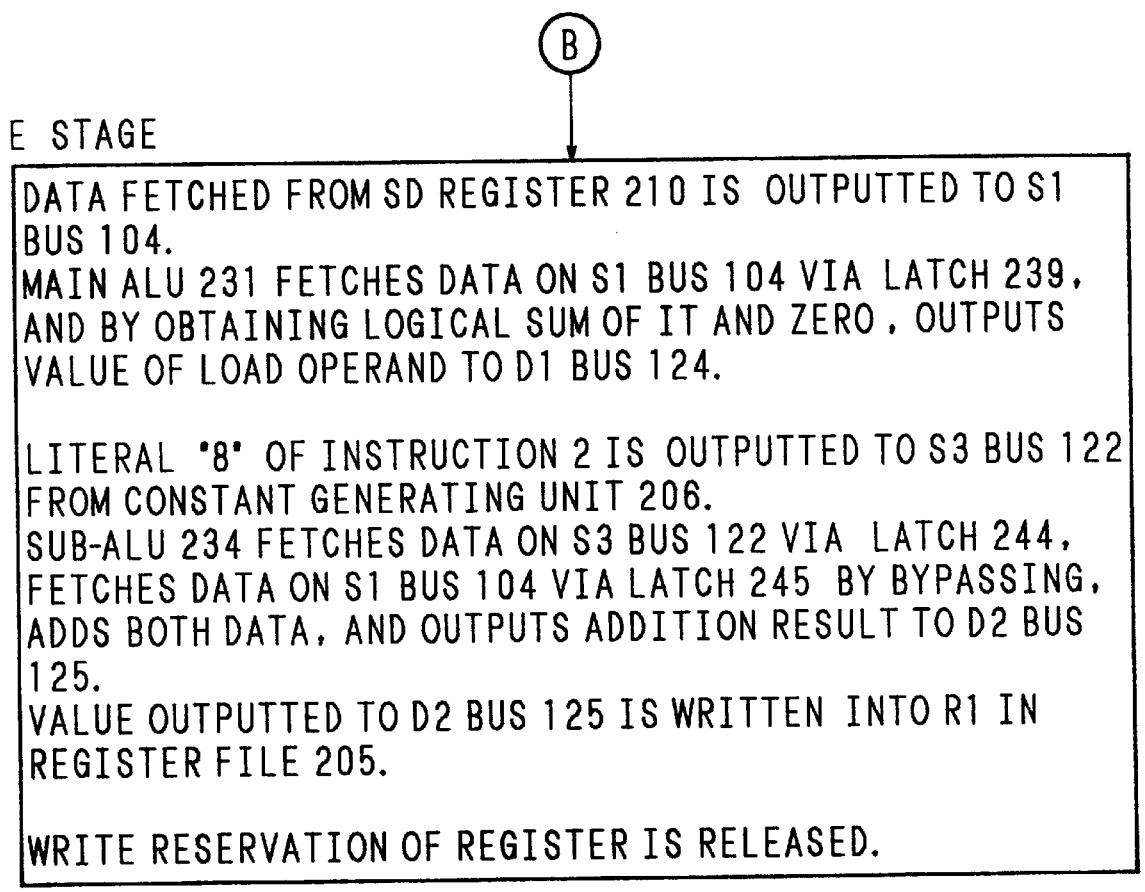

A flow of specific process in the respective stages is shown in flow charts of FIGS. 49A and 49B. The two instructions are processed in parallel in the respective pipeline stages and are executed in parallel in the E stage 405. In this example, the instruction 2 is the instruction executed in the sub-ALU 134, and there is the operand interference in the destination operand of the instruction 2. Thus, a value on the S1 bus 104 to be loaded on the R1 by the instruction 1 is directly fetched into the latch 245 of the sub-ALU 234 for operation. Data on the D2 bus 125 which is the execution result of the instruction 2 is written into the R1. Data on the D1 bus 124 is not written.

Processing in case of Class A3

Hereupon, the case of the Class A3, where the instruction 1 is the instruction writing the operation result into the register and the instruction 2 is the transfer instruction transferring the operation result of the instruction 1 to the other register is described. Also in this case, an instruction combination is a sub-set of the Class A1. For simplifying the processing, bypassing of the write operand is made possible only when a destination operand size of the instruction 1 and two operand sizes of the instruction 2. are the words. The source operand of the instruction 1 may be in the register or in the memory.

However, it is limited to the case, where the instruction 1 is the instruction outputting data written into the register in the last microstep to the D1 bus 124, and the instruction 2 is the transfer instruction for register-register transfer of L-format or S-format (MOV:L, MOV:S).

In the D stage 402, the two instruction are decoded in parallel and it is judged whether or not they can be executed in parallel. As positions of the instruction codes on the II bus 101 corresponding to the Class A3, there are three cases of (b), (f) and (i) in FIG. 38. When the instruction 1 is the instruction whose destination operand size is the word, and written into the register via the D1 bus 124 in the last microstep, an MVREN signal 504 becomes "1". When the instruction 2 is the aforementioned register transfer instruction, an MVR1 signal 525 or an MVR2 signal 543 becomes "1" in response to the code length of the instruction 1.

In the operand interference judging unit 323, it is judged whether or not the instruction 2 refers to the operand updated by the instruction 1. When there is the operand interference, an OPCONF1 signal 571 or an OPCONF2 signal 574 become "1" in response to the code length of the instruction 1. When all of the above-mentioned conditions are satisfied and the processing code length of the instruction 1 is 2 bytes or 4 bytes, it is judged that the two instructions can be executed in parallel and the SVALID signal 581 becomes "1" as well as a BYPD1 signal 589 indicating bypassing of the write operand becomes "1". All of the other signals generated in the sub-code effectiveness judging unit 324 become "0". A signal related to the operand bypass is also outputted as the sub-D code and is to be transferred. Other processing are same as those in the case of the Class A1.

Processing in the A stage 403 and F stage 404 are same as those in the case of the Class A1.

In the E stage 405, the two instructions are executed in parallel in the last step of the instruction 1. The Class A3 is different from the Class A1 in that, the bypassing processing of the operand is performed. In the last microstep of the instruction 1, the operation is performed by any of the operators of the main operation circuit 208, and the operation result is written via the D1 bus 124 into the register specified as the destination. The instruction 2 is executed by writing a value outputted to the D1 bus 124 into the register specified as the destination of the instruction 2.

Figure 50:
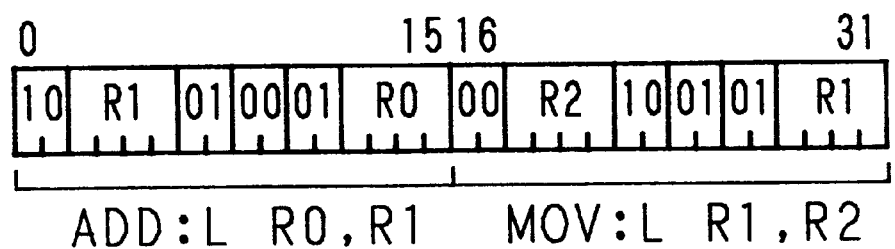
FIG. 50 is a schematic diagram showing an instruction code of the case where two instructions are executed in parallel by a data processor.

In the following, description is made on the basis of a specific example. The case where the instruction 1 is the add instruction of L-format (ADD:L) which adds a value of the R0 to the R1, and the instruction 2 is the transfer instruction of L-format (MOV:L) which transfers a value of the R1 to the R2 is considered. Bit positions of the instruction codes on the II bus 101 at the time of decoding the two instructions are shown in a schematic diagram of FIG. 50. In this case, though there is the operand interference between two instructions, it is an instruction combination capable of executing the two instructions in parallel by operand bypassing of the write operand. In this case, the BYPD1 signal 589 becomes "1".

Figure 51B:
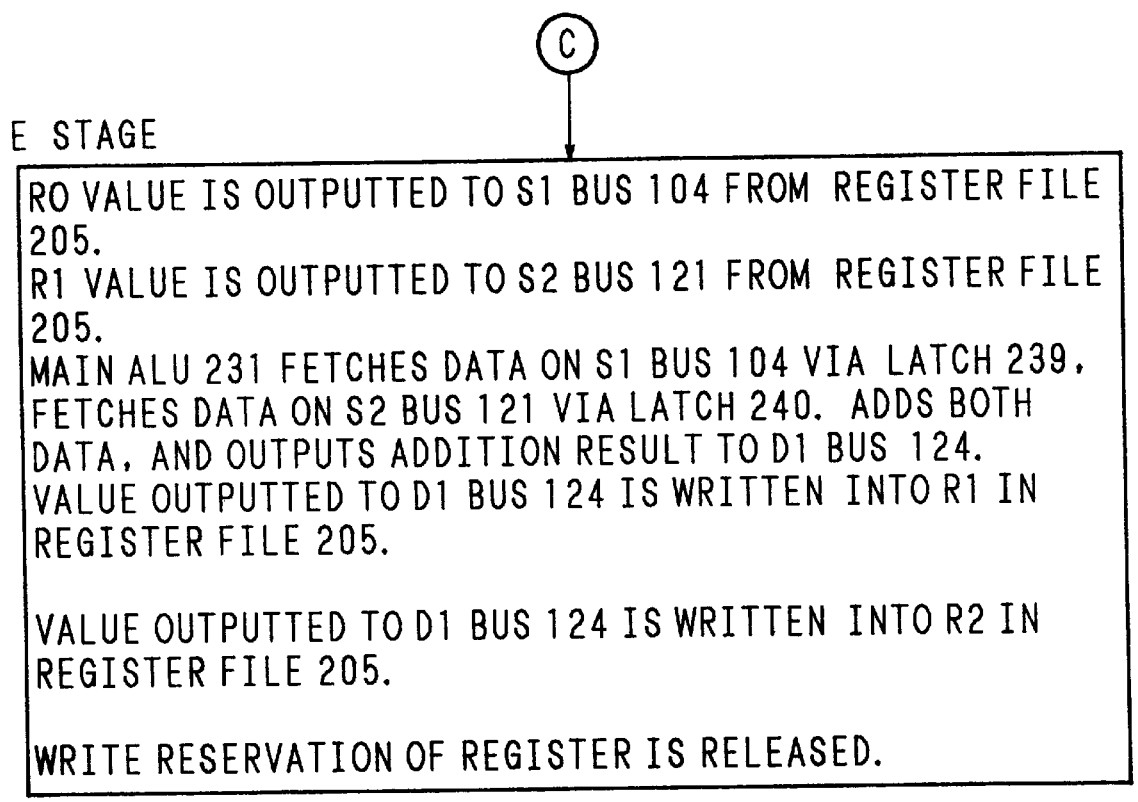

A flow of specific process in the respective stages is shown in flow charts of FIGS. 51A and 51B. The two instructions are processed in parallel in the respective pipeline stages and are executed in parallel in the E stage 405. In this example, the instruction 1 is executed in the main ALU 231 and the operation result is written into the R1 via the D1 bus 124 as well as the value is also written into the R2. In this case, an effective processing is not performed in the sub-operation circuit 207.

Processing in Case of Class A4

The case of Class A4, where the instruction 1 is the left-shift instruction of 3 bits or less and the instruction 2 is the arithmetic operation/logical operation/comparing instruction which refers to the shift result of the instruction 1 is described. An instruction combination is a subset of the Class A1. However, the two instructions can be executed in parallel only when the instruction 1 is the logical shift instruction of Q-format (SHL:Q) and a destination operand size is the word.

In the D stage 402, it is judged whether or not the two instructions are decoded in parallel and they can be executed in parallel. As positions of the instruction codes on the II bus 101 corresponding to the Class A4, there is only a case of (b) in FIG. 38. When the instruction 1 can execute in parallel the succeeding instruction 2 having no memory/immediate operand, the SENR signal 501 becomes "1". Furthermore, when the instruction 1 whose destination is the register and the size is the word, and which performs a shift of 3 bits or less, an ISFT signal 506 becomes "1". When the instruction 2 is the instruction having no memory/immediate operand executable in one cycle in the suboperation circuit 207, the SVLD1 signal 512 becomes "1" in response to the code length of the instruction 1. Furthermore, when the instruction 2 is the arithmetic operation/logical operation/ comparing instruction executable in the sub-ALU 234, an SALUL signal 526 becomes "1".

In the operand interference judging unit 323, it is judged whether or not the instruction 2 refers to the operand updated by the instruction 1. When there is the operand interference, the OPCONF1 signal 571 or OPCONF2 signal 574 becomes "1" in response to the code length of the instruction 1. When there is no operand interference and the processing code length of the instruction 1 is 2 bytes or 4 bytes, it becomes the Class AL. However, in this case, it is judged that the two instructions can be executed in parallel even when there is the operand interference, when the processing code length of the instruction L is 2 bytes and the SVALID signal 581 becomes "1". Also, an SFTALU signal 584 indicating a composite operation of the shift operation and the ALU operation becomes "1". Furthermore, when bypassing the source operand of the instruction 2, the BYPSRC signal 587 becomes "1", and when bypassing the destination operand of the instruction 2, the BYPDST signal 588 becomes "1". However, there is also the case that both signals 587 and 588 become "1". All of the other signals generated in the sub-code effectiveness judging unit 324 become "0". A signal related to the operand bypass is also outputted as the sub-D code and is to be transferred. Other processing are same as those in the case of the Class A1.

Processing in the A stage 403 and F stage 404 are same as those in the case of the Class A1.

In the E stage 405, the two instructions are executed in parallel in the last step of the instruction 1. The Class A4 is different from the Class A1 in that, the composite operation of the shift operation and the ALU operation is performed in the sub-operation circuit 207. A literal value (a shift count value) outputted to the S1 bus 104 is fetched into the latch 241, and destination data outputted to the S2 bus 121 is fetched into the latch 242 so that shift operation in the main shifter 232 is performed. The instruction 1 is executed by writing the shift result into a register specified as a destination via the D1 bus 124. In the sub-operation circuit 207, a composite operation of the instruction 1 and instruction 2 is performed by using the sub-ALU 234 and input shifter 235. In the input shifter 235, the shift operation is performed for data fetched from the S2 bus 121 according to a shift count value fetched from the S1 bus 104, and the shift result is outputted to the latches 244 and 245. The latches 244 and 245 fetch the operand data being not interfered from the S3 bus 122 or S4 bus 123, and fetch the operand data being interfered as data of an output of the input shifter 235. For example, when the operand interference has occurred in the source operand of the instruction 2, an output of the input shifter 235 is fetched into the latch 244 in place of the S3 bus 122, and when the operand interference has occurred in the destination operand of the instruction 2, data is fetched into the latch 245 from the input shifter 235 in place of the S4 bus 123. In the subALU 234, the operation designed by the instruction 2 is performed and the operation result is written into the register specified as the destination of the instruction 1 via the D2 bus 125. When the instruction 2 writes the operation result into the register same as the destination of the instruction 1, writing from the D2 bus 125 has priority. The reason why only a left shift up to 3 bits is performed in the input shifter 235 is that, the left shift of 1 to 3 bits is frequently used in address calculation of an array and the like. It is set in such a way, because a processing time in the shifter is prolonged to deteriorate the operating frequency when the number of bits which can be shifted is increased.

In the following, description is made on the basis of a specific example. The case where the instruction 1 is the shift instruction of Q-format (SHL:Q) shifting a value of the R1 to the left by 3 bits, and the instruction 2 is the add instruction of L-format (AA:L) adding a value of the R1 to the R2 is considered. In this case, though there is the operand interference between the two instructions, it is an instruction combination, whereby the two instructions can be executed in parallel by the composite operation of the shift operation of the instruction 1 and the add operation of the instruction 2. In this case, an SFTALU signal 584 and a BYPSRC signal 587 become "1".

A specific process flow in the stages is shown in flow charts of FIGS. 52A and 52B. The two instructions are processed in parallel in the respective pipeline stages, and are executed in parallel in the E stage 405. In this example, the instruction 1 is executed in the main shifter 232 and the operation result is written into the R1 via the D1 bus 124. The shift operation of the instruction 1 and the add operation of the instruction 2 are executed in the same cycle using the sub-ALU 234 and input shifter 235, and the operation results are written into the R2.

Processing in case of Class A5

The case of Class A5, where the instruction 1 is the arithmetic operation/logical operation instruction and the instruction 2 is the left-shift instruction of 3 bits or less which refers to the operation result of the instruction 1 is described. An instruction combination is a sub-set of the Class A1. However, the two instructions can be executed in parallel only when the instruction 2 is the logical shift instruction of Q-format (SHL:Q).

In the D stage 402, it is judged whether or not the two instructions are decoded in parallel and they can be executed in parallel. As positions of the instruction codes on the II bus 101 corresponding to the Class A5, there are three cases of (b), (f) and (i) in FIG. 38. When the instruction 1 can execute, in parallel, the succeeding instruction 2 having no memory/immediate operand, the SENR signal 501 becomes "1". Furthermore, when the instruction 1 is the arithmetic operation/logical operation executable in the sub-ALU 234, the SALU signal 507 becomes "1". When the instruction 2 is the instruction having no memory/immediate operand executable in one cycle in the sub-operation circuit 207, the SVLD1 signal 512 or SVLD2 signal 541 becomes "1", in response to the code length of the instruction 1. Meanwhile, when a size of the instruction 2 is the word and the instruction 2 performs shift operation of 3 bits or less, an OSFT1 signal 527 or OSFT2 signal 544 becomes "1" in response to the code length of the instruction 1.

In the operand interference judging unit 323, it is judged whether or not the instruction 2 refers to the operand updated by the instruction 1. When there is the operand interference, the OPCONF1 signal 571 or OPCONF2 signal 574 becomes "1" in response to the code length of the instruction 1. When the processing code length of the instruction 1 is 2 bytes or 4 bytes and there is no operand interference, it becomes the Class A1. However, in this case, it is judged that the two instructions can be executed in parallel even when there is the operand interference, and the SVALID signal 581 becomes "1". Also, an ALUSFT signal 585 indicating a composite operation of the ALU operation and the shift operation becomes "1". All of the other signals generated in the sub-code effectiveness judging unit 324 become "0". A signal related to the composite operation is also outputted as the sub-D code and is to be transferred. Other processing are same as the case of Class A1.

Processing in the A stage 403 and F stage 404 are same as those in the case of Class A1. However, in this case, operation information of the instruction 1 in the main R code is referred to in generating operation control information of the sub-operation circuit 207.

In the E stage 405, the two instructions are executed in parallel in the last step of the instruction 1. The Class A5 is different from the Class A1 in that, the composite operation of the ALU operation and shift operation is performed in the sub-operation circuit 207. Source operand data outputted to the S1 bus 104 is fetched into the latch 239, and destination operand data outputted to the S2 bus 121 is fetched into the latch 240 so that arithmetic/logical operation in the main ALU 231 is performed, the operation result is outputted to the D1 bus 124 so that the instruction 1 is executed. In the suboperation circuit 207, a composite operation of the instruction 1 and instruction 2 is performed using the sub-ALU 234 and its output shifter 236. The source operand data outputted to the S1 bus 104 is fetched into the latch 244, and the destination operand data outputted to the S2 bus 121 is fetched into the latch 245. In the sub-ALU 234, the entirely same operation as that in the arithmetic/logical operation of the instruction 1 executed in the main ALU 231 is performed, and the operation result is outputted to the output shifter 236. The latch 243 fetches a literal (a shift count value of the instruction 2) outputted to the S3 bus 122. In the output shifter 236, data fetched from the sub-ALU 234 is shifted by the value fetched into the latch 243. The shift result is written into the register specified as a destination of the instruction 2 via the D2 bus 125. In this case, the register as the destination of the instruction 1 and the register as the destination of the instruction 2 are always same, and the operation result is written from the D2 bus 125. The reason for performing only the left shift up to 3 bits in the output shifter 236 is same as that in the input shifter 235.

In the following, description is made on the basis of a specific example. The case where the instruction 1 is the add instruction of L-format (ADD:L) which adds a value of the R0 to the R1, and the instruction 2 is the shift instruction of Q-format (SHL:Q) which shifts a value of the R1 to the left by 3 bits is considered. In this case, though there is the operand interference between the two instructions, it is an instruction combination, whereby the two instruction can be executed in parallel by the composite operation of the add operation of the instruction 1 and the shift operation of the instruction 2. In this case, the ALUSFT signal 585 becomes "1".

A specific process flow in the stages is shown in flow charts of FIGS. 53A and 53B. The two instructions are processed in the respective pipeline stages in parallel, and are executed in parallel in the E stage 405. In this example, the instruction 1 is executed in the main ALU 231. The add operation of the instruction 1 and the shift operation of the instruction 2 are executed in the same cycle using the sub-ALU 234 and output shifter 236, and the operation result is written into the R1 via the D2 bus 125.

Processing in case of Class A6

The case of Class A6, where the instruction 1 is the arithmetic operation instruction and the instruction 2 is the arithmetic operation/comparing operation which refers to the operation result of the instruction 1 is described. An instruction combination is a subset of the Class A1. However, it is limited to the case where a size of the operand to be interfered is the word.

In the D stage 402, it is judged whether or not the two instructions are decoded in parallel and they can be executed in parallel. As positions of the instruction codes on the II bus 101 corresponding to the Class A6, there are three cases of (b), (f) and (i) in FIG. 38. When the instruction 1 can execute, in parallel, the succeeding instruction 2 having no memory/immediate operand, the SENR signal 501 becomes "1". Furthermore, when the instruction 1 is the arithmetic operation instruction, a destination thereof is the register and a size thereof is the word, executable in the three-value adder 237, a TADD signal 508 becomes "1". When the instruction 2 is the instruction having no memory/immediate operand executable in one cycle in the sub-operation circuit 207, the SVLD1 signal 512 or SVLD2 signal 541 become "1" in response to the code length of the instruction 1. Meanwhile, when the instruction 2 whose size is the word is the arithmetic operation/comparing instruction executable in the three-value adder 237, the TADD1 signal 528 or TADD2 signal 545 becomes "1" in response to the code length of the instruction 1.

In the operand interference judging unit 323g it is judged whether or not the instruction 2 refers to the operand updated by the instruction 1. When there is the operand interference, the OPCONF1 signal 571 or OPCONF2 signal 574 becomes "1" in response to the code length of the instruction 1. Furthermore, when the source operand and the destination operand of the instruction 2 are the same register an OPCONFB1 signal 572 or OPCONFB2 signal 575 becomes "1" in response to the code length of the instruction 1. When the processing code length of the instruction 1 is 2 bytes or 4 bytes and there is no operand interference, it becomes the Class A1. However, in this case, even when there is the operand interference, when the source operand and destination operand of the instruction 2 are different from each other, it is judged that the two instruction can be executed in parallel and the SVALID signal 581 becomes "1". And also, a TINADD signal 586 indicating the composite operation of two arithmetic operation in the three-value adder 237 becomes "1". Furthermore, when bypassing the source operand of the instruction 2, the BYPSRC signal 587 becomes "1" and when bypassing the destination operand of the instruction 2J the BYPDST signal 588 becomes "1". However, there is no case where the both signals 587 and 588 become "1". All of the other signals generated in the sub-code effectiveness judging unit 324 become "0". A signal related to the composite operation is also outputted as the sub-D code and is to be transferred. Other processing are same as in the case of Class A1.

Processing in the A stage 403 and the F stage 404 are same as in the case of Class A1. However, in this case, operation information of the instruction 1 in the main R code is referred to in generating operation control information of the sub-operation circuit 207.

In the E stage 405, the two instructions are executed in parallel in the last step of the instruction 1. The Class A6 is different from the Class A1 in that, the composite operation of two arithmetic operation instructions is executed in the sub-operation circuit 207 using the three-value adder 237. Source operand data outputted to the S1 bus 104 is fetched into the latch 239, and destination operand data outputted to the S2 bus 121 is fetched into the latch 240 so that arithmetic operation in the main ALU 231 is performed. The instruction 1 is executed by outputting the operation result to the D1 bus 124 and writing it into a register specified as a destination of the instruction 1. In the sub-operation circuit 207, a composite operation of the instruction 1 and instruction 2 is performed using the three-value adder 237. When there is the source operand interference, the source operand data of the instruction 1 outputted to the S1 bus 104 is fetched into the latch 247, the destination operand data of the instruction 1 outputted to the S2 bus 121 is fetched into the latch 246, and the destination operand data of the instruction 2 outputted to the S4 bus 123 is fetched into the latch 248. When there is the destination operand interference, the source operand data of the instruction 1 outputted to the S1 bus 104 is fetched into the latch 247, the destination operand data of the instruction 1 outputted to the S2 bus 121 is fetched into the latch 248, and the source operand data of the instruction 2 outputted to the S3 bus 122 is fetched into the latch 246. In the three-value adder 237, three-value add/subtract (composite operation of the instruction 1 and instruction 2) fetched into the three latches 246, 247 and 248 are performed. The operation result is written into the register specified as the destination of the instruction 2 via the D2 bus 125. When the destination register to which the instruction 1 writes data and the destination register to which the instruction 2 writes data are same, the operation result is written from the D2 bus 125.

In the following, description is made based on a specific example. The case where the instruction 1 is the add instruction of L-format (ADD:L) which adds a value of the R0 to the R2, and the instruction 2 is the add instruction of L-format (ADD:L) which adds a value of the R1 to the R2 is considered. In this case, though there is the operand interference between the two instructions, it is an instruction combination, whereby the two instructions can be executed in parallel by the composite operation of the add operation of the instruction 1 and the add operation of the instruction 2. In this case, the TINADD signal 586 and BYPDST signal 588 become "1".

Figure 54B:
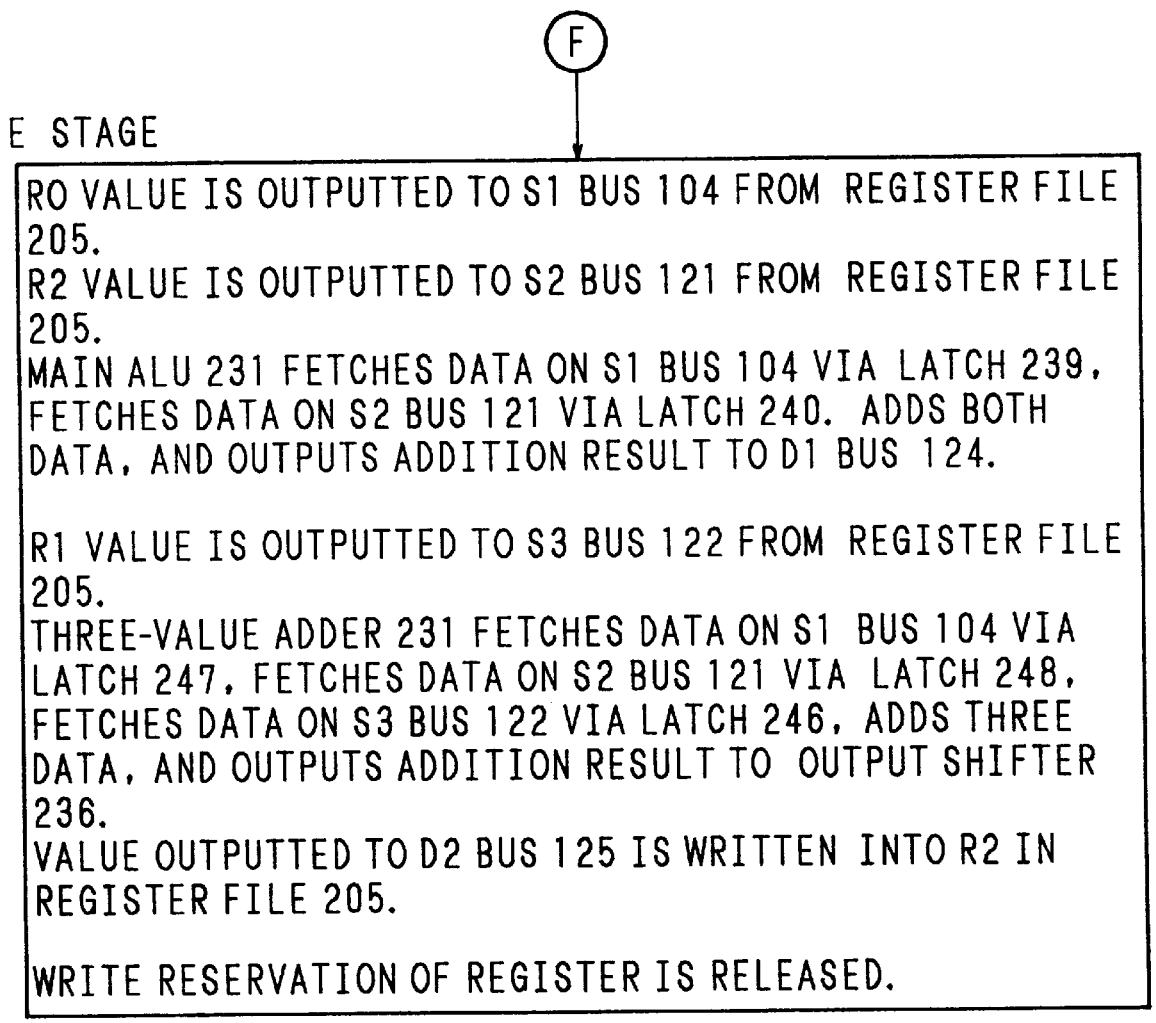

A specific process flow in respective stages is shown in flow charts of FIGS. 54A and 54B. The two instructions are processed in parallel in the respective pipeline stages, and are executed in parallel in the E stage 405. In this example, the instruction 1 is executed in the main ALU 231 three-value addition which is the composite operation of the instruction 1 and instruction 2 is performed in the three value adder 237, and the operation result is written into the R2 via the D2 bus 125.

Processing in Case of Class B1

Next, the Class B is described. At first, the case of Class B1, where the instruction 1 has no memory/immediate operand, the instruction 2 has the memory/immediate operand and there is no operand interference is described.

In the D stage 402, it is judged whether or not the two instructions are decoded in parallel and they can be executed in parallel. As positions of the instruction codes on the II bus 101 corresponding to the Class B1, there are three cases of (b), (c) and (d) in FIG. 38. That is, it is limited to the case where the processing code length in the last decoding cycle of the instruction 1 is 2 bytes. This is because that, a decoder which decodes an addressing mode in the present embodiment is implemented only in the second byte and fourth byte on the II bus 101. When the instruction 1 can execute the succeeding instruction 2 having memory/immediate operand in parallel, an SENM signal 502 becomes "1". When the instruction 2 is the instruction having the memory/immediate operand executable in one cycle in the sub-operation circuit 207, an SVM1 signal 522 becomes "1".

In the operand interference judging unit 323, it is judged whether or not the instruction 2 refers to the operand updated by the instruction 1. When there is no operand interference related to the instruction execution, the OPCONF1 signal 571 becomes "0". When the instruction 1 does not update a register value to be referred to in address calculation including the SP value of the instruction 2, an OPCONFA1 signal 573 becomes "0". When the processing code length of the instruction 1 is 2 bytes and there is no operand interference, it is judged that the two instructions can be executed in parallel and the SVALID signal 581 becomes "1". In this case, since the A code is generated corresponding to the instruction 2, an I2ACD signal 582 becomes "1". All of the other signals generated in the subcode effectiveness judging unit 324 become "0".

In the main D code generating unit 313, the main D code is generated on the basis of an output of the main decoder 302. In the sub-D code generating unit 314, the sub-D code is generated by combining an output of the first SOPDEC 308 and an output signal from the two-instruction parallel decoding judging unit 303. In the A code generating unit 307, the A code is generated on the basis of an output of the addressing mode decoder 305. However, in this case, the A code must be generated for the instruction 2. Thus, the A code is generated on the basis of an output of the second EADEC 311 and the output of the first SOPDEC 308. When the instruction 2 has extension data, cutting-off of the extension data and outputting to the DISP bus 102 are performed in the extension data processing unit 32. When it is judged that the two instructions can be decoded in parallel in such a manner, the decoded results of the two instructions are outputted at the same time.

Processing after the A stage 403 are exactly same as the processing of the Class A1, except that the operand address calculation or memory access are performed for operand of the instruction 2.

Processing in Case of Class B2

The case of Class B2, where the instruction 1 has no memory/immediate operand and the instruction 2 is the transfer instruction storing the operation result of the instruction 1 into the memory is described. Bypassing of the write operand is possible only when a destination operand size of the instruction 1 and two operand sizes of the instruction 2 are the word. Also, it is limited to the case, where the instruction 1 is the instruction outputting data to be written into the register in the last microstep to the D1 bus 124, and the instruction 2 is the transfer instruction of S-format (MOV:S) for storing.

In the D stage 402, it is judged whether or not the two instructions are decoded in parallel and they can be executed in parallel. As positions of the instruction codes on the II bus 101 corresponding to the Class B2, there are three cases of (b), (c) and (d) in FIG. 38. That is, it is limited to the case where the processing code length of the instruction I in the last decoding cycle is 2 bytes. When the instruction 1 outputs data written into the register in the last microstep to the D1 bus 124, has no memory/immediate operand and is able to execute the succeeding store instruction in parallel, an STEN signal 503 becomes "1". Also, when the instruction 2 is the transfer instruction of S-format storing a register value whose operand size is the word, an ST1 signal 524 becomes "1".

In the operand interference judging unit 323, it is judged whether or not the instruction 2 refers to the operand updated by the instruction 1. When there is no operand interference related to the instruction execution, the OPCONF1 signal 571 becomes "1". When the instruction 1 does not update the register value referred to in address calculation including an SP value of the instruction 2, the OPCONFA1 signal 573 becomes "0". When the processing code length of the instruction 1 is 2 bytes and there is no operand interference related to an address calculation, it is judged that the two instructions can be executed in parallel and the SVALID signal 581 becomes "1" even when there is an operand interference related to an execution operand, as well as the BYPD1 signal 589 indicating bypassing the write operand becomes "1". Also, in this case, since the A code is generated corresponding to the instruction 2, the I2ACD signal 582 becomes "1". All of the other signals generated in the sub-code effectiveness judging unit 324 becomes "0". Other processing are same as those in the case of Class A1.

Processing in the A stage 403 and F stage 404 are same as those in the case of Class B1.

In the E stage 405, the two instructions are executed in parallel in the last step of the instruction 1. The Class B2 is different from the Class B1 in that, the bypass processing of the operand is performed. In the last microstep of the instruction 1, operation is performed by any of the operators in the main operation circuit 208, and the operation result is written into the register specified as the destination via the D1 bus 124. The instruction 2 is executed by outputting a value outputted to the D1 bus 124 to the DD bus 107 via the DDW 212, and writing the data into the data cache 74 or an address position of the external memory specified by the instruction 2 in the S stage 406.

In the following, description is made on the basis of a specific example. The case, where the instruction 1 is the add instruction of L-format (ADD:L) which adds a value of the R0 to the R1, and the instruction 2 is the transfer instruction of S-format (MOV:S) which stores a value of the R1 into a memory specified by the register relative indirect mode, is considered. It is assumed that a base register of the memory operand of the instruction 1 is the R13 and a displacement is "16" specified by 16-bit extension data. In this case, though there is the operand interference between the two instructions, it is an instruction combination where the two instruction can be executed in parallel by operand bypassing of the write operand, and the BYPD1 signal 589 becomes "1".

Figure 55B:
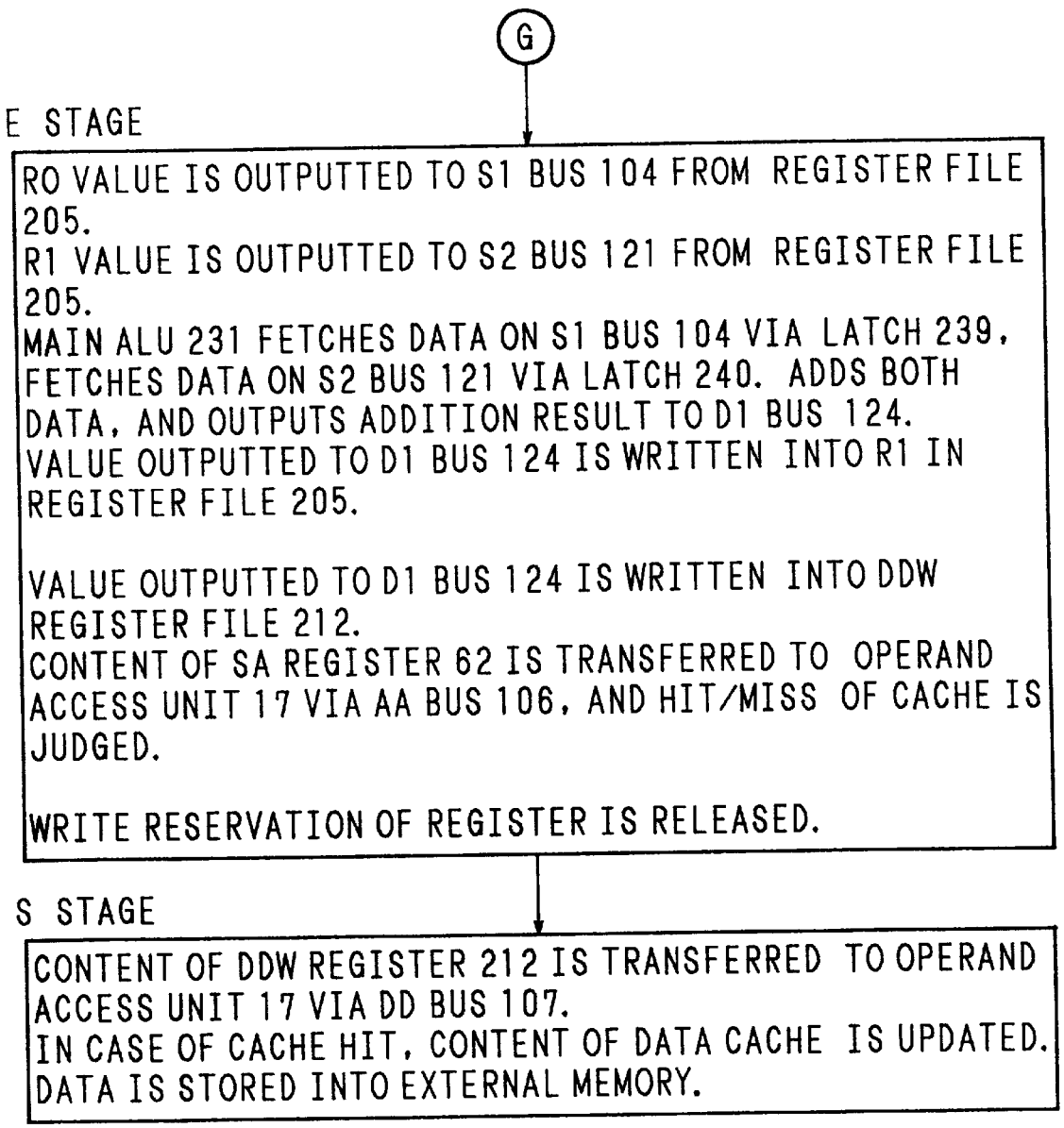

A specific process flow in the respective stages is shown in flow charts of FIGS. 55A and 55B. The two instructions are processed in parallel in the respective pipeline stages and are executed in parallel in the E stage 405. In this example, the instruction 1 is executed in the main ALU 231 and the operation result is written into the R1 via the D1 bus 124 as well as, corresponding to the processing specified by the instruction 2, the value is also written into the memory. In this case, an effective processing is not performed in the sub-operation circuit 207.

Processing in Case of Class B3

The case of Class B3, where the instruction 1 is the left-shift instruction of 3 bits or less having no memory/immediate operand, and the instruction 2 is the arithmetic operation/logical operation/comparing instruction which refers to the operation result of the instruction 1 and having the memory/immediate operand, is described. An instruction combination is a sub-set of the Class B1. However, the two instructions can be executed in parallel only when the instruction 1 is the logical shift instruction of Q-format (SHL:Q) and a destination operand size thereof is the word.

In the D stage 402, it is judged whether or not the two instructions are decoded in parallel and they can be executed in parallel. As positions of the instruction codes on the II bus 101 corresponding to the Class B1, there are three cases of (b), (c) and (d) in FIG. 38. That is, it is limited to the case where the processing code length of the instruction 1 in the last decoding cycle is 2 bytes. When the instruction 1 can execute the succeeding instruction 2 having the memory/immediate operand in parallel, the SENM signal 502 becomes "1". Furthermore, when the instruction 1 whose destination is a register and the size is the word, and which performs shift operation of 3 bits or less, the ISFT signal 506 becomes "1". When the instruction 2 is the instruction having the memory/immediate operand executable in one cycle in the sub-operation circuit 207, the SVM1 signal 522 becomes "1". Meanwhile, when the instruction 2 is the arithmetic operation/logical operation/comparing instruction executable in the sub-ALU 234, the SALU1 signal 526 becomes "1".

In the operand interference judging unit 323, it is judged whether or not the instruction 2 refers to the operand updated by the instruction 1. When there is the operand interference related to the instruction execution, the OPCONF1 signal 571 becomes "1". When the instruction 1 does not update a register value referred to in address calculation including the SP value of the instruction 2, the OPCONFA1 signal 573 becomes "0". When the processing code length of the instruction 1 is 2 bytes and there is no operand interference, it becomes the Class B1. However, in this case, when a processing code length of the instruction 1 is 2 bytes and there is no operand interference in the operand which is referred to in address calculation by the instruction 2, even when there is the execution operand interference, it is judged that the two instructions can be executed in parallel and the SVALID signal 581 becomes "1". In this case, since the A code is generated corresponding to the instruction 2, the I2ACD signal 582 becomes "1". Also, the SFTALU signal 584 indicating the composite operation of the shift operation and ALU operation becomes "1". Furthermore, when bypassing source operand of the instruction 2, the BYPSRC signal 587 becomes "1", and when bypassing the destination operand of the instruction 2, the BYPDST signal 588 becomes "1". However, there is also the case where the both signals 587 and 588 become "1". All of the other signals generated in the sub-code effectiveness judging unit 324 become "0". A signal related to the operand bypassing is also outputted as the sub-D code and is to be transferred. Other processing are same as those in the case of Class A1.

Processing after the A stage 403 are exactly same as the processing of the Class A4, except that the operand address calculation or memory access is performed for operand of the instruction 2.

Processing in Case of Class B4

The case, where the instruction 1 is the arithmetic operation instruction having no memory/immediate operand, and the instruction 2 is the arithmetic operation/comparing instruction which refers to the operation result of the instruction 1 and has the memory/immediate operand, is described. An instruction combination is a sub-set of the Class B1. However, it is limited to the case where an operand size to be interfered is the word.

In the D stage 402, it is judged whether or not the two instructions are decoded in parallel and they can be executed in parallel. As positions of the instruction codes on the II bus 101 corresponding to the Class B1, there are three cases of (b), (c) and (d) in FIG. 38. That is, it is limited to the case where the processing code length of the instruction 1 in the last decoding cycle is 2 bytes. When the instruction 1 can execute, in parallel, the succeeding instruction 2 having the memory/immediate operand, the SENM signal 502 becomes "1". Furthermore, when the instruction 1 is the arithmetic operation instruction, whose destination is a register and whose size is the word, executable in the three-value adder 237, the TADD signal 508 becomes "1". When the instruction 2 is the instruction having the memory/immediate operand executable in one cycle in the suboperation circuit 207, the SVM1 signal 522 becomes "1". Meanwhile, when the instruction 2 whose size is the word is the arithmetic operation/comparing instruction executable in the three-value adder 237, the TADD1 signal 528 becomes "1".

In the operand interference judging unit 323, it is judged whether or not the instruction 2 refers to the operand updated by the instruction 1. When there is the operand interference related to the instruction execution, the OPCONF1 signal 571 becomes "1". When the instruction 1 does not update a register value referred to in address calculation including the SP value of the instruction 2, the OPCONFA1 signal 573 becomes "0". When the processing code length of the instruction 1 is 2 bytes and there is no operand interference, it becomes the Class B1. However, in this case, when the processing code length of the instruction 1 is 2 bytes and there is no operand interference in the operand referred to in address calculation by the instruction 2, even when there is the execution operand interference, it is judged that the two instructions can be executed in parallel and the SVALID signal 581 becomes "1". In this case, since the A code is generated corresponding to the instruction 2, the I2ACD signal 582 becomes "1". Also, the TINADD signal 586 indicating the composite operation of the two arithmetic operation in the three-value adder 237 becomes "1". Furthermore, when bypassing the source operand of the instruction 2, the BYPSRC signal 587 becomes "1", and when bypassing the destination operand of the instruction 2, the BYPDST signal 588 becomes "1". However, there is also the case where the both become "1". All of the other signals generated in the sub-code effectiveness judging unit 324 become "0". A signal related to the operand bypass is also outputted as the sub-D code and is to be transferred. Other processing are same as those in the case of Class A1.

Processing after the A stage 403 are exactly same as the processing of the Class A4, except that the operand address calculation and memory access are performed for operand of the instruction 2.

Processing in Case of Class C1

The case of Class C1, where both the instruction 1 and instruction 2 are the transfer instruction popping stack-top data to load it on a register, is described. Since the two instructions access a continuous area on the memory, the two instructions can be decoded in parallel. They can be executed in parallel only when both the instruction 1 and instruction 2 are the pop instruction (POP) whose destination is the register, or the transfer instruction of Lformat (MOV:L), whose source is specified by a pop mode and whose operand size is the word. It is also limited to the case where the instruction 1 does not load a value on the SP value.

In the D stage 402, it is judged whether or not the two instructions are decoded in parallel and they can be executed in parallel. As positions of the instruction codes on the II bus 101 corresponding to the Class C1, there is only a case of (b) in FIG. 38. When the instruction 1 is the aforementioned transfer instruction popping the stack-up data to load it on the register, the operand size is the word and the register to be loaded is not an SP, the POP signal 509 becomes "1". Also, when the instruction 2 is the aforementioned transfer instruction popping the stack-top data to load it on the register and the operand size is the word, the POP1 signal 529 becomes "1". When the processing code length of the instruction 1 is 2 bytes, it is judged that the two instructions can be executed in parallel and the SVALID signal 581 becomes "1". In this case, since two words are transferred in parallel, the MOV2W signal 509 becomes "1". All of the other signals generated in the subcode effectiveness judging unit 324 become "0". In the main-D code generating unit 313, the main-D code is generated on the basis of an output of the main decoder 302.

In the sub-D code generating unit 314, the sub-D code is generated by combining an output of the first SOPDEC 308 and an output signal from the two-instruction parallel decoding judging unit 303. In the A-code generating unit 307, the A code is generated on the basis of an output of the addressing mode decoder 305 or main decoder 302. However, corresponding to the MOV2W signal 590 which has become "1", the operand size is corrected to 8 bytes. When it is judged that the two instructions can be decoded in parallel in such a manner, the decoded results of the two instructions are outputted at the same time.

In the A stage 403, succeeding stage decoding of the instruction 1 is performed in the A-stage decoder 34, and the sub-D code which is the decoded result of the instruction 2 is transferred by the sub-code transfer unit 35. In the address calculation unit 53, an operand address is generated by referring to a value of the ASP 221. The ASP 221 is corrected by "+8" by the ASP adder 224. Updating information of registers of the instruction 1 and instruction 2 are registered in the scoreboard register unit 52.

In the F stage 404, the microinstruction corresponding to processing of the instruction 1 is read, and execution control information of the instruction 1 is generated in the first microinstruction decoder 85. Execution control information of the instruction 2 is generated in the second microinstruction decoder 86 by the hard-wired decoding of the sub-R code. The operand is pre-fetched by the operand access unit 17. In this case, the operand is pre-fetched by assuming that an operand size is 8 bytes. When this 8 bytes are in an 8-byte boundary, 8-byte data is fetched in one cycle when the cache hits.

In the E stage 405, the two instructions are executed in parallel. The instruction 1 is executed, by writing higher 4 bytes of the fetched 8-byte data into a register specified as a destination as a load operand via the S1 bus 104, latch 239, main ALU 231 and D1 bus 124. The instruction 2 is executed, by writing lower 4 bytes of the fetched 8-byte data into a register specified as a destination as a load operand via the S3 bus 122, latch 244, sub-ALU 234 and D2 bus 125.

In the following, description is made on the basis of a specific example. The case where the transfer instruction of L-format (MOV:L), in which the source operand is specified in a pop mode and a destination operand is a register, is in series is considered. It is assumed that the instruction 1 loads R0 and the instruction 2 loads R1. In this case, since it is a combination, whereby the two instructions can be executed in parallel, and the instruction 1 does not load the SP (R15), the two instructions are executed in parallel. Also, in this case, since the processing code length of the instruction 1 is 2 bytes, the sub-D code is generated on the basis of the output result of the first SOPDEC 308.

A specific process flow in the respective stages is shown in flow charts of FIGS. 56A and 56B. As shown in FIGS. 56A and 56B, the two instructions are processed in parallel in the respective pipeline stages, and are executed in parallel in the E stage 405. In the A stage 403, a value of the ASP 221 is corrected by "+8". In the F stage 404, 8 byte (2 words) data is fetched. In the E stage 405, 2-word data is transferred in parallel to the destination register specified by the instruction 1 and instruction 2. In the A stage 403, the updated value of the ASP 221 is transferred to the ESP 226 or master SP 228 in synchronism with the pipeline processing.

Processing in Case of Class C2

The case of Class C2, where both the instruction 1 and instruction 2 are the transfer instruction pushing data on the register to a stack top, is described. Since the two instructions access a continuous area on the memory, the two instructions can be decoded in parallel. Parallel execution is possible only when both the instruction 1 and instruction 2 are the push instruction (PUSH) where a source is the register, or the transfer instruction of S-format (MOV:S) in which the destination is specified by the push mode, and an operand size is the word. It is also limited to the case where the instruction 2 does not store the SP value.

In the D stage 402, it is judged whether or not the two instructions are decoded in parallel and they can be executed in parallel. As positions of the instruction codes on the II bus 101 corresponding to the Class C1, there is only a case of (b) in FIG. 38. When the instruction 1 is the aforementioned transfer instruction pushing the aforementioned register value to the stack top, and the operand size is the word, the PUSH signal 510 becomes "1". When the instruction 2 is the aforementioned transfer instruction pushing the register value other than the aforementioned SP to the stack top, and the operand size is the word, a PUSH1 signal 530 becomes "1". When the processing code length of the instruction 1 is 2 bytes, it is judged that the two instructions can be executed in parallel and the SVALID signal 581 becomes "1". In this case, since two words are transferred in parallel, the MOV2W signal 509 becomes "1" as well as a PUSH2W signal 591 indicating pushing of the two words becomes "I". All of the other signals generated in the sub-code effectiveness judging unit 324 become "0".

In the main D-code generating unit 313, the main D code is generated on the basis of an output of the main decoder 302. In the sub-D code generating unit 314, the sub-D code is generated by combining an output of the first SOPDEC 308 and an output signal from the two-instruction parallel decoding judging unit 303. In the A code generating unit 307, the A code is generated on the basis of an output of the addressing mode decoder 305 or the main decoder 302. However, corresponding to the MOV2W signal 590 which has become "1", the operand size is corrected to 8 bytes. When it is judged that the two instructions can be decoded in parallel in such a manner, decoded results of the two instructions are outputted at the same time.

In the A stage 403, succeeding stage decoding of the instruction 1 is performed in the A stage decoder 34, and the sub-D code which is the decoded result of the instruction 2 is transferred by the sub-code transfer unit 35. In the address calculation unit 53, the operand address is generated by referring to the value of the ASP 221 and decrementing by "8". The ASP 221 is corrected by "8" by the ASP adder 224.

In the F stage 404, the microinstruction corresponding to processing of the instruction 1 is read, and execution control information of the instruction 1 is generated in the first microinstruction decoder 85. Execution control information of the instruction 2 is generated in the second microinstruction decoder 86 by hard-wired decoding of the sub-R code.

In the E stage 405, the two instructions are executed in parallel. Data to be pushed by the instruction 1 is transferred to the DDW 212 from the register file 205 via the S1 bus 104, latch 239, main ALU 231 and D1 bus 124. Data to be pushed by the instruction 2 is transferred to the DDW 212 from the register file 205 via the S3 bus 122, latch 244, sub-ALU 234 and D2 bus 125. In this case, since the serial push instructions are processed, corresponding to the PUSH2W signal 591 which has become "1", 8-byte data to be stored is generated by aligning and concatenating by an alignment circuit in the DDW 212 such that, data to be stored by the instruction 2 comes higher and data to be stored by the instruction 1 comes lower, and transferred to the operand access unit 17 via the DD bus 107. In the S stage 406, the data is written into an address position specified by the data cache 74 or the instruction 2 of the external memory. When 8 bytes are in a 8-byte boundary, register to a store buffer is finished in one cycle.

In the following, description is made on the basis of a specific example. The case where the transfer instruction of S-format (MOV:S), in which a destination is specified by a push mode, is in series is considered. It is assumed that the instruction 1 pushes R0 and the instruction 2 pushes R1. In this case, since it is a combination whereby the two instructions can be executed in parallel, and the instruction 2 does not push the SP (R15) value, the two instructions are executed in parallel. Also, in this case, since the processing code length of the instruction 1 is 2 bytes, the subD code is generated on the basis of the output result of the first SOPDEC 308.

Figure 57B:
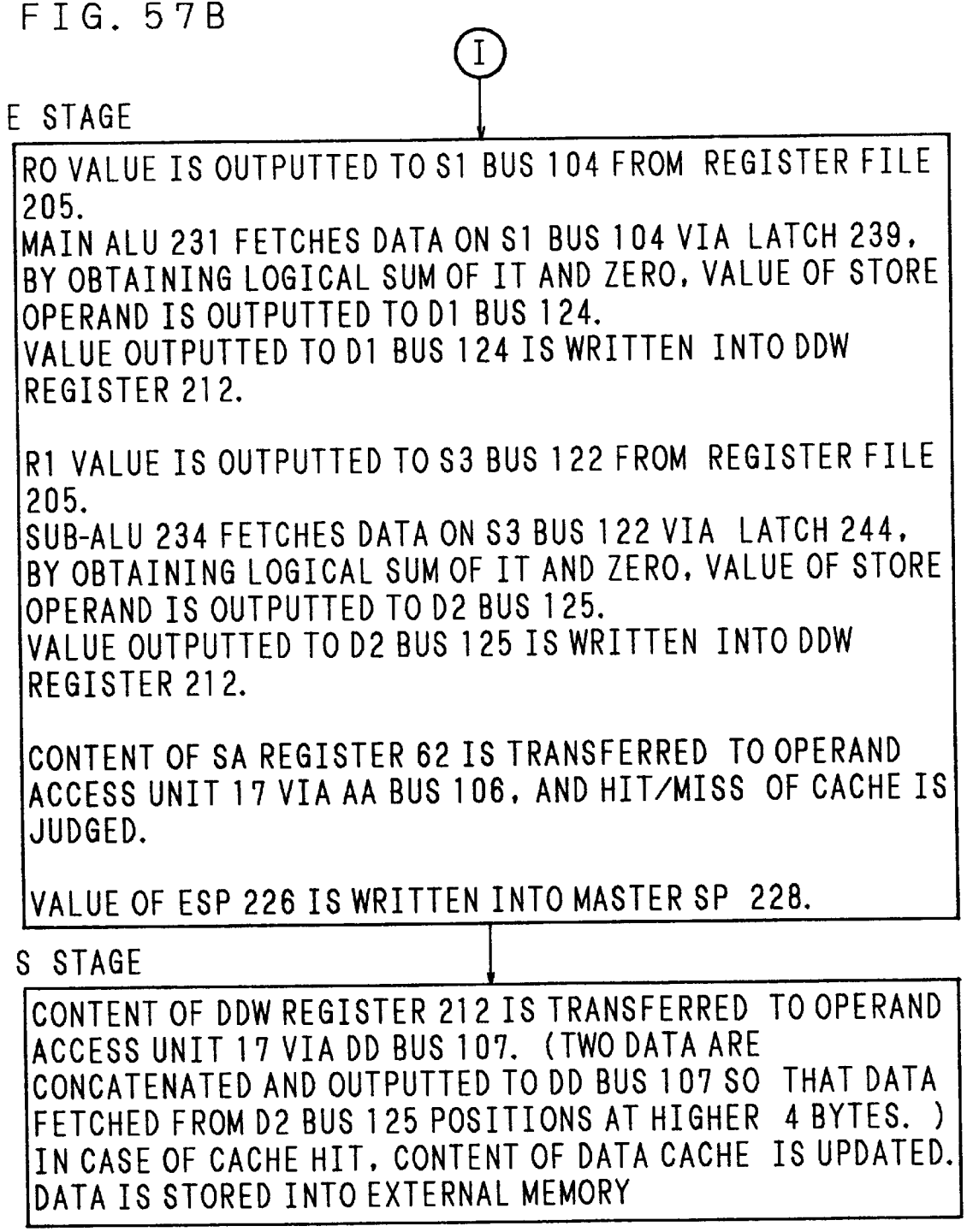

A specific process flow in the respective stages is shown in flow charts of FIGS. 57A and 57B. As shown in FIGS. 57A and 57B, the two instructions are processed in parallel in the respective pipeline stages, and are executed in parallel in the E stage 405. In the A stage 403, by decrementing a value of the ASP 221 by "8" in the address calculation unit 53, the operand address is calculated and the value of the ASP 221 is corrected by "8". In the E stage 405, a register value specified as a source by the instruction 1 and instruction 2 is transferred, and in the S stage, 8-byte data being connected are written into the data cache 74 or external memory. In the A stage 403, an updated value of the ASP 221 is to be transferred to the ESP 226 or master SP 228 in synchronism with the pipeline processing.

Processing in Case of Class C3

The case of Class C3, where both the instruction 1 and instruction 2 are the transfer instruction specifying the source operand in a register indirect/register relative indirect mode and loading on the register, is described. When the two instructions access a continuous area on the memory, the two instructions can be decoded in parallel. Parallel execution is possible only when the instruction 1 and instruction 2 are the transfer instruction of L-format (MOV:L) and the operand size is the word. Roughly divided, the parallel execution is possible in two cases. Instruction codes of the two cases where the parallel execution is possible are shown in a schematic diagram of FIG. 58.

As designated by reference character (a), one is the case where the instruction 1 is the register indirect mode and the instruction 2 is the register relative indirect mode of 16-bit displacement. Conditions in which the parallel execution is possible are that, the base register 502 at the time of operand address calculation of the instruction 1 and the base register 503 of the instruction 2 are same, a value of the displacement 504 of the instruction 2 is "4" and the register 501 updated by the instruction 1 is different from the base address register 503 of the address calculation of the instruction 2. In this case, the instruction 1 is 2 bytes.

As designated by reference character (b), another one is the case where both the instruction 1 and instruction 2 are the register relative indirect mode of 16-bit displacement. Conditions in which the parallel execution is possible are that, the base register 506 at the time of operand address calculation of the instruction 1 and the base register 508 of the instruction 2 are same, a value of the displacement 509 of the instruction 2 is larger than a value of the displacement 507 of the instruction 1 by "4", and the register 505 updated by the instruction 1 is different from the base address register 508 of the address calculation of the instruction 2. In this case, the instruction 1 is 4 bytes.

At first, the case where the instruction 1 is the load instruction of register indirect mode is described.

In the D stage 402, it is judged whether or not the two instructions are decoded in parallel and they can be executed in parallel. When the instruction 1 is the aforementioned load instruction of register indirect mode and an operand size is the word, an RILD signal 511 becomes "1". When the instruction 2 is the aforementioned load instruction of register relative indirect mode and the operand size is the word, the RILD1 signal 531 becomes "1". Furthermore, when the base registers used in address calculation of the instruction 1 and instruction 2 coincide, an MTRiR2 signal 554 becomes "1", when the instruction 1 does not update the register referred to in address calculation, an MTL1R2 signal 552 becomes "0", and when a value of the displacement of the instruction 1 is "4", the DISP1 signal 561 becomes "1". When the processing code length of the instruction 1 is 2 bytes and all of the above-mentioned conditions are satisfied, it is judged that the two instruction can be executed in parallel and the SVALID signal 581 becomes "1". In this case, since two words are transferred in parallel, the MOV2W signal 509 becomes "1". All of the other signals generated in the sub-code effective judging unit 324 become "0".

In the main D code generating unit 313, the main D code is generated on the basis of an output of the main decoder 302. In the sub-D code generating unit 314, the sub-D code is generated by combining an output of the first SOPDEC 308 and an output signal from the two-instruction parallel decoding judging unit 303. In the A code generating unit 307, the A code is generated on the basis of an output of the addressing mode decoder 305. However, corresponding to the MOV2W signal 590 which has become "1", the operand size is corrected to 8 bytes. When it is judged that the two instructions can be decoded in parallel in such a manner, decoded results of the two instructions are outputted at the same time.

In the A stage 403, succeeding decoding of the instruction 1 is performed in the A-stage decoder 34, and the sub-D code which is the decoded result of the instruction 2 is transferred by the sub-code transfer unit 35. In the address calculation unit 53, the operand address is generated by referring to a base address value and transferring intact. Updating information of the registers of the instruction 1 and instruction 2 are registered in the scoreboard register unit 52.

Next, the case where the instruction 1 is the load instruction of register relative indirect mode is described.

In the D stage 402, it is judged whether or not the two instructions are decoded in parallel and they can be executed in parallel. When the instruction 1 is the aforementioned load instruction of register relative indirect mode and an operand size is the word, the RILD signal 511 becomes "1". Also, when the instruction 2 is the aforementioned load instruction of register relative indirect mode and the operand size is the word, the RILD2 signal 546 becomes "1". Furthermore, when base registers used in address calculation of the instruction 1 and instruction 2 coincide, the MTR1R3 signal 558 becomes "1", when the instruction 1 does not update the register referred to in address calculation, the MTL1R3 signal 556 becomes "0", and when a displacement of the instruction 2 is "a displacement of the instruction 1+4", the DISP2 signal 562 becomes "1". When the processing code length of the instruction 1 is 4 bytes and all of the above-mentioned conditions are satisfied, it is judged that the two instructions can be executed in parallel and the SVALID signal 581 becomes "1". In this case, since two words are transferred in parallel, the MOV2W signal 509 becomes "1". All of the other signals generated in the subcode effectiveness judging unit 324 become "0".

In the main D code generating unit 313, the main D code is generated on the basis of an output of the main decoder 302. In the sub-D code generating unit 314, the sub-D code is generated by combining an output of the second SOPDEC 309 and an output signal from the two-instruction parallel decoding judging unit 303. In the A code generating unit 307, the A code is generated on the basis of an output of the addressing mode decoder 305. However, corresponding to the MOV2W signal 590 which has become "1", the operand size is corrected to 8 bytes. When it is judged that the two instructions can be decoded in parallel in such a manner, decoded results of the two instructions are outputted at the same time.

In the A stage 403, succeeding stage decoding of the instruction 1 is performed in the A-stage decoder 34, and the sub-D code which is the decoded result of the instruction 2 is transferred by the sub-code transfer unit 35. In the address calculation unit 53, the operand address is generated by adding a base address value and a displacement of the instruction 1. Updating information of the registers of the instruction 1 and instruction 2 are registered in the scoreboard register unit 52.

Following processing are same in the two cases.

In the F stage 404, the microinstructions corresponding to processing of the instruction 1 are read, and execution control information of the instruction 1 is generated in the first microinstruction decoder 85. Execution control information of the instruction 2 is generated in the second microinstruction decoder 86 by hard-wired decoding of the sub-R code. Also, the operand is pre-fetched in the operand access unit 17. In this case, the operand is pre-fetched by assuming that the operand size is 8 bytes. When 8 bytes are in an 8-byte boundary, 8-byte data is fetched in one cycle when the cache hits.

In the E stage 405, the two instructions are executed in parallel. The instruction 1 is executed, by writing higher 4 bytes of the fetched 8-byte data into a register specified as a destination as a load operand via the S1 bus 104, latch 239, main ALU 231 and D1 bus 124. The instruction 2 is executed, by writing lower 4 bytes of the fetched 8-byte data into a register specified as a destination as a load operand via the S3 bus 122, latch 244, sub-ALU 234 and D2 bus 125.

In the following, description is made on the basis of a specific example. Hereupon, the case where both the instruction 1 and instruction 2 are the transfer instruction of L-format (MOV:L) of register relative indirect mode is considered. It is assumed that the instruction 1 transfers address data obtained by adding "16" (displacement) to a value of the R13 to the R0, and the instruction 2 transfers address data obtained by adding "20" (displacement) to a value of the R13 to the R1. In this case, since it is a combination, whereby the two instructions can be executed in parallel and the instruction 1 does not load the R13, the two instructions are executed in parallel. Also, in this case, since the processing code length of the instruction 1 is 4 bytes, the sub-D code is generated on the basis of the output result of the second SOPDEC 309.

A specific process flow in the respective stages is shown in flow charts of FIGS. 59A and 59B. As shown in FIGS. 59A and 59B, the two instructions are processed in parallel in the respective pipeline stages, and are executed in parallel in the E stage 405. In the A stage 403, an operand address related to the instruction 1 is calculated. In the F stage 404, the 8-byte (two word) data is fetched, and in the E stage 405, the two-word data are transferred in parallel to destination registers specified by the instruction 1 and instruction 2.

Processing in Case of Class C4

The case of Class C4, where the instruction 1 and instruction 2 are the transfer instruction specifying the destination operand in the register indirect/register relative indirect mode and storing the register value, is described. When the two instructions access a continuous area on the memory, the two instructions can be decoded in parallel. Parallel execution is possible only when both the instruction 1 and instruction 2 are the transfer instruction of S-format (MOV:S) and the operand size is the word. In the same way as the aforementioned case of loading the register, the parallel execution is possible in roughly two cases. Instruction codes of the two cases where the parallel execution is possible are that, though the operation codes are naturally different from each other, bit positions in respective fields are same as those in the case of loading shown in flow charts of FIGS. 56A and 56B.

As designated by reference character (a), one is the case where the instruction 1 is the register indirect mode and the instruction 2 is the register relative indirect mode of 16-bit displacement. Conditions in which the parallel execution is possible are that, the base register 502 at the time of operand address calculation of the instruction 1 and the base register 503 of the instruction 2 are same, a value of the displacement 504 of the instruction 2 is "4" and the register 501 updated by the instruction 1 is different from the base address register 503 of the address calculation of the instruction 2. In this case, the instruction 1 is 2 bytes.

As designated by reference character (b), another one is the case where both the instruction 1 and instruction 2 are the register relative indirect mode of 16-bit displacement. Conditions in which the parallel execution is possible are that, the base register 506 at the time of operand address calculation of the instruction 1 and the base register 508 of the instruction 2 are same, and a displacement 509 value of the instruction 2 is larger than a displacement 507 value of the instruction 1 by "4". In this case the instruction 1 is 4 bytes.

At first, the case where the instruction 1 is the store instruction of register indirect mode is described.

In the D stage 402, it is judged whether or not the two instructions are decoded in parallel and they can be executed in parallel. When the instruction 1 is the aforementioned store instruction of register indirect mode and the operand size is the word, an RIST signal 512 becomes "1". When the instruction 2 is the aforementioned store instruction of register relative indirect mode and the operand size is the word, the RIST1 signal 532 becomes "1". Furthermore, when base registers used in address calculation of the instruction 1 and instruction 2 coincide, the MTR1R2 signal 554 becomes "1", and when a displacement of the instruction 1 is "4", the DISP1 signal 561 becomes "1". When the processing code length of the instruction 1 is 2 bytes and all of the above-mentioned conditions are satisfied, it is judged that the two instructions can be executed in parallel, and the SVALID signal 581 becomes "1". In this case, since two words are transferred in parallel, the MOV2W signal 509 becomes "1". All of the other signals generated in the sub-code effectiveness judging unit 324 become "0".

In the main D code generating unit 313, the main D code is generated on the basis of an output of the main decoder 302. In the sub-D code generating unit 314, the sub-D code is generated by combining an output of the first SOPDEC 308 and an output signal from the two-instruction parallel decoding judging unit 303. In the A code generating unit 307, the A code is generated on the basis of an output of the addressing mode decoder 305. However, corresponding to the MOV2W signal 590 which has become "1", the operand size is corrected to 8 bytes. When it is judged that the two instructions can be decoded in parallel in such a manner, decoded results of the two instructions are outputted at the same time.

In the A stage 403, succeeding stage decoding of the instruction 1 is performed in the A-stage decoder 34, and the sub-D code which is the decoded result of the instruction 2 is transferred by the sub-code transfer unit 35. In the address calculation unit 53, the operand address is generated by referring to a base address value and transferring it intact.

Next, the case where the instruction 1 is the store instruction of register relative indirect mode is described.

In the D stage 402, it is judged whether or not the two instructions are decoded in parallel and they can be executed in parallel. When the instruction 1 is the aforementioned store instruction of register relative indirect mode and the operand size is the word, the RIST signal 512 becomes "1". When the instruction 2 is the aforementioned load instruction of register relative indirect mode and the operand size is the word, the RIST2 signal 547 becomes "1". Furthermore, when base registers used in address calculation of the instruction 1 and instruction 2 coincide, the MTR1R3 signal 558 becomes "1", and when a displacement of the instruction 2 is a "displacement of the instruction 1+4", the DISP2 signal 562 becomes "1". When the processing code length of the instruction 1 is 4 bytes and all of the above mentioned conditions are satisfied, it is judged that the two instructions can be executed in parallel and the SVALID signal 581 becomes "1". In this case, since two words are transferred in parallel, the MOV2W signal 509 becomes "1". All of the other signals generated in the sub-code effectiveness judging unit 324 become "0".

In the main D code generating unit 313, the main D code is generated on the basis of an output of the main decoder 302. In the sub-D code generating unit 314, the sub-D code is generated by combining an output of the second SOPDEC 309 and an output signal from the two-instruction parallel decoding judging unit 303. In the A code generating unit 307, the A code is generated on the basis of an output of the addressing mode decoder 305. However, corresponding to the MOV2W signal 590 which has become "1", the operand size is corrected to 8 bytes. When it is judged that the two instructions can be executed in parallel in such a manner, decoded results of the two instructions are outputted at the same time.

In the A stage 403, succeeding stage decoding is performed in the A-stage decoder 34, and the sub-D code which is the decoded result of the instruction 2 is transferred by the sub-code transfer unit 35. In the address calculation unit 53, the operand address is generated by adding a base address value and a displacement of the instruction 1.

Following processing are same in two cases.

In the F stage 404, the microinstructions corresponding to processing of the instruction 1 are read, and execution control information of the instruction 1 is generated in the first microinstruction decoder 85. Execution control information of the instruction 2 is generated in the second microinstruction decoder 86 by hard-wired decoding of the subR code.

In the E stage 405, the two instructions are executed in parallel. Data to be stored by the instruction 1 is transferred to the DDW 212 from the register file 205 via the S1 bus 104, latch 239, main ALU 231 and D1 bus 124. Data to be stored by the instruction 2 is transferred to the DDW 212 from the register file 205 via the S3 bus 122, latch 244, sub-ALU 234 and D2 bus 125. In this case, since the PUSH2W signal 591 is "0", 8-byte data to be stored is generated by aligning and concatenating by the alignment circuit in the DDW 212 such that, the data stored by the instruction 1 comes higher and the data stored by the instruction 2 comes lower, and is transferred to the operand access unit 17 via the DD bus 107. In the S stage 406, the data is written into an address position specified by the data cache 74 or external memory. When 8 bytes are in an 8-byte boundary, register to the store buffer is finished in one cycle.

In the following, description is made on the basis of a specific example. Hereupon, the case where the instruction 1 is the transfer instruction of S-format (MOV:S) of register indirect mode, and the instruction 2 is the transfer instruction of S-format (MOV:S) of register relative indirect mode is considered. It is assumed that the instruction 1 is the one which transfers data of the R0 to the memory of an address obtained by adding "16" (displacement) to a value of the R13, and the instruction 2 is the one which transfers data of the R1 to the memory of an address obtained by adding "20" (displacement) to the value of the R13. In this case, it is a combination whereby the two instructions can be executed in parallel, thus the two instructions are executed in parallel. Also, in this case, since the processing code length of the instruction 1 is 2 bytes, the sub-D code is generated on the basis of the output result of the first SOPDEC 308.

A specific process flow in the respective stages is shown in flow charts of FIGS. 60A and 60B. As shown in FIGS. 60A and 60B, the two instructions are processed in parallel in the respective pipeline stages, and are executed in parallel in the E stage 405. In the A stage 403, an address of an operand related to the instruction 1 is calculated. In the E stage 405, a register value specified as a source is transferred by the instruction 1 and instruction 2. In the S stage 406, 8-byte data being concatenated are written into the data cache 74 or the external memory.

Though it has been described in detail heretofore, in the two-instruction parallel decoding judging unit 303, on the basis of the decoded result of the instruction 1 in the main decoder 302 and the decoded result of the instruction 2 in the sub-decoder 304, it is judged compositely whether or not the two instructions can be decoded in all of the aforementioned cases. From the main decoder 302 or the subdecoder 308, there may be the case where control signals for judging the suitableness of parallel decoding for the same instruction become "1" so as to decide various instruction combinations. However, for avoiding malfunction caused by mixing into a plurality of classifications at the same time, a counter measure such as the restriction on generation of the control signals is taken.

In this way, in the data processor, since parallel execution is possible for various combinations of a plurality of instructions having an operand interference, the performance of the data processor can be improved. At the time of executing the shift instruction and the other instruction, since a shift width which can be shifted is limited to only a predetermined specific value, a high speed processing is possible by adding a small amount of hardware. When executing arithmetic operations one another in parallel, the two instructions can be executed in parallel at high speed by using a three-value adder. The transfer instruction is used very frequently, thus the parallel execution, in the case where at least one of the two instructions having an operand interference is the transfer instructions, is very effective in improving the performance.

Also, in the two instructions performing memory access, the instruction accessing a continuous area which can be decided in an instruction decoding stage is executed in parallel. As hardwares, it can be coped with by just increasing a data width being accessed, and since it is not necessary to provide two ports in a RAM such as a cache or to interleave, the performance can be improved by a simple control and a little increase in area (cost). Also, since the number of sense amplifiers of the cache s can be decreased, it is effective in reducing power consumption. It is also very effective when accessing a continuous area such as saving and restoring of a register value at the time of subroutine call.

Other Modified Embodiments

In the above-mentioned embodiment, when executing the arithmetic/logical operation instruction and the shift instruction in parallel, though it is limited only to the case of left shift where a shift count value is 1 to 3 bits, the number of bits is not limited as far as a chip area and operation speed permit. For example, the shift of about −8, −1 to −3, I to 3 and 8 may be performed (where, "−" indicated a right shift).

In the above-mentioned embodiment, though the output shifter 236 is connected to an output of the sub-ALU 234 so that the arithmetic/logical operation instruction and the shift instruction are executed in parallel, it may be connected to, for example, an output of the main ALU 231.

In the above-mentioned embodiment, though the input shifter 235 is connected to two inputs of the sub-ALU 234, when the two instructions can be executed in parallel in case of only the source or destination, it may be connected to either one. Also, either the input shifter 235 or the output shifter 236 of the sub-ALU 234 may be implemented, or it is so constituted that one shifter may be switched for use. The sub-shifter 238 need not be always implemented, though a shift width may be limited, either the input shifter 235 or the output shifter 236 may be used to issue the shift instruction as the succeeding instruction, only when the execution is possible thereby.

In the above-mentioned embodiment, though the 3-input adder 237 is provided independently of the sub-ALU 234, when the timing permits, a three-value adding function is added to the sub-ALU 234 and the 3-input adder 237 may be deleted.

In the above-mentioned embodiment, though the composite operation is performed by the 3-input adder 237 only for a combination of two arithmetic operation instructions, a combination of two logical operation instructions may be executed in parallel, by adding a logical operating function to the 3-input adder 237 or providing a separate 3-input logical operator. However, in this case, it is necessary to change generation of a control signal. In the case a composite operation of the logical operation and the arithmetic operation is not performed, for example, the control signal from the main decoder 302 or sub-decoder 308 for judging a combination of the two logical operations is added to increase judgment items in the sub-code effectiveness judging unit 324. Also, bit set, bit clear and bit reverse instructions can be basically realized by the logical operation. It is also possible to apply parallel execution to the bit operation instruction.

In the above-mentioned embodiment, though there is a case where one operator performs a meaningless operation, because only one instruction is executed at the time of operand interference, in such a case, the operator may be controlled not to operate so as to reduce power consumption. Also, though the operation of the instruction 1 is performed in the main operation circuit 208 in the case of composite operation of the two instructions, an intermediate result (operation result of the instruction 1) of the composite operation in the sub-operation circuit 207 may be outputted to the bus.

In the above-mentioned embodiment, though hardwares are so constituted that the two 2-operand operation instructions can be executed, when it is restricted to only the case where one instruction is the 1-operand operation instruction, the three-value adder 237 and input ports composite logical operation circuit for performing two logical operation instructions added separately can be reduced to two. As the 1-operand logical instruction, there is the instruction for inverting data of "0"/"1", or the instruction for complementing 2 (reversing a sign).

Furthermore, at the time of composite operation of the instruction 1 and instruction 2, in the above-mentioned embodiment, operation of the instruction 1 is performed even when the destination operand of the instruction 1 and the destination operand of the instruction 2 are the same register. In such a case, when an instruction set including the instruction not updating a flag by the operation instruction is to be processed, the operation of the instruction 1 need not be performed, only the composite operation of the instruction 1 and instruction 2 may be performed and the operation result is written back to the destination operand. Meanwhile, when the two instructions are executed in parallel only when their destination operands are same, the number of buses for transferring the operand value to the operator and the number of buses for transferring the operation result to the register file can be reduced. Also, even when the destination operand of the instruction 1 and the destination operand of the instruction 2 are different from each other, when the instruction 2 is the comparing instruction, since the operation result of the instruction 2 is not necessary to be transferred, the number of buses for transferring the operation result to the register file and so on can be reduced.

At the time of bypassing a store operand, though a value outputted to the D1 bus 124 from the main operation circuit 208 is referred to, the value may be outputted to the D2 bus 125 from the main operation circuit 208, or a same operation as that performed in the main operation circuit 208 may be performed in the sub-operation circuit 207 to output the operation result in the sub-operation circuit 207 also to the D2 bus 125. Depending on the configuration, there is a possibility that the combination of instructions which can be executed in parallel may be somewhat lessened.

In the above-mentioned embodiment, though parallel execution of the two instructions having two memory operands is restricted to the case, where both of the two instructions are the load instructions or both of the two instructions are the store instructions, the two instructions may be executed in parallel when the two instructions include a read modified write operand of a continuous memory area.

In the above-mentioned embodiment, though parallel execution of the two instructions having two memory operands is restricted to the case where a size of the two operands is the word (in this case, it is 4 bytes), it is easy to make it possible to cope with other operand sizes. Though only the case, where an address in which a memory operand storage position of the instruction 1 is smaller than a memory operand storage position of the instruction 2, has been coped with, except the case where the push instructions are in series, it is also possible to cope with the reverse case. Also, in the above-mentioned embodiment, though the case where the instruction 1 is a register relative indirect mode and the instruction 2 is a register indirect mode is not covered, parallel execution may be made possible also in such a case. Though operand data is transferred in an 8 byte data unit aligned by the 64-bit DD bus 107, higher 32 bits and lower 32 bits of the DD bus 107 may be treated independently so as to transfer the data not aligned in a 8 bytes in one cycle as far as it is in one line of a cache. In this case, though the hardwares may somewhat increase, a performance is improved because the probability of transferring two memory operands in one cycle becomes high.

In the above-mentioned embodiment, a data cache is accessed by only one line for one address. Thus, even when the cache hits, in the case where all data to be accessed are not in one line of the cache, it can not be accessed in one cycle. However, there is also a data processor, whereby access crossing a one line boundary of the cache can also be executed in one cycle. For example, there is also a data processor, whereby operand data crossing two lines of the cache is accessed in one cycle, by dividing the cache into two, providing an address decoder to each of them, when crossing the boundary one cache is accessed by an address including a start address, and the other cache is accessed by an address obtained by incrementing the address by "1" by an incremented. There is also a data processor, whereby the cache is divided into a plurality of banks, and when the banks are different from each other, it is possible for some banks to be accessed in one cycle. The present invention is particularly effective in reducing the hardware cost related to a configuration of the cache shown in the embodiment, but it is also effective when employing the other configuration of the cache so as to improve the performance. In short, it is judged whether or not the access is possible in one cycle in the instruction decoding stage, and when it is possible or there is a high possibility, the two instructions performing the memory access are issued in parallel for processing. It is particularly effective when data is always on a word boundary such as a RISC. Usually, since data is aligned by a compiler or the like also in a CISC, such method is effective.

In the above-mentioned embodiment, though an instruction cache is included, an internal data RAM may also the provided. It is not always necessary to include an internal memory, it is also effective when always accessing the outside. In this case, it is effective when an external bus for two words is included. At least, in the case where an operand access unit or a bus interface unit and an operator include means for executing 2-word data in parallel, it is effective in processing the instruction having two memory operands in parallel. As to the store, though it may be absorbed by a store buffer, as to the fetch, it is more efficient to access the two words in parallel by one processing so as to transfer them. However, even when an external data bus width is for one word, a processing method such as the present invention is effective when it is possible to access in fewer cycles by accessing the two words at once than accessing one word twice. For example, when accessing one word, it is a single transfer for transferring one data for one address, but when accessing two words and it is a burst transfer for transferring a plurality of data for one address, it is effective even when the internal memory is not included and the external bus is for one word.

In the above-mentioned embodiment, though the two instruction are executed in parallel, it is also possible to execute, in parallel, a plurality of instructions of three or more.

In the above-mentioned embodiment, the case of executing, in parallel, the two instructions which have been decoded in parallel is described. In some data processor, the instruction is decoded one by one and only when a pipeline is clogged, the two instructions are executed in parallel. Also, as the Power PC 603 by IBM and Motorola, there is a data processor, in which a plurality of instructions are decoded in parallel, and the decoded instructions are issued to a plurality of execution units executable independently. In this case, regardless of whether or not being decoded in parallel, a plurality of instructions can be executed in parallel. The present invention is able to cope with not only the case where only the two instructions decoded in parallel are executed in parallel, but also with the data processor performing various pipeline processing as mentioned above. When judging whether or not to execute the two instructions in parallel after the instruction decoding, in the above-mentioned embodiment, necessary information for judgment in the decoding stage is transferred with the instruction, and the suitableness of parallel execution between the instructions may be judged in an arbitrary pipeline stage before executing the instruction.

In the above-mentioned embodiment, though an instruction set of CISC type is processed, it is also adaptable in the data processor having the instruction set of RISC type. Also, in the above-mentioned embodiment, though the instruction is executed in a one-step pipeline stage, it may be processed by dividing the instruction into a plurality of pipeline stage.

As such, the present invention is not restricted to the configurations shown in the embodiments, it is effective in executing the instructions each having the operand interference in parallel, or executing the instructions each having the memory operand in parallel. A combination of instructions performing parallel execution of the instructions and a hardware configuration may be decided on the basis of target specifications and cost performance. The present invention is effective in various hardware configurations.

In the above-mentioned embodiment, for executing the two instructions of various combinations in parallel, a number of hardwares are required. However, in the case where the combination of instructions executable in parallel is limited, the necessary hardwares can be reduced. Any combination of the two instructions to be executed in parallel may be decided by the performance and hardware cost. In the following, an example of limiting the combination of instructions executable in parallel is shown.

In the present embodiment, only the two instructions having the operand interference are executed. Furthermore, in the present embodiment, the two instructions are executed in parallel only when the destination operand of the instruction 1 and the destination operand of the instruction 2 interfere, except the case where the instruction 2 is the transfer instruction. Also, at the time of executing two arithmetic operation instructions, one instruction is processed only when adding and subtracting a small immediate.

Though a hardware configuration including an instruction decoder is naturally different from the first embodiment, because the processing objects are different, since the basic processing content is same as that of the first embodiment, description on processing in the preceding stage of the pipeline is omitted. However, hereupon, the case where a flag is not updated with respect to the usual operation instruction, or only the execution result of the instruction 2 is reflected to the flag is assumed.

Figure 62:
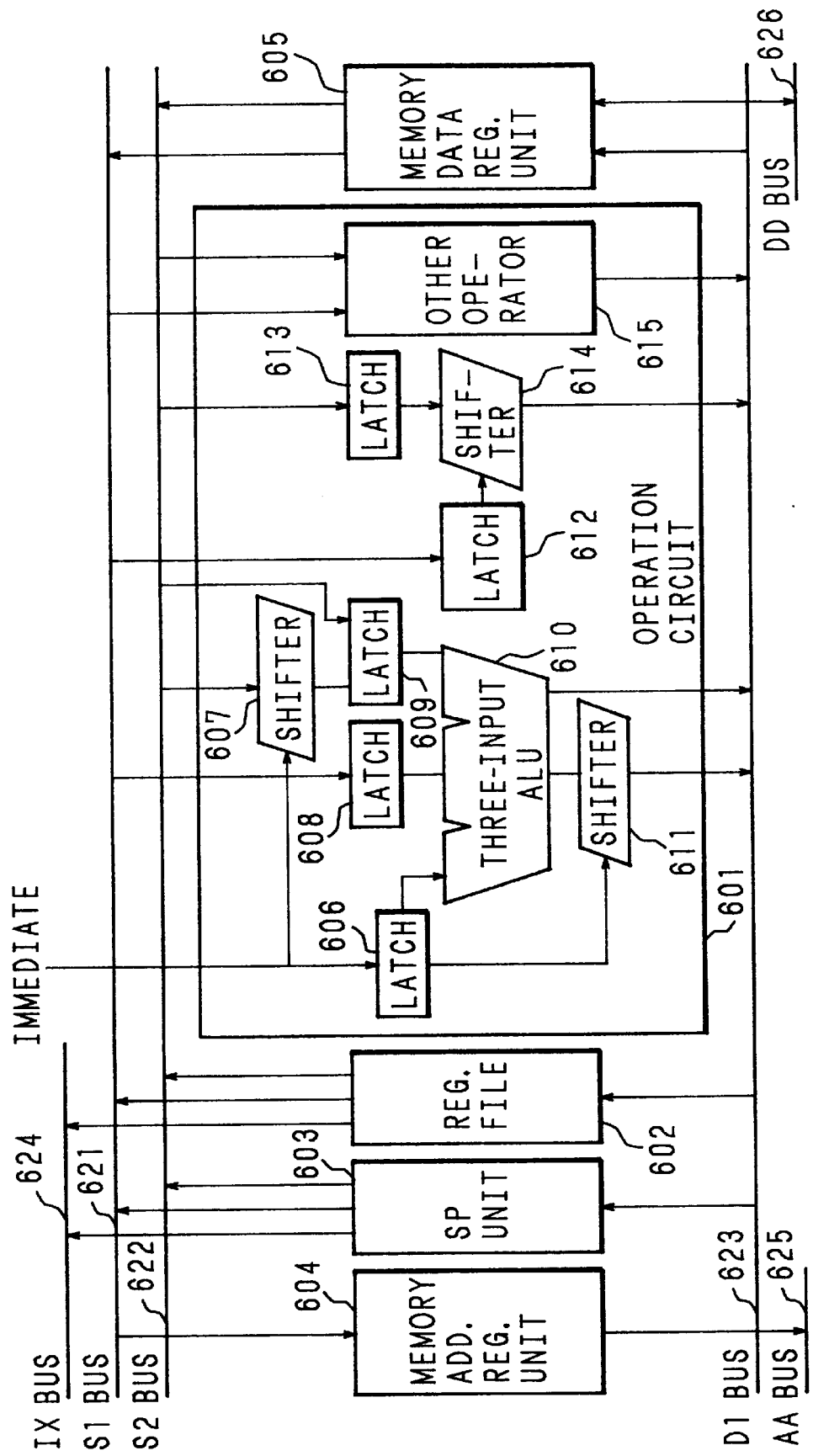
FIG. 62 is a block diagram showing a configuration example of an integer operation unit of another embodiment of a data processor.

A general block configuration is substantially same as the block configuration of the first embodiment shown in FIG. 26. A configuration of an integer operation unit of the second embodiment is shown in a block diagram of FIG. 62. For the purpose of simplifying the description, a part of block is omitted. As compared with the integer operation unit 16 of the first embodiment shown in FIG. 34 and FIG. 61, the number of buses is less and the hardwares of the operators are considerably reduced. The integer operation unit is composed of an operation circuit 601, a register file 602, an SP unit 603, a memory address register unit 604, a memory data register unit 605 and so on, and respective units are connected by an S1 bus 621, an S2 bus 622 and a D1 bus 623. Hereupon, 2-word data is not considered to be transferred in parallel, thus a DD bus 626 has a 32-bit width.

The operation circuit 601 includes a 3-input ALU 610 and a shifter 614. Furthermore, to one input of the 3-input ALU 610, an input shifter 607 is connected in series, and to an output thereof, an output shifter 611 is connected in series. Numerals 606, 608, 609, 612 and 613 designate latches. Registers of the register file 602 or SP unit 603 include input ports connected to the D1 bus 623, and are functional to write a value on the D1 bus 623 into two registers at the same time.

Though not shown, in the instruction decoding unit, the two instructions are decoded in parallel and issued only in the following cases (according to classifications of the first embodiment).

Class A2

Class A3

Class B2 destination operand of the instruction 1 and destination operand of the instruction 2 coincide when the instruction 2 is the arithmetic/logical operation instruction at the Class A4 or the Class B3 destination operand of the instruction 1 and destination operand of the instruction 2 coincide at the Class A5 destination operand of the instruction 1 and destination operand of destination 2 coincide when one is the immediate addition and subtraction instruction (ADD, SUB instruction of Q-format) at the Class A6 or the Class B4

Immediates of the shift instruction and add/subtract instruction of Q-format in case of executing the two instructions in parallel are converted into 4-bit linear values, and are transferred to the latch 606 and input shifter 607 at the time of executing the instructions. In the following, parallel execution of the instructions is particularly described as to the cases classified in the first embodiment.

At first, the case of Class A3 is described. In this case, the instruction 1 is the operation and transfer instruction writing a value into the register, and the instruction 2 is the register-register transfer instruction transferring the execution result of the instruction 1. The instruction 1, including the case of transfer instruction, is processed by any of the operators in the operation circuit 601, and the operation result is written into the register of the register file 602 or SP unit 603 specified as a destination of the instruction 1 via the D1 bus 623. Furthermore, in this case, the value on the D1 bus 623 is also written, in parallel, into the register of the register file 602 or SP unit 603 specified as a destination of the instruction 2.

The Class B2 is the case, where the instruction 1 is the operation and transfer instruction writing the value into the register, and the instruction 2 is the store instruction transferring the execution result of the instruction 1. The instruction 1, including the case of transfer instruction, is processed by any of the operators in the operation circuit 601, and the operation result is written into the register of the register file 602 or SP unit 603 specified as the destination of the instruction 1 via the D1 bus 623. Furthermore, in this case, the value on the D1 bus 623 is also written into the memory register 605 in parallel, transferred to an operand access unit via the DD bus 626 and written into a cache and a memory.

Parallel execution is possible in the Class A4 and the Class B3 in the case, where the instruction 1 is the shift instruction of 3 bits or less, and the instruction 2 is the arithmetic/logical operation instruction in which the shift result of the instruction 1 is the destination operand. Shift processing of the instruction 1 is performed in the input shifter 607. The destination operand of the instruction 1 is read from the register file 602 and so on and fetched into the input shifter 607 via the S2 bus 622. A shift count value is inputted as an immediate, and the shift result is outputted to the input latch 609. In the input ALU 610, arithmetic/logical operation of the instruction 2 is performed. A source operand of the instruction 2 is read from the register file 602 or memory data register 605, and fetched into the input latch 608 via the S bus 621, whereby operation with a value of the input latch 609 holding the shift result is performed. In this case, an input from the latch 606 is neglected. For example, zero is inputted in the case of arithmetic operation instruction. The operation result is written into the register specified as the destination operand of the instruction 2 via the D1 bus 623.

The Class A5 is the case, where the instruction 1 is the arithmetic/logical operation instruction and the instruction 2 is the left-shift instruction of 3 bits or less, but the parallel execution is possible when the instruction 2 is the shift instruction in which the operation result of the instruction 1 is the destination operand of the instruction 2. A source operand of the instruction 1 is read from the register file 602 or memory data register 605 and is fetched into the input latch 608 via the S1 bus 621, the destination operand thereof is read from the register file 602 and fetched into the input latch 609 via the S2 bus 622. In the 3-input ALU 610, arithmetic/logical operation of the instruction 1 is performed. In this case, the input from the latch 606 is neglected. The operation result is outputted to the output shifter 611. Shift processing of the instruction 2 is performed in the output shifter 611. A shift count value is inputted as an immediate and outputted to the output shifter 611 via the latch 606. The shift result is written into the register specified as the destination operand of the instruction 2 via the D1 bus 623.

The case, where in the Class A6 and the Class B4, one is the add/subtract instruction (ADD, SUB instruction of Format) in which a small immediate is the source operand, and the instruction 2 is the instruction in which the operation result of the instruction 1 is the destination operand, is described. When the instruction 1 is the add/subtract instruction of Q-format, the source operand of the instruction 1 is transferred to the input latch 608 via the S1 bus 621, the destination operand thereof is transferred to the input latch 609 via the S2 bus 622, and the immediate which is the source operand of the instruction 2 is held by the latch 606. When the instruction 2 is the add/subtract instruction of Q-format, the immediate which is the source operand of the instruction 1 is held by the latch 606, the source operand of the instruction 2 is transferred to the input latch 608 via the S1 bus 621, and the destination operand thereof is transferred to the input latch 609 via the S2 bus 622. In the 3-input ALU 610, addition and subtraction of three values are performed, and the addition result is written into the register specified as the destination operand of the instruction 2 via the D1 bus 623.

In case of performing the addition and subtraction of three values A, B and C, when C is a small positive immediate and adding is intended in such a way not to invert C, the following operation may be performed by using inputs A and B, an output inverting function of an adder and a carry. It is assumed that the adder adds an input A' (A or inverted A), an input B' (B or inverted B), input C and the carry. Adder outputs are indicated in { }.

|           | input A'     | input B'     | input C | carry input   |
|-----------|--------------|--------------|---------|---------------|
| A + B + C = | {A         | +B           | + C     | + 0}          |
| A − B + C = | {A         | + inverted B | + C     | + 1}          |
| A + B − C = | {inverted A | + inverted B | + C     | + 1} inverted |
| A − B − C = | {inverted A | + B          | + C     | + 0} inverted |

Figure 63:
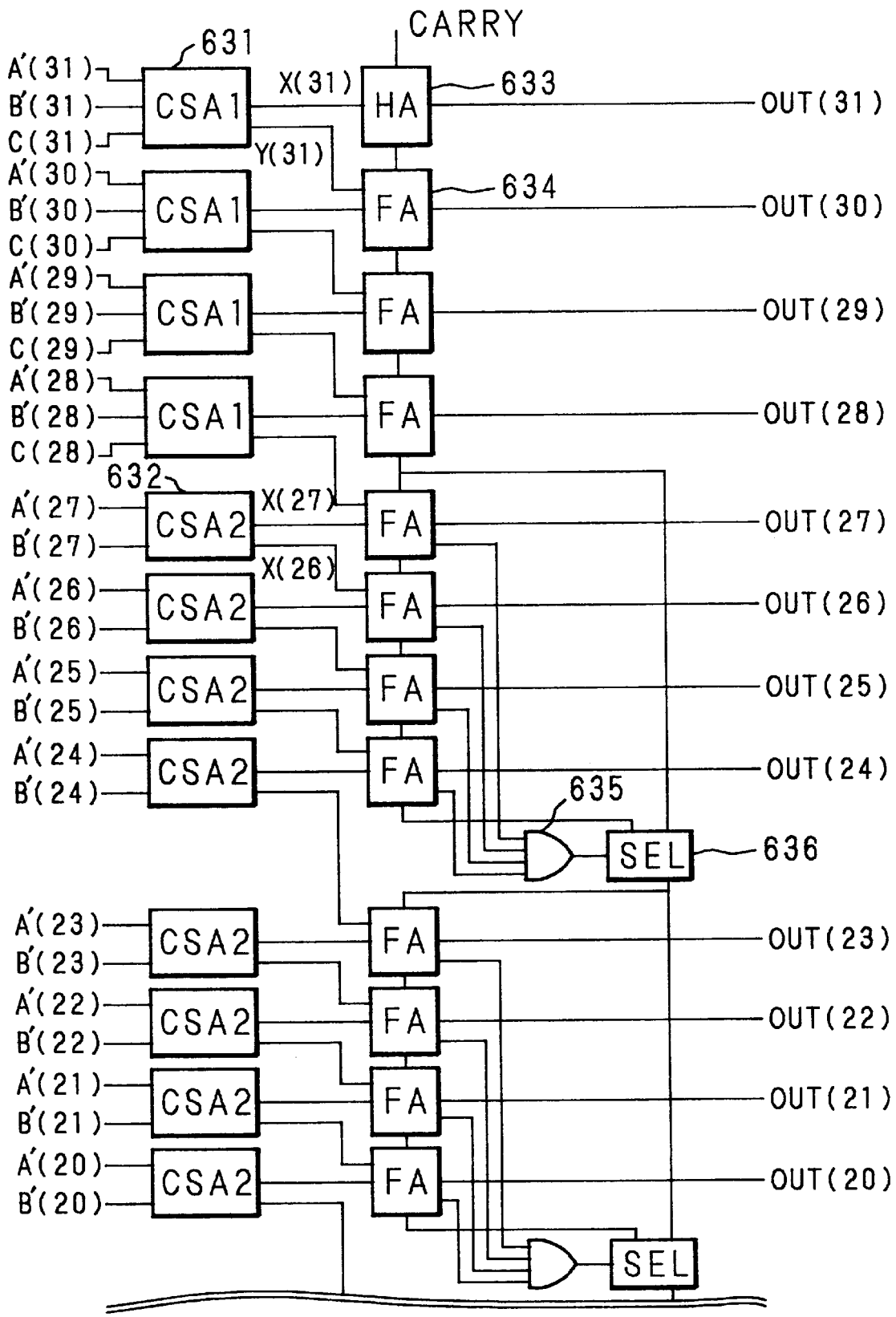
FIG. 63 is a part of a block diagram showing a configuration example of an adder of a three-input ALU of another embodiment of a data processor.
Figure 64:
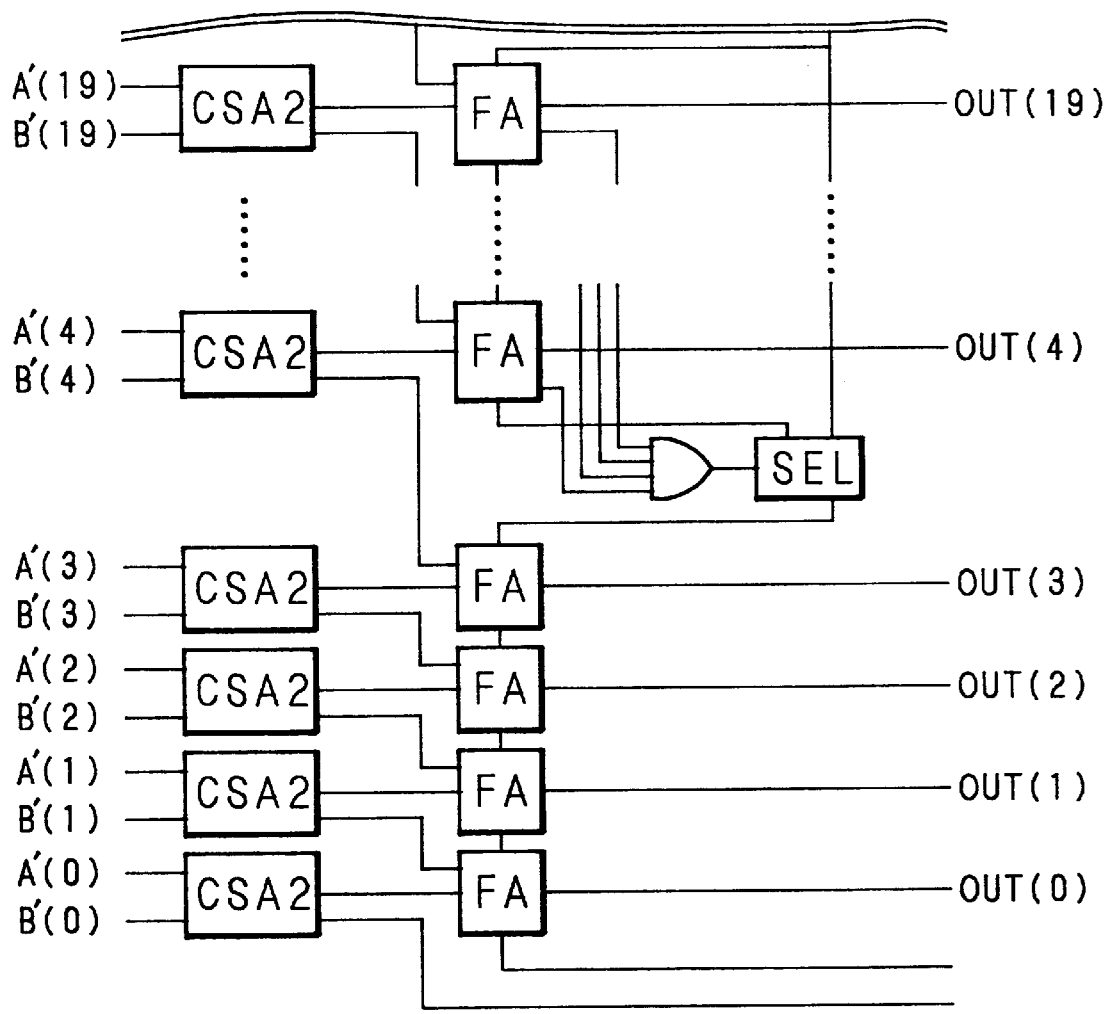
FIG. 64 is another part of a block diagram showing a configuration example of an adder of a three-input ALU of another embodiment of a data processor.

In this way, it is possible for the adder to be constituted without sign extension of a value of the C value. For example, as the adder adding the three values (A' (0:31), B' (0:31), C (28:31)), hardware configuration as shown in a block diagram of FIG. 63 and FIG. 64 is given. However, OUT (0:31) indicates the adder output and is expressed in "big indian". In this example, the adder is roughly composed of a preceding stage adder consisting of a carry-saved adder and a succeeding stage adder consisting of a full adder and a carry look ahead. In addition, FIG. 63 and FIG. 64 are originally one figure, in which a lower portion of FIG. 63 is connected to an upper portion of FIG. 64.

Figure 65:
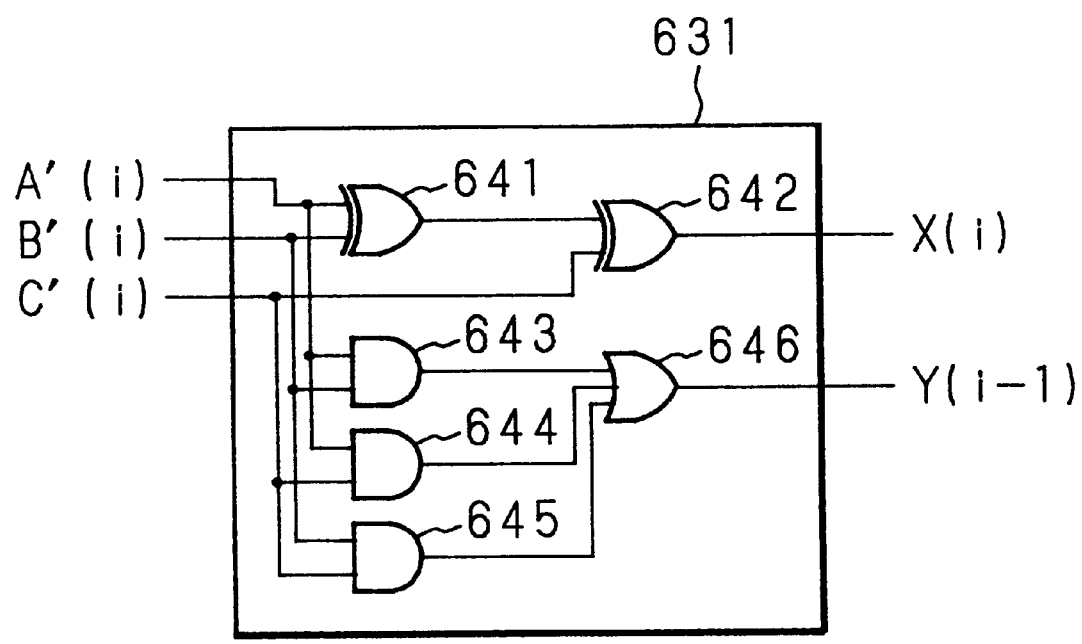
FIG. 65 is a block diagram showing a configuration example of a lower side carry saved adder of a three-input ALU of another embodiment of a data processor.
Figure 66:
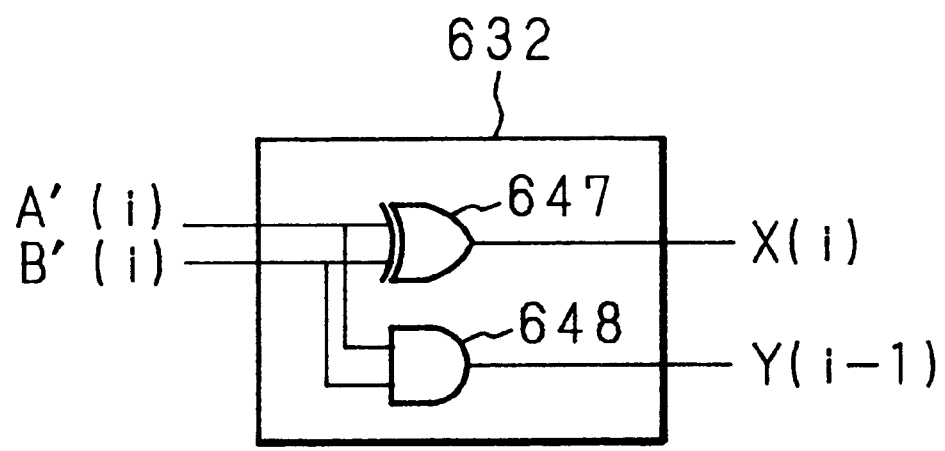
FIG. 66 is a logical circuit diagram showing a configuration of a higher side carry saved adder of a three input ALU of another embodiment of a data processor.

Since the input C is only the lower 4 bits, the carry saved adder of the preceding stage adder is constituted in a different way for the lower 4 bits and the higher 28 bits. For example, as designated by numeral 631, the lower 4 bits convert a 3-bit input into 2 bits of 1-bit X and 1-bit Y which is 1 bit higher than the X. A configuration of a first CSA 631 of this 1 bit is shown in a circuit diagram of FIG. 65. Numerals 641 and 642 designate exclusive OR gates, numerals 643, 644 and 645 designate AND gates, and numeral 646 designates an OR gate. Since the upper 28 bits are only for 2-value addition, a circuit can be simplified. A configuration of a second CSA 632 of this 1 bit is shown in a circuit diagram of FIG. 66. Numeral 647 designates an exclusive OR gate and numeral 648 designates an AND gate.

The succeeding stage adder is that, a carry look ahead circuit is added in a 4-bit unit, and a 4-input AND gate 635 obtains logical product of a 4-bit carry propagation signal, and when it is all "1", the carry input is propagated to the higher position by a selector SEL 636 by bypassing. Usually, since there is no difference between decision of the carry propagation signal and the timing of decision of a carry output, the carry look ahead circuit is not added to lowermost 4 bits. In this case, the lowermost bit may be a half adder.

In this way, by restricting one input to a small immediate, the lower 4 bits are that, though a carry-saved adder circuit may be complicated, since a carry look ahead circuit is not required, as compared with the case of adding and subtracting of three 32-bit data, layout area on chip is reduced and the hardware cost can be cut.

Also, in the Class A2, the parallel execution is possible when a transfer processing destination of the instruction 1 coincides with the destination operand of the instruction 2. In this case, in place of the destination operand of the instruction 2, the source operand of the instruction 1 may be simply transferred to the operator by the S1 bus 621 or S2 bus 622, and the operation result is stored in the register specified as the destination of the instruction 2.

In this way, by restricting a combination of the instructions for parallel execution, the data processor can be realized with a low hardware cost. Particularly, by restricting one of the two add/subtract instructions only to the case where a source operand is a small immediate, it is possible to reduce the hardware cost of the three-value adder. In such a case of performing scaled-index addition used in an array pointer calculation, the above-mentioned configuration is very effective. It is because that, in the array pointer calculation, a left shifted (exponentiation of 2) value of an index value and a displacement are added to a base address value.

In the above-mentioned embodiment, though it is constituted such that the operation result of the instruction 1 can not be outputted at the time of composite operation of the instruction 1 and instruction 2, except the case where the instruction 1 is the shift instruction, in the same way as in the first embodiment, when an operator executing operation of the instruction 1 in parallel to the composite operation of the instruction 1 and instruction 2 is included, or means for outputting the operation result of the instruction 1 halfway of the composite operator is added, the two instructions can be executed in parallel even when the destination operand of the instruction 1 interferes with the source operand of the instruction 2. However, when the instruction 2 is the instruction writing the operation result into the register, two buses are required for writing the value into the register. When the instruction 2 is the comparing instruction, only one bus is required because only the destination operand of the instruction 1 need be transferred. For example, in the loop counter control, when an immediate (a step value) is added to or subtracted from a counter register to compare it with an upper limit value or a lower limit value, only the operation result of the instruction 1 need be stored.

The third embodiment, in which a combination of the instructions which can be executed in parallel is reduced less than the second embodiment to cut the hardware cost of an operator, is described. In the third present embodiment, the two instructions are executed in parallel only when the destination operand of the instruction 1 and the destination operand of the instruction 2 coincide in the following classifications.

Class A2
Class A3
Class B2
Class A6 or Class B4
  a combination of the add instruction and the increment instruction (the add instruction of Format adding a constant 1)
  a combination of the subtract instruction and the decrement instruction (the subtract instruction of Q-format subtracting a constant 1)

Figure 67:
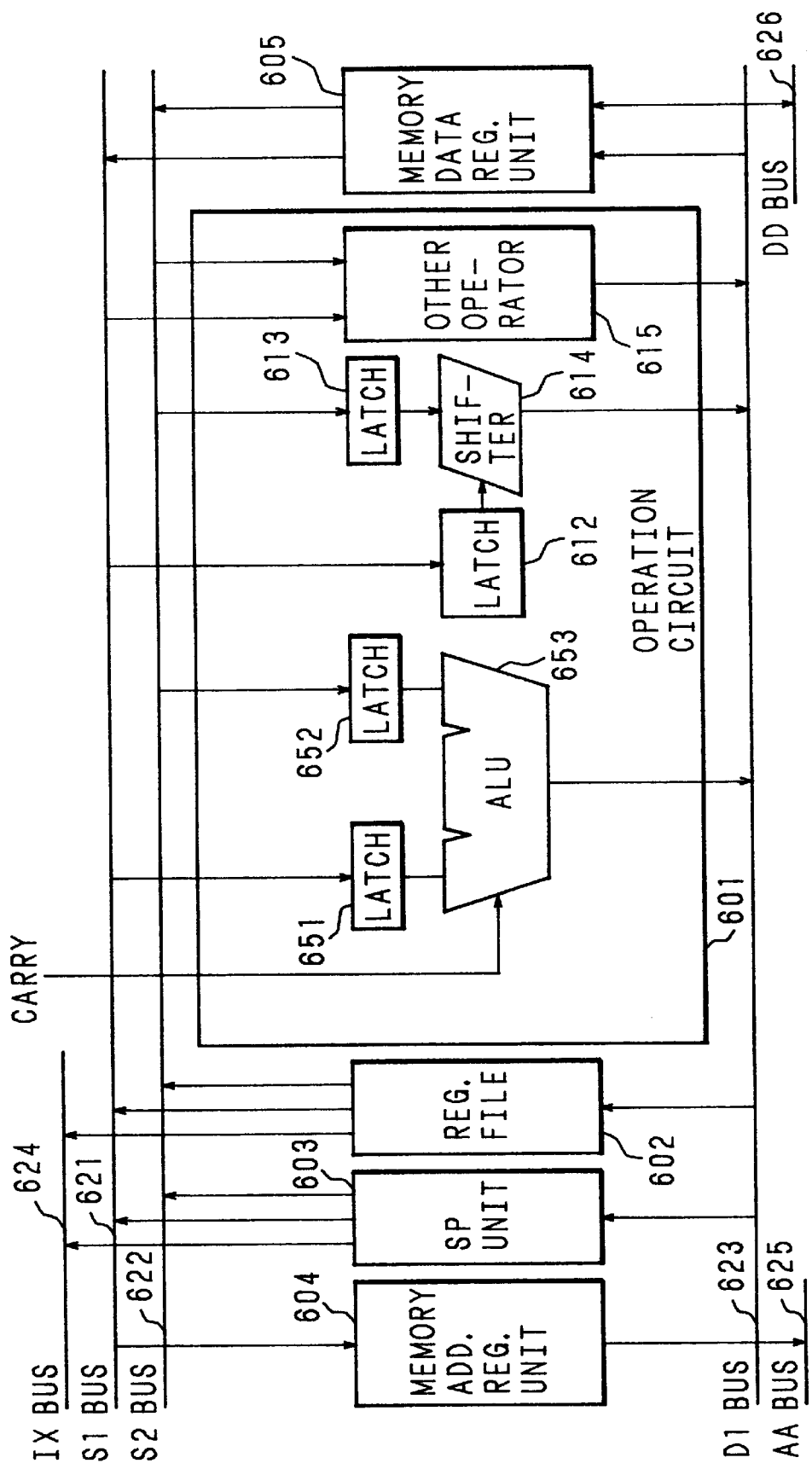
FIG. 67 is a block diagram showing a configuration example of an integer operation of another embodiment of a data processor.

FIG. 67 is a block diagram showing a configuration example of an integer operation unit of the present embodiment. A configuration around an ALU is different from that of the integer operation unit of the second embodiment shown in FIG. 62. Since a basic instruction processing method is substantially same as in the first embodiment and second embodiment, description thereof is omitted. Also, in the Class A2, A3 and B2, since the processing is same as that in the second embodiment, description thereof is omitted. In the Class A6 or B4, in case of adding A, B and "1", and in case of subtracting B and "1" from A, three value addition and subtraction are performed as follows. Assuming the an adder adds an input A' (A or inverted A), an input B' (B or inverted B) and a carry. Adder outputs are indicated in { }.

|  | input A' | input B' | carry input |
| --- | --- | --- | --- |
| A + B + 1 = | {A | +B | +1} |
| A − B − 1 = | {inverted A | +B | +1} inverted or |
|  | {A | +inverted B | +0} |

That is, an adder portion of the ALU 653 may be a input full adder (only the succeeding stage portion in FIG. 63 and FIG. 64), and the two instructions can be executed in parallel only by controlling an input/output inversion and the carry input. Though the combination of instructions whereby two instructions can be executed in parallel is considerably restricted, as the operation hardware, it is substantially same as the case of executing the instructions one by one, and the two instructions can be executed in parallel by just changing a method of control. Thus, when executing an application including a number of such processing, such configuration is effective.

However, also in this case, in the same way as in the second embodiment, when the operation result of the instruction 1 is to be written, one more adder is required. However, since only a decrement function and increment function are required in this adder, necessary hardwares can be reduced. Also, in the general data processor, in many cases, there are provided other operators such as an address register, a counter and the like, thus the hardwares can be reduced more when such hardwares are used. When the instruction 1 and instruction 2 write the operation result into the different registers, two buses are required. However, when restricted to the case where the instruction 2 is the comparing instruction, one bus is enough. When subtracting "1" from the counter to compare it with the lower limit value in the loop control, "counter value−1" may be executed by one adder and "counter value−lower limit value−1" may be executed by another adder. In this case, only the result of the instruction 1 may be transferred to the register used as the counter.

As particularly described heretofore, according to the present invention, since it is so constituted that a plurality of instructions having the operand interference and a plurality of instructions accessing a continuous area of a memory can be executed in parallel, a data processor of high performance can be provided at a relatively low cost.

According to a first aspect of the data processor, the shift instruction as the first instruction, and the arithmetic operation/logical operation instruction or the comparing instruction as the second instruction are executed in parallel.

According to a second aspect of the data processor, the arithmetic operation/logical operation instruction as the first instruction and the shift instruction as the second instruction are executed in parallel.

According to a third aspect of the data processor, the operation instruction as the first instruction and the register-register transfer instruction as the second instruction are executed in parallel.

According to a fourth aspect of the data processor, the operation instructions as the first and second instructions are executed in parallel.

According to a fifth aspect of the data processor, the pop instructions as the first and second instruction are executed in parallel.

According to the sixth aspect of the data processor, the push instructions as the first and second instructions are executed in parallel.

According to a seventh aspect of the data processor, the load instruction of a register indirect mode as the first instruction, and the load instruction of a register relative indirect mode as the second instruction are executed in parallel.

According to an eighth aspect of the data processor, the load instructions of a register relative indirect mode as the first and second instructions are executed in parallel.

According to a ninth aspect of the data processor, the store instruction of a register indirect mode as the first instruction, and the store instruction of a register relative indirect mode as the second instruction are executed in parallel.

According to a 10th aspect of the data processor, the store instructions of a register relative indirect mode as the first and second instructions are executed in parallel.

According to a 11th aspect of the data processor, the arithmetic operation instruction or the logical operation instruction as the first instruction, and the logical operation instruction as the second instruction are executed in parallel.

According to a 12th aspect of the data processor, the logical operation instruction as the first instruction, and the arithmetic operation instruction, logical operation instruction or comparing instruction as the second instruction are executed in parallel.

According to a 13th aspect of the data processor, at least, one instruction of the add instruction or the subtract instruction as the first instruction, and, at least, the add instruction or the subtract instruction of an immediate specified by an instruction code as the second instruction are executed in parallel.

According to a 14th aspect of the data processor of the present instruction, the add instruction as the first instruction, and the increment instruction as the second instruction are executed in parallel.

According to a 15th aspect of the data processor, the subtract instruction as the first instruction, and the decrement instruction as the second instruction are executed in parallel.

According to a 16th aspect of the data processor, the instructions reading data from a memory as both the first and second instructions are executed in parallel.

According to a 17th aspect of the data processor, in the 16th aspect, the load instructions as both the first and second instructions are executed in parallel.

According to a 18th aspect of the data processor, the instructions writing data into a memory as both the first and second instructions are executed in parallel.

According to a 19th aspect of the data processor, in the 18th aspect, the store instructions as both the first and second instructions are executed in parallel.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A data processor, comprising:
   first storing means for storing instructions;
   second storing means for storing operand data;
   instruction fetching means for fetching instructions from said first storing means;
   instruction decoding means for decoding the instructions fetched by said instruction fetching means and outputting a decoding result, having a plurality of means for respectively decoding instructions of an instruction group consisting of a plurality of instructions including at least a first instruction and a second instruction, said second instruction succeeding said first instruction;
   data accessing means for fetching data, necessary for executing the instructions from said second storing means;
   instruction executing means for executing instructions on the basis of the decoding result output by said instruction decoding means, said instruction executing means having data transferring means for transferring two data to said instruction executing means in parallel from said data accessing means; and
   judging means for judging, as a first condition, whether said first instruction performs one or plurality of operations including a load operation for loading first data from said second storing means and said second instruction performs one or plurality of operations including a load operation for loading second data from said second storing means, and, as a second condition, whether said first and said second data is stored in continuous region in said second storing means;
   wherein when said judging means judges that both said first and second conditions are satisfied, said instruction executing means executes said first and second instructions in parallel, by performing the transfer of said first data to said instruction executing means from said data accessing means substantially simultaneously with the transfer of said second data to said instruction executing means from said data accessing means via said data transferring means.

2. The data processor as set forth in claim 1, wherein said instruction decoding means decodes, in parallel, said first instruction and said second instruction succeeding said first instruction.

3. The data processor as set forth in claim 1, wherein both said first and second instructions are the load instructions.

4. A data processor, comprising:
   first storing means for storing instructions;
   second storing means for storing operand data;
   instruction fetching means for fetching instructions from said first storing means;

instruction decoding means for decoding the instructions fetched by said instruction fetching means and outputting a decoding result, having a plurality of means for respectively decoding instructions of an instruction group consisting of a plurality of instructions including at least a first instruction and a second instruction, said second instruction succeeding said first instruction;

data accessing means for storing data in said second storing means;

instruction executing means for executing instructions on the basis of the decoding result output by said instruction decoding means, said instruction executing means having data transferring means for transferring two data to said data accessing means in parallel; and judging means for judging, as a first condition, whether said first instruction performs one or plurality of operations including a store operation for storing first data to said second storing means and said second instructin performs one or plurality of operations including a store operation for storing second data to said second storing means, and, as a second condition, whether said first and said second data is stored in continuous region in said second storing wherein when said judging means judges that both said first and second conditions are satisfied, said instruction executing means executes said first and second instructions in parallel, by performing the transfer of said first data to said data accessing means substantially simultaneously with the transfer of said second data to said data accessing means via said data transferring means.

5. The data processor as set forth in claim 4, wherein said instruction decoding means decodes, in parallel, said first instruction and said second instruction succeeding said first instruction.

6. The data processor as set forth in claim 4, wherein both said first and second instructions are the store instructions.

7. The data processor as set forth in claim 1, wherein the area of said second storing means assigned for reading by said second instruction is different from an area assigned for reading by said first instruction.

8. The data processor as set forth in claim 4, wherein the area of said second storing means assigned for writing by said second instruction is different from an area assigned for writing by said first instruction.

* * * * *

UNITED STATES PATENT AND TRADEMARK OFFICE
CERTIFICATE OF CORRECTION

PATENT NO. : 6,112,289
DATED : August 29, 2000
INVENTOR(S) : Masahito Matsuo

Page 1 of 1

It is certified that error appears in the above-identified patent and that said Letters Patent is hereby corrected as shown below:

<u>Claim 4,</u>
Line 23, starting from the top of Column 73, change "in said second storing" to -- in said second storing means --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*